United States Patent
Nishiyama

(10) Patent No.: US 8,189,436 B2
(45) Date of Patent: May 29, 2012

(54) OPTICAL DRIVE DEVICE AND AMPLIFICATION RATE DETERMINING METHOD

(75) Inventor: Tetsuya Nishiyama, Tokyo (JP)

(73) Assignee: TDK, Tokyo (JP)

( * ) Notice: Subject to any disclaimer, the term of this patent is extended or adjusted under 35 U.S.C. 154(b) by 204 days.

(21) Appl. No.: 12/546,174

(22) Filed: Aug. 24, 2009

(65) Prior Publication Data

US 2010/0046340 A1 Feb. 25, 2010

(30) Foreign Application Priority Data

| Aug. 25, 2008 | (JP) | 2008-216026 |
| Aug. 25, 2008 | (JP) | 2008-216027 |
| Dec. 24, 2008 | (JP) | 2008-328503 |
| Dec. 24, 2008 | (JP) | 2008-328504 |
| Jun. 18, 2009 | (JP) | 2009-145834 |

(51) Int. Cl.
*G11B 7/00* (2006.01)

(52) U.S. Cl. ............ 369/44.41; 369/44.37; 369/44.38; 369/120

(58) Field of Classification Search .............. None
See application file for complete search history.

(56) References Cited

U.S. PATENT DOCUMENTS

| 5,629,911 | A | 5/1997 | Kenichi | |
| 7,466,636 | B2 * | 12/2008 | Buchler et al. | 369/44.32 |
| 2005/0226106 | A1 * | 10/2005 | Hwang et al. | 369/44.28 |
| 2005/0286360 | A1 | 12/2005 | Nakao | |
| 2006/0104168 | A1 | 5/2006 | Arai | |
| 2007/0291602 | A1 | 12/2007 | Nakao | |

FOREIGN PATENT DOCUMENTS

| JP | 63-244419 S | 10/1988 |
| JP | 06-176381 H | 6/1994 |
| JP | 8-306057 H | 11/1996 |
| JP | 11-154336 H | 6/1999 |
| JP | 2002-230084 | 8/2002 |
| JP | 2004-281026 | 10/2004 |
| JP | 2004-334949 | 11/2004 |
| JP | 2005-310257 | 11/2005 |
| JP | 2005-346882 | 12/2005 |
| JP | 2007-287232 | 11/2007 |
| JP | 2007-328833 | 12/2007 |
| JP | 2007-335047 | 12/2007 |
| WO | 2004/042714 A1 | 5/2004 |

OTHER PUBLICATIONS

English transtation of Office Action of Oct. 27, 2009 in counterpart Japanese application JP2008-328503.
Whole English translation of JP 2005-310257.
Whole English translation of JP H8-306057.
Whole English translation of JP 2007-328833.
English translation of Office Action of Nov. 9, 2010 in related JP Application No. 2010-139769.

\* cited by examiner

*Primary Examiner* — Joseph Haley
(74) *Attorney, Agent, or Firm* — Young Law Firm, PC

(57) ABSTRACT

An optical drive device generates a first push-pull signal and a first sum signal based on a light receiving amount in two light receiving areas of which each width in a signal light tangent direction is smaller than a diameter of a spot of signal light, generates a first normalized push-pull signal by normalizing the first push-pull signal by using the first sum signal, and generates a tracking error signal based on the first normalized push-pull signal.

7 Claims, 59 Drawing Sheets

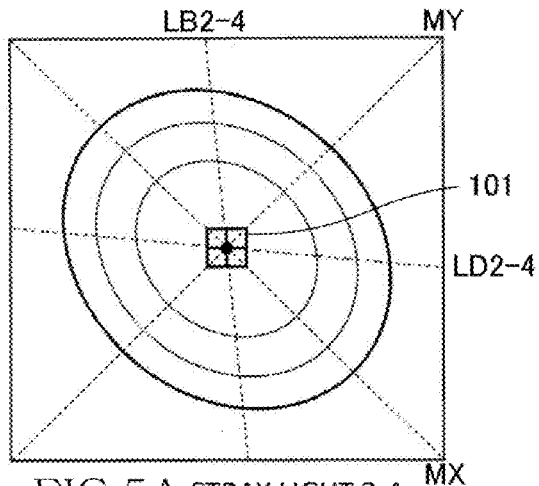
FIG.5A STRAY LIGHT 2-4
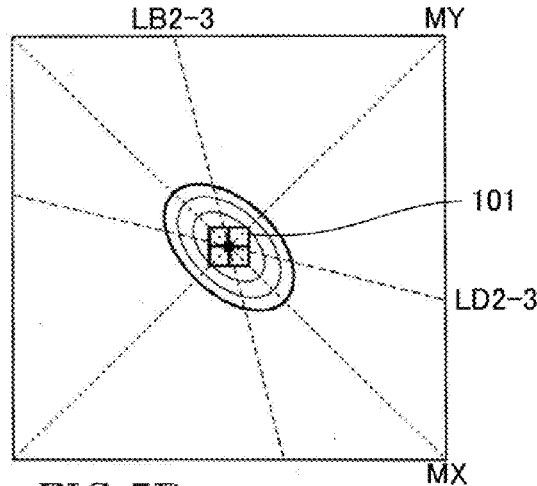
FIG.5B STRAY LIGHT 2-3
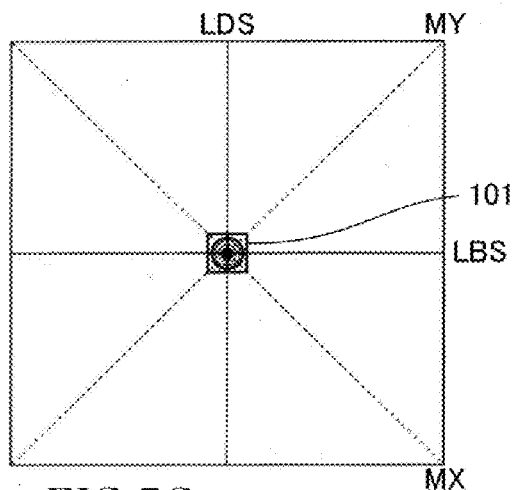
FIG.5C MB
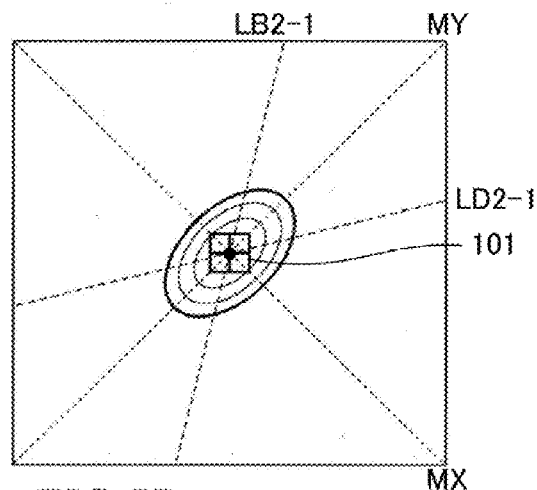
FIG.5D STRAY LIGHT 2-1
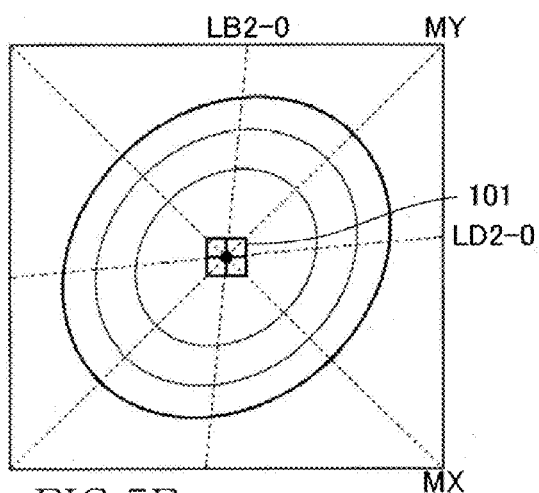
FIG.5E STRAY LIGHT 2-0

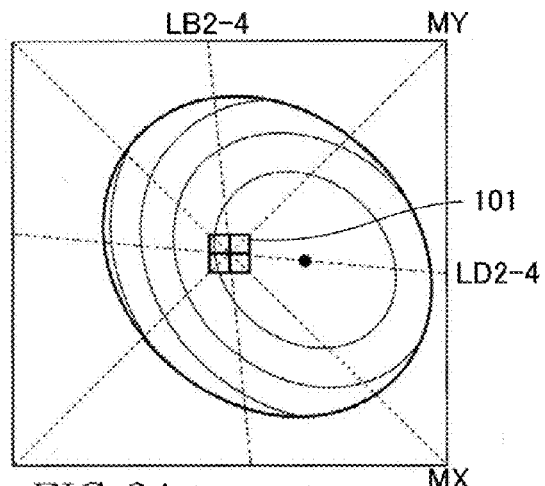
FIG.6A STRAY LIGHT 2-4
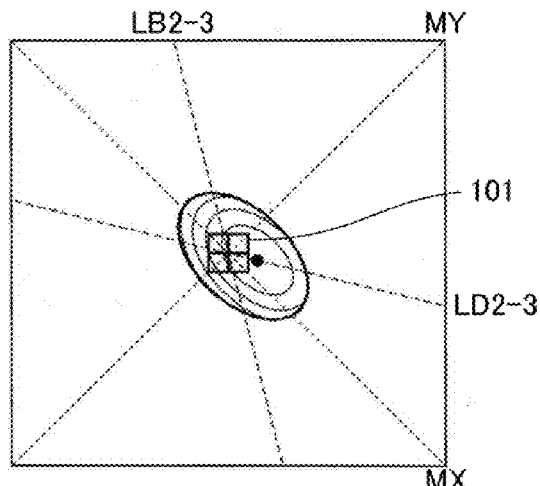
FIG.6B STRAY LIGHT 2-3
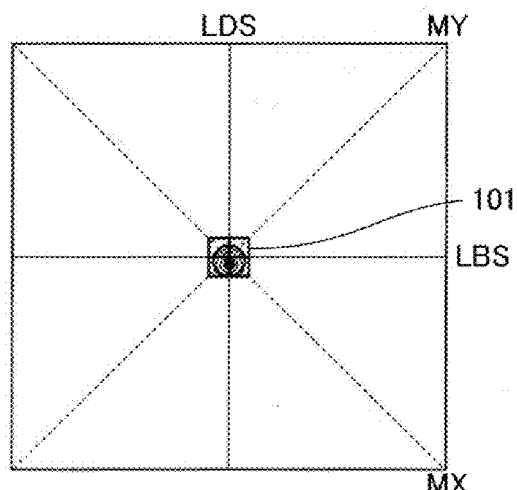
FIG.6C MB
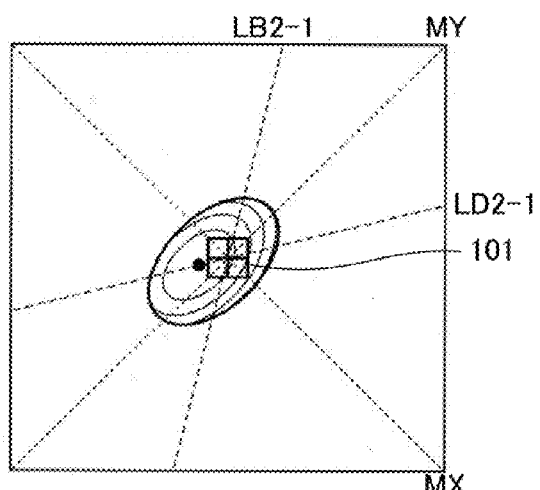
FIG.6D STRAY LIGHT 2-1
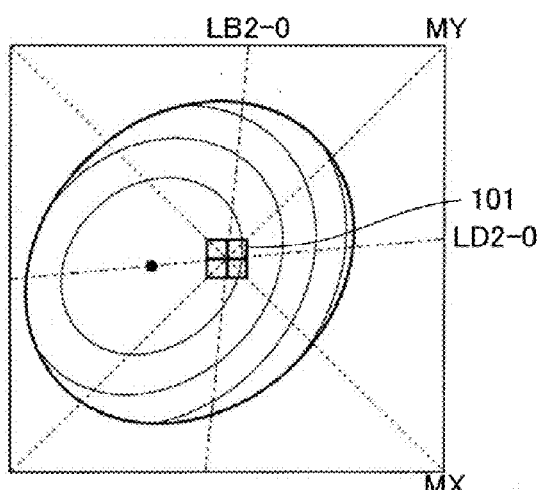
FIG.6E STRAY LIGHT 2-0

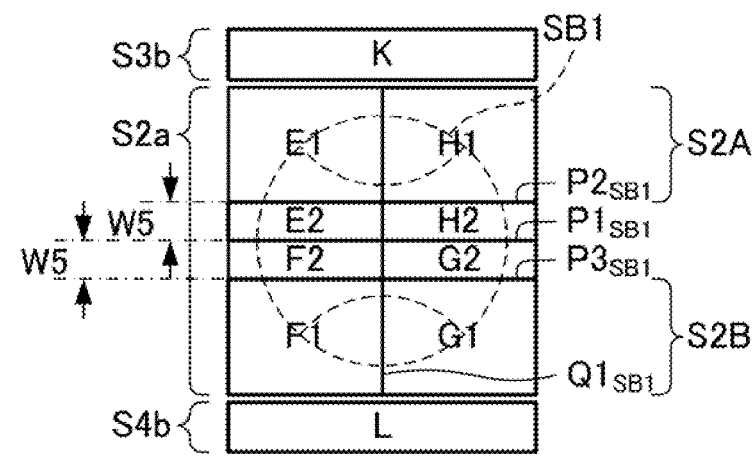
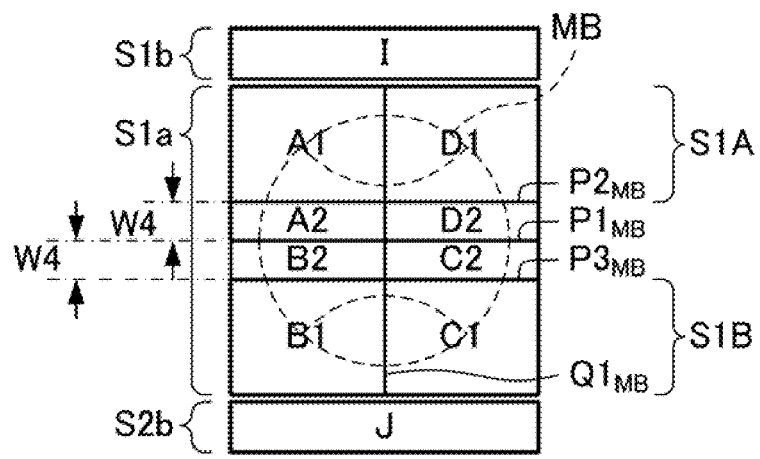
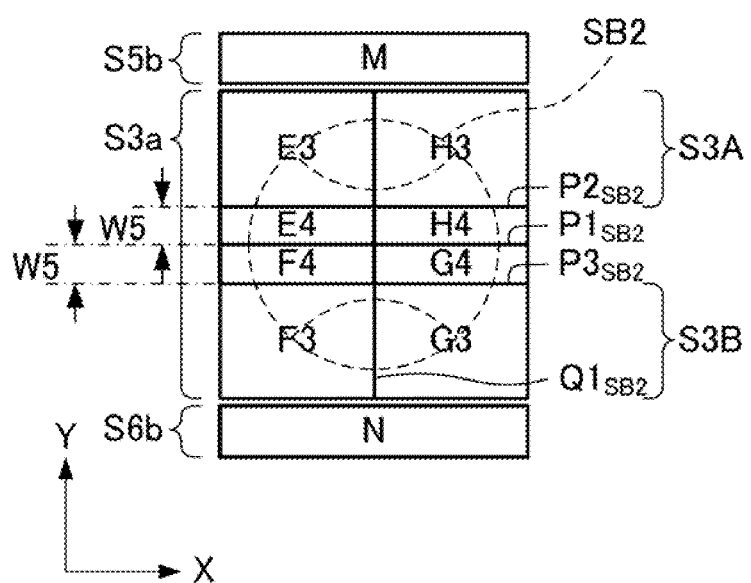
FIG.44

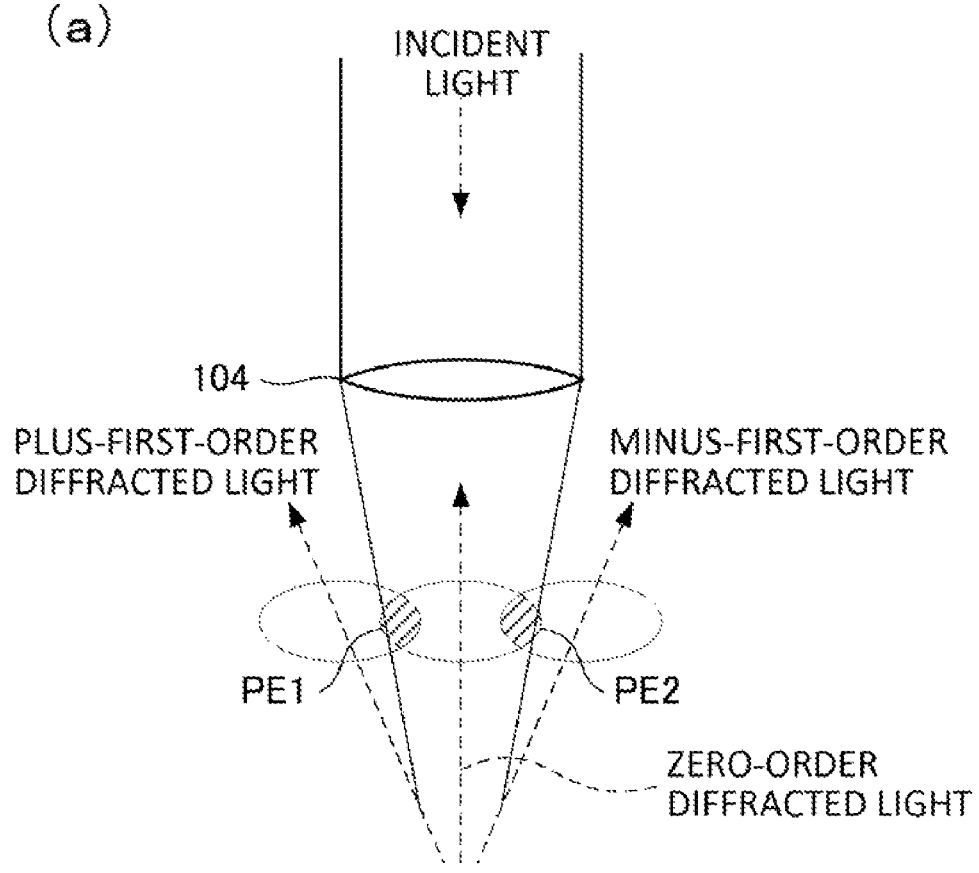
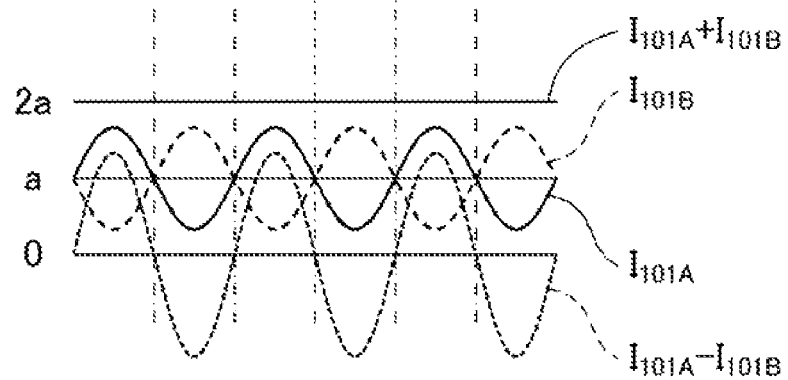
FIG.54

OPTICAL DRIVE DEVICE AND AMPLIFICATION RATE DETERMINING METHOD

TECHNICAL FIELD

The present invention relates to an optical drive device including an optical pickup, and a method of determining an amplification factor used in the optical drive device.

BACKGROUND OF THE INVENTION

An optical drive device that records or reproduces information onto or from an optical disk such as a CD (Compact Disc), a DVD, and a BD (Blu-ray disc®) includes an optical pickup. The optical pickup has an outward optical system that generates an optical beam and condenses the optical beam onto a recording surface of the optical disk by an objective lens, and a returning optical system including an optical detector that receives an optical beam reflected from the recording surface of the optical disk.

The optical beam needs to be focused on a center of a track formed on the recording surface of the optical disk. Therefore, the optical drive device performs a control, which is called "tracking servo", to adjust a deviation of a focus position in a radial direction. This tracking servo is briefly explained below.

FIG. 54(a) shows an end surface of a cross section of a recording surface of an optical disk 11 configured by plural lands L and grooves G, an objective lens 104, and an optical beam (incident light, reflection light (zero-order diffracted light, ± (plus/minus) first-order diffracted light)). As shown in FIG. 54(a), zero-order diffracted light and plus-first-order diffracted light interfere with each other in an area PE1, and zero-order diffracted light and minus-first-order diffracted light interfere with each other in an area PE2. Areas where zero-order diffracted light and ±first-order diffracted light interfere with each other like the areas PE1 and PE2 are called "push-pull area(s)".

FIG. 55 shows a light receiving surface 101 of an optical detector that receives an optical beam reflected from the recording surface of the optical disk 11. As shown in FIG. 55, zero-order diffracted light reflected from the recording surface of the optical disk 11 forms a spot at the center of the light receiving surface 101. The spot forms various shapes such as a quadrangle and a round shape by various kinds of lenses arranged in an optical path. In this example, a circular spot is drawn.

As shown in FIG. 55, the light receiving surface 101 has a square shape, and is divided into upper and lower areas. As a result of this division, an upper light receiving area 101A receives light of the push-pull area PE1, and a lower light receiving area 101B receives light of the push-pull area PE2.

The optical detector that receives an optical beam outputs a signal having amplitude of a value (a light receiving amount) obtained by performing surface integration of intensity of the optical beam in a light receiving surface, for each light receiving area. An output signal corresponding to a light receiving area X is hereinafter expressed as $I_x$.

Light intensities in the push-pull areas PE1 and PE2 become values corresponding to a difference between a phase of the zero-order diffracted light and a phase of the ±first-order diffracted light and the intensities of the light. The phase difference and the intensities change depending on unevenness on the recording surface. Therefore, when a focus position of incident light shifts to a radial direction of the optical disk, that is, a direction crossing the track (lateral direction in FIG. 54(a)) (hereinafter, the shift is called "track jump"), the difference between a phase of the zero-order diffracted light and a phase of the ±first-order diffracted light and the intensities of the light change following this shift. The light intensities in the push-pull areas PE1 and PE2 also change. As a result, each of the above output signals also changes.

FIG. 54(b) shows a change of each output signal. As shown in FIG. 54(b), output signals $I_{101A}$ and $I_{101B}$ show changes of mutually opposite phases around a predetermined value a. An added signal of these signals $I_{101A}+I_{101B}$ becomes always a constant value $2a$.

On the other hand, a subtracted signal of the output signals $I_{101A}-I_{101B}$ (hereinafter, the signal is called "push-pull signal PP") becomes 0, when a focus position of the incident light is at the center of the land L or the groove G. In other cases, this push-pull signal PP becomes a value other than 0. Tracking servo uses a characteristic of this push-pull signal PP. The optical drive device outputs the push-pull signal PP as a tracking error signal TE. The optical drive device adjusts a deviation of the focus position in the radial direction of the optical disk, by controlling a position of the objective lens 104 to set the tracking error signal TE to 0.

Various offsets occur in the tracking error signal TE. Specifically, there occur an offset following a positional shift (a lens shift) of the objective lens due to the tracking servo, and an offset occurring in a boundary (a record boundary) due to a difference between reflectance ratios in an area (a recorded area) in which data is recorded and in an area (an unrecorded area) in which data is not yet recorded. In a multilayered disk, an optical beam (stray light) reflected from a layer other than a layer to be accessed interferes with an optical beam (signal light) reflected from the layer to be accessed, thereby generating an offset. The offset becomes a cause of generating an error in the tracking servo. Therefore, it is required to decrease the offset from the tracking error signal TE.

Japanese Patent Application Laid-open No. H6-176381 discloses in paragraphs 0044 to 0050, a configuration of decreasing offsets due to an optical deviation including the lens shift mentioned above from the tracking error signal TE, by dividing an optical flux of signal light into two, providing an optical detector for each divided light, and by using a difference between the push-pull signals PP obtained for each optical detector as the tracking error signal TE.

Japanese Patent Application Laid-open No. 2005-346882 (abstract) and Japanese Patent Application Laid-open No. 2007-287232 (abstract) disclose a configuration of decreasing offsets due to the lens shift from the tracking error signal TE, by a technique called "differential push-pull method". The differential push-pull method also uses a difference between push-pull signals PP obtained for each optical detector as the tracking error signal TE, by dividing an optical flux of signal light and by providing an optical detector for each divided light, in a similar manner to a technique disclosed in Japanese Patent Application Laid-open No. H6-176381.

The differential push-pull method is explained in detail. This technique decreases offsets generated in the tracking error signal TE due to a shift (a lens shift) of a position of an objective lens by tracking servo. An optical beam irradiated on the recording surface of the optical disk 11 is passed to a diffraction grating, and is decomposed into zero-order diffracted light and ±first-order diffracted light. These zero-order diffracted light and ±first-order diffracted light are different from the zero-order diffracted light and ±first-order diffracted light described above. To avoid confusion, the zero-order diffracted light, plus-first-order diffracted light, and minus-first-order diffracted light that are decomposed by the diffraction grating are hereinafter called "main beam MB", "sub beam SB1", and "sub beam SB2", respectively. When zero-order diffracted light and ±first-order diffracted light are referenced, these indicate diffracted light generated by diffraction on the recording surface. The main beam MB, the sub beam SB1, and the sub beam SB2 independently generate reflection light having the push-pull areas described above.

FIG. 56 shows light receiving surfaces of an optical detector 100 used to perform tracking servo by using the differential push-pull method. The optical detector 100 receives an optical beam reflected from the recording surface of the optical disk 11, and has three light receiving surfaces 101 to 103 as shown in FIG. 56. Centers of the light receiving surfaces 101 to 103 are arranged to coincide with spot centers of the main beam MB, the sub beam SB1, and the sub beam SB2, respectively. Each spot has various shapes such as a quadrangle and a round shape by various kinds of lenses arranged in an optical path. In this example, a circular spot is drawn.

The light receiving surfaces 101 to 103 have a square shape, and are divided into upper and lower areas. The push-pull area PE1 irradiates light to light receiving areas 101A, 102B, and 103B at the upper side in FIG. 56. The push-pull area PE2 irradiates light to light receiving areas 101B, 102A, and 103A at the lower side in FIG. 56. As explained above, an upper-and-lower relationship of the main beam and the sub beams is reversed.

When the differential push-pull method is not used, the optical drive device uses a main push-pull signal MPP (the same signal as the push-pull signal PP) as the tracking error signal TE. When the differential push-pull method is not used like this, an offset generated in the tracking error signal TE due to the lens shift is cancelled by another certain method. Thereafter, a position of the objective lens 104 is controlled to set the tracking error signal TE to 0. As a result, a deviation of the focus position of the radial direction of the optical disk can be adjusted.

On the other hand, when the differential push-pull method is used, the tracking error signal TE is shown by the following equation (1). In this equation, SPP represents a sub push-pull signal, and is expressed by $(I_{102A}+I_{103A})-(I_{102B}+I_{103B})$.

$$TE = MPP - kSPP \quad (1)$$
$$= (I_{101A} - I_{101B}) - k\{(I_{102A} + I_{103A}) - (I_{102B} + I_{103B})\}$$

Due to the lens shift, an offset occurs in the same direction in the main push-pull signal MPP and the sub push-pull signal SPP. That is, although a spot shifts to the upper and lower directions of FIG. 56 due to the lens shift, a shift direction is the same for the main beam and the sub beams. Therefore, when the spot shifts to the upper side in FIG. 56, for example, the light receiving amount in the light receiving areas 101A, 102A, and 103A increases, and the light receiving amount in the light receiving areas 101B, 102B, and 103B decreases. As a result, the output signal $I_{101A}$ increases, the output signal $I_{101B}$ decreases, and an offset occurs in an increase direction of the main push-pull signal MPP. Similarly, the output signals $I_{102A}$ and $I_{103A}$ increase, the output signals $I_{102B}$ and $I_{103B}$ decrease, and an offset occurs in an increase direction of the sub push-pull signal SPP. Therefore, these changes can be cancelled by the equation (1).

As described above, the upper-and-lower relationship of the push-pull areas is reversed between the main beam and the sub beams. Therefore, phases of the main push-pull signal MPP and the sub push-pull signal SPP are different by 180° from each other. Accordingly, the main push-pull signal MPP and the sub push-pull signal SPP are not cancelled by each other by the equation (1). By determining a constant k in advance to cancel the offset generated in the main push-pull signal MPP and the sub push-pull signal SPP at a lens shift time, tracking servo can be performed by the equation (1).

Japanese Patent Application Laid-open No. 2004-281026 discloses, in paragraph 0111, an example of a technique of performing tracking servo by using the differential push-pull method. This example has an object of removing an offset generated in the tracking error signal TE due to the use of an optical disk having a track positional deviation (formation failure) for every three tracks, and achieves the object by not using a vicinity of the center of each light receiving surface. When a track positional deviation occurs in every three tracks, three tracks can be considered as one cyclical structure, and this cycle becomes three times a track pitch. A diffraction angle of diffracted light from this cyclical structure becomes small by the length of the cycle. Therefore, the diffracted light from the cyclical structure largely depends on a center portion of the beam. Consequently, the above offset can be removed by not using the vicinity of the center of each light receiving surface.

The optical drive device focuses an optical beam on a center of the track, by controlling a position of the objective lens in a radial direction of the optical disk as well as in a direction perpendicular to an optical disk recording surface (for example, see Japanese Patent Application Laid-open No. 2007-328833 (paragraphs 0002 to 0014)).

Position control of the objective lens including control in a direction perpendicular to the optical disk recording surface is explained again collectively including the tracking servo described above.

First, in accessing the optical disk, the optical drive device starts generating three kinds of signals including the tracking error signal TE, a pull-in signal PI, and a focus error signal FE, based on a light receiving amount of an optical beam received by an optical detector. Position control of the objective lens is performed by using these signals.

While a technique of controlling the position of the objective lens is explained below in detail by using each of the above signals, before the explanation, structures of the optical detector and the optical beam are briefly explained.

FIG. 57 is an outline view of an optical detector 110 contained in the optical pickup, viewed from an irradiation direction of the optical beam. X and Y directions shown in FIG. 57 correspond to a tangent direction of the optical disk and a radial direction of the optical disk, respectively.

As shown in FIG. 57, the optical detector 110 includes three light receiving surfaces 111 to 113 that are all quadrate. In these light receiving surfaces, the light receiving surface 111 is divided into four quadrates (light receiving areas 111A to 111D) of the same dimensions. The light receiving areas 112 and 113 are divided into two of upper and lower areas (light receiving areas 112A and 112B and light receiving areas 113A and 113B) having the same dimensions. The optical beam is irradiated to the optical disk in a state of being diffracted in zero-order diffracted light (the main beam MB), plus-first-order diffracted light (the sub beam SB1), and minus-first-order diffracted light (the sub beam SB2), by a diffraction grating (not shown) provided in an outward optical system. The light receiving surfaces 111 to 113 are arranged at positions where the main beam MB, the sub beam SB1, and the sub beam SB2 can be received.

As shown in FIG. 57, each of the beams MB, SB1, and SB2 has the push-pull areas PE1 and PE2 described above. As shown in FIG. 57, a positional relationship of the push-pull area PE1 and the push-pull area PE2 is opposite between the main beam MB and the sub beams SB1 and SB2.

In the tracking error signal TE, a focus position of the optical beam becomes 0 when the focus position of the optical beam is at the center of the track as viewed from above the recording surface, and is other value than 0 in other cases. The optical drive device controls a position of the objective lens to a radial direction of the optical disk, and sets a value of the tracking error signal TE to 0, thereby setting a focus of the optical beam to the center of the track as viewed from above the recording surface (tracking servo).

Generally, a differential push-pull signal DPP expressed by the following equation (2) is used as the tracking error signal TE (the differential push-pull method). In this equation, MPP and SPP represent a main push-pull signal, and sub push-pull signal, respectively, and are expressed by the following equations (3) and (4), respectively. In the equation (2), k represents a positive constant.

$$DPP = MPP - kSPP \quad (2)$$

$$MPP = (I_{111A} + I_{111D}) - (I_{111B} + I_{111C}) \quad (3)$$

$$SPP = (I_{112A} + I_{103A}) - (I_{112B} + I_{113B}) \quad (4)$$

Relative intensities in the push-pull areas PE1 and PE2 shown in FIG. 57 change following a shift of a focus position of the beam incident to the recording surface, when this focus position shifts to a radial direction of the optical disk, that is, a direction crossing the track (track jump). When the focus position of the beam incident to the recording surface is at the center of the track, intensities in the push-pull areas PE1 and PE2 become equal. Therefore, a value of the main push-pull signal MPP becomes 0 when the focus position of the beam incident to the recording surface is at the center of the track, and becomes other value than 0 in other case. This similarly applies to the sub push-pull signal SPP. However, a phase of the sub push-pull signal SPP is different from that of the main push-pull signal MPP by 180°, and these phases are opposite. As described above, a positional relationship of the push-pull area PE1 and the push-pull area PE2 is opposite between the main beam MB and the sub beams SB1 and SB2.

Tracking servo can be also performed by using only the main push-pull signal MPP. That is, by controlling a position of the objective lens to a radial direction of the optical disk, thereby setting the value of the main push-pull signal MPP to 0, in principle, a focus of the optical beam can be set to the center of the track viewed from above the recording surface.

Nonetheless, the differential push-pull signal DPP shown in the equation (2) is used, to decrease the influence of an offset (hereinafter, "lens shift offset") generated in the main push-pull signal MPP following a shift of the objective lens. This lens shift offset is briefly explained below.

Each spot shown in FIG. 57 shifts a Y direction (a signal light radial direction) to the same direction, following the shift of the objective lens. For example, when each spot shifts to the upper side in FIG. 57, the light receiving amount in the light receiving areas 111A, 111D, 112A, and 113A increases, and the light receiving amount in the light receiving areas 111B, 111C, 112B, and 113B decreases. As a result, the output signals $I_{111A}$ and $I_{111D}$ increase, the output signals $I_{111B}$ and $I_{111C}$ decrease, and an offset in an increase direction occurs in the main push-pull signal MPP. Similarly, the output signals $I_{112A}$ and $I_{113A}$ increase, the output signals $I_{112B}$ and $I_{113B}$ decrease, and an offset in an increase direction also occurs in the sub push-pull signal SPP.

In the differential push-pull signal DPP shown in the equation (2), a sign of the sub push-pull signal SPP is minus. Therefore, by properly determining the positive constant k, the shift offset described above generated in each of the main push-pull signal MPP and the sub push-pull signal SPP can be cancelled. Consequently, in the differential push-pull signal DPP, the influence of lens shift offsets can be decreased.

An optimum value of the constant k when there is no influence of stray light is a ratio (hereinafter, "beam intensity ratio") of the intensity of the main beam MB to the intensity of a sum of the intensities of the sub beams SB1 and SB2. However, in a multilayered optical disk, there is an influence of stray light from the recording surface different from the focus position. Therefore, this ratio does not necessarily become an optimum value. Accordingly, a value of the constant k when a multilayered optical disk is used is determined to cancel lens shift offsets generated in the main push-pull signal MPP and the sub push-pull signal SPP, respectively.

The pull-in signal PI takes a relatively large value when a focus position of the optical beam is near the recording layer of the optical disk, and takes a relatively small value when the focus position is not near the recording layer. Specifically, the pull-in signal PI is expressed by a total of output signals in all light receiving areas within the light receiving surface 111, as shown in the following equation (5). However, the pull-in signal PI is normally output in a state of limiting a band by passing this signal through a low-pass filter. The band limit is performed to remove an RF signal and noise.

$$PI = I_{111A} + I_{111B} + I_{111C} + I_{111D} \quad (5)$$

The optical drive device compares a value of the pull-in signal PI with a predetermined threshold value. By detecting a portion having a value larger than the threshold value, the optical drive device detects that a focus position of the optical beam is brought near to the recording layer. This detection is called "layer recognition". This control is performed to recognize that a vicinity of a specific layer (a layer to be accessed) is focused among plural recording layers, in parallel with focus servo described later.

The focus error signal FE becomes 0 when a focus position of the optical beam is on the recording layer of the optical disk. Specifically, the focus error signal FE is expressed by the following equation (6). The optical drive device controls a position of the objective lens to a direction perpendicular to the recording surface of the optical disk. By setting a value of the focus error signal FE to 0, the optical drive device focuses the optical beam on the recording layer. This control is called "focus servo".

$$FE = (I_{111A} + I_{111C}) - (I_{111B} + I_{111D}) \quad (6)$$

A cylindrical lens (not shown) is arranged in the returning optical system. Spots formed on the light receiving surface 111 by the main beam MB become in an oblong shape slender in an inclined direction as shown by spots $MB_1$ and $MB_2$ in FIG. 57, when the optical beam is not focused on the recording layer. In this case, the value of the focus error signal FE becomes a value other than 0. On the other hand, when the optical beam is focused on the recording layer, a spot becomes a round shape as shown by a spot $MB_0$ in FIG. 57. In this case, a value of the focus error signal FE becomes 0. Focus servo utilizes a characteristic of this focus error signal FE.

SUMMARY OF THE INVENTION

However, reduction of the offset amount generated in the tracking error signal TE is not sufficient yet based on the configuration using plural optical detectors as disclosed in Patent Documents mentioned above, and a new technique to decrease the offset is required.

When normalization is not performed at the time of performing tracking servo by using the differential push-pull method from the main push-pull signal MPP and the sub push-pull signal SPP, a push-pull amplitude varies because of various factors such as a difference of reflectance ratios in an unrecorded area and a recorded area of a disk, a reflectance ratio variation of an inner periphery and an outer periphery, a variation of laser power, and a difference of transmittance of an optical part. Therefore, normally, to avoid these influences, control is performed by normalizing by the sum signal, and the like.

Generally, the main push-pull signal MPP and the sub push-pull signal SPP are individually normalized. Specifically, the equation (7) is used instead of the equation (1). SUMm is a sum signal (a total signal) of the light receiving amount in the light receiving surface 101 (FIG. 3), and is expressed by $I_{101A}+I_{101B}$. SUMs is a sum signal of each light receiving amount in the light receiving surfaces 102 and 103 (FIG. 3), and is expressed by $I_{102A}+I_{102B}+I_{103A}+I_{103B}$. In this case, a value of the constant k normally becomes 1, and is actually determined to cancel the offset at the lens shift time by main and sub signals. However, because amplitude of the tracking error signal shown by the following equation (7) (hereinafter, amplitude of a signal generated following a track jump like the tracking signal error signal is called "push-pull amplitude") is small, the offset cannot be made small.

$$TE = \frac{MPP}{SUMm} - k\frac{SPP}{SUMs} \qquad (7)$$
$$= \frac{I_{101A} - I_{101B}}{I_{101A} + I_{101B}} - k\frac{(I_{102A} + I_{103A}) - (I_{102B} + I_{103B})}{I_{102A} + I_{102B} + I_{103A} + I_{103B}}$$

In this arrangement, a variation of the push-pull amplitude attributable to a variation of a reflectance ratio can be suppressed. However, on the other hand, when the equation (7) is used, when the vicinity of the center of each light receiving surface is not used as disclosed in Japanese Patent Application Laid-open No. H6-176381, the sum signals SUMm and SUMs for normalization vary at a track jump time, at the lens shift time. As a result, a push-pull waveform varies, symmetry becomes poor, and a value of the constant k cannot be determined accurately. Consequently, a new offset occurs. This variation occurs as an offset at a midpoint (hereinafter, "midpoint offset") of the tracking error signal TE (a value of a sum of a peak value at a plus side and a peak value at a minus side, divided by two). This phenomenon is called "asymmetry of push-pull waveform". This problem is described later. Details thereof are explained below.

The reason of not using the vicinity of the center of the light receiving surface is to decrease the offset. That is, when the vicinity of the center is not used, areas of zero-order light at both ends decrease, and the proportion of the push-pull area becomes large. Therefore, the push-pull amplitude can be increased, and the offsets can be decreased.

FIG. 58 shows an optical detector 120 having a light receiving surface not having a vicinity of the center. Spots in FIG. 58 show a state of a shift to an upper portion of FIG. 58 due to a lens shift. As shown in FIG. 58, when the vicinity of the center is not used, the push-pull area is stretched out from the light receiving area. When there is a stretch out, a sum signal is not constant at the track jump time, and varies. At the lens shift time, when all of upper and lower push-pull areas are added, or when these areas are added in a state of presence of symmetry in the push-pull areas contained in upper and lower patterns, a sum signal becomes constant. However, when there is a stretch out, these conditions are not satisfied, and a variation occurs in the same cycle as that of the push-pull amplitude. A new problem of an offset due to a variation at the time of the track jump of the sum signal is described later. In addition to the variation at the time of the track jump of the sum signal, the push-pull area to be operated also becomes small. At the same time, a ratio of the zero-order diffracted light contained in the sum signal becomes large (ratio of the push-pull area becomes small). These fact become factors for making the push-pull amplitude small.

As described above, at the lens shift time, when the push-pull waveform varies to have no symmetry and when the amplitude varies to become small due to a variation at the time of the track jump of the sum signal, the offset of the tracking error signal becomes large by that portion.

Therefore, in generating the tracking error signal without using the vicinity of the center of the light receiving surface, it is required to increase the push-pull amplitude, and suppress the variation of the push-pull amplitude at the lens shift time, thereby decreasing offsets generated in the tracking error signal.

Due to various factors, undesirable changes can occur in the tracking error signal TE, the pull-in signal PI, and the focus error signal FE. These changes make it difficult to focus the optical beam by tracking servo and focus servo.

The lens shift offset described above is an example of these changes. The influence of the lens shift offset is mitigated by the differential push-pull method described above.

Another detailed example of offset is as follows. In a multilayered optical disk, an offset occurs in the tracking error signal TE due to the optical beam (stray light) reflected from recording layers other than a layer to be accessed. That is, although the above lens shift offset also occurs in the stray light, a shift direction of stray light spots and a distribution of stray light intensities following the shift of the objective lens is not necessarily the same as the shift direction of the signal light spots. Therefore, it is difficult to cancel the lens shift offsets of both the signal light and the stray light by the differential push-pull method, and the offset remains in the tracking error signal TE.

An offset (hereinafter, "interference offset") also occurs due to interference of stray light with the optical beam (signal light) reflected from the layer to be accessed. Reflectance ratios are different between a data recorded area (a recorded area) and a data unrecorded area (an unrecorded area). When an optical beam of signal light and stray light is present at this boundary, the difference of the reflectance ratios becomes a cause of an offset (hereinafter, "recorded/unrecorded track boundary offset").

When an assembly position of an optical detector in the optical pickup is deviated, or when positions of various lenses in an optical path of the optical beam are deviated, a positional relationship between the spot of the optical beam and the optical detector is deviated, and a new offset occurs in the tracking error signal TE. This is also a kind of offset generated in the tracking error signal TE, and is hereinafter called "assembly offset".

There is also a case that a measure to mitigate the influence of the offset generates a new offset.

For example, Japanese Patent Application Laid-open 2007-328833 discloses a technique of using the differential push-pull signal DPP by normalizing this signal, to decrease the offset of the recorded/unrecorded track boundary offset. According to this technique, the tracking error signal TE is expressed by the following equation (8). In the equation, SUMm and SUMs represent a main sum signal and a sub sum signal, respectively, and are expressed by the following equations (9) and (10), respectively.

$$TE = \frac{DPP}{SUMm + SUMs} \quad (8)$$

$$SUMm = I_{111A} + I_{111B} + I_{111C} + I_{111D} \quad (9)$$

$$SUMs = I_{112A} + I_{112B} + I_{113A} + I_{113B} \quad (10)$$

On the other hand, provision of a gap at the center of the light receiving surface in a signal light radial direction can be considered, like in an optical detector 130 shown in FIG. 59. In this case, the proportion of the light receiving amount in the push-pull areas PE1 and PE2 in the output signal of the optical detector 130 increases. Therefore, amplitude of a normalized differential push-pull signal becomes larger than that when the optical detector 110 shown in FIG. 57 is used. Accordingly, when a differential push-pull signal normalized by the equation (8) is used as the tracking error signal TE by combining the equation (8) with the optical detector 130, for example, influence given to tracking servo by various offsets can be decreased.

However, when the equation (8) is combined with the optical detector 130, a new offset occurs in the tracking error signal TE. That is, in using the optical detector 130, when the objective lens is shifted to a radial direction of the optical disk by tracking servo, and when the push-pull area PE1 or PE2 is stretched out from the light receiving surface, a variation following the track jump (hereinafter, "sum signal variation") appears in the sum signal. In this case, when the tracking error signal TE generated by the equation (8) is used, the tracking error signal TE also varies following the sum signal variation.

This variation occurs as an offset at a midpoint (hereinafter, "midpoint offset") of the tracking error signal TE (a value of a sum of a peak value at a plus side and a peak value at a minus side, divided by two). This phenomenon is called "asymmetry of push-pull waveform". As described above, a value of the constant k within the differential push-pull signal DPP is determined to make it possible to cancel the lens offsets generated in the main push-pull signal MPP and the sub push-pull signal SPP, respectively. At the time of intentionally shifting the objective lens to perform this determination, "asymmetry of a push-pull waveform" appears in the tracking error signal TE normalized in the equation (8). Therefore, a value of the constant k is determined to also cancel a midpoint offset generated by "asymmetry of a push-pull waveform". Consequently, a new offset occurs in the tracking error signal TE. This new offset is hereinafter called "sum signal offset".

Meanwhile, in the multilayered optical disk, an undesirable change occurs in the pull-in signal PI due to the influence of stray light, and the layer recognition described above can become difficult. When reflectance ratios are different between adjacent recording layers, intensity of the stray light varies, and layer recognition becomes more difficult. That is, to perform layer recognition by the pull-in signal PI, the pull-in signal PI once needs to be minimal at the time of shifting a focus position of the optical beam between the recording layers. Sometimes, the pull-in signal PI monotonously changes without becoming minimal. In this case, layer recognition by the pull-in signal PI becomes difficult. A variation of the reflectance ratio at the same radial position (ground point of, the same distance from the center of the optical disk) between the recording layers is required to be controlled to be within about 65% by the standard. However, because this is not a value determined by considering layer recognition by the pull-in signal PI, layer recognition by the pull-in signal PI sometimes becomes difficult even in the optical disk satisfying the standard.

Therefore, it is required to decrease influence given to the focusing of the optical beam by tracking servo and focus servo by the change generated in each signal.

It is also required to decrease influence given to tracking servo by an interference offset.

It is also required to decrease influence given to tracking servo by an assembly offset.

It is also required to decrease influence given to tracking servo by the sum signal offset.

It is also required to make it possible to perform layer recognition by the pull-in signal PI, without the influence of stray light in the multilayered optical disk and a variation of reflectance ratios between the recording layers.

According to one aspect of the present invention, the optical drive device includes: an optical detector having a first signal-light receiving surface formed point-symmetrically to a spot center of signal light as reflection light in a layer to be accessed in a multilayered optical disk, and line-symmetrically to a straight line passing through the spot center and parallel with a signal light tangent direction, and further divided into first A and first B signal-light receiving areas by the straight line; and a tracking-error signal generator that generates a first push-pull signal and a first sum signal based on each light receiving amount in the first A and first B signal-light receiving areas, generates a first normalized push-pull signal by normalizing the first push-pull signal by using the first sum signal, and generates a tracking error signal based on the first normalized push-pull signal. Each width of the first A and first B signal-light receiving areas in a signal light tangent direction is smaller than a diameter of the spot.

According to the present invention, amplitude of the first normalized push-pull signal becomes large as compared with when each width of the first A and first B signal-light receiving areas in a signal light tangent direction is longer than the diameter (the spot diameter) described above. This is because a ratio of the push-pull area becomes relatively large. When a width of the signal-light receiving area in a signal light tangent direction is small, a zero-order light area becomes small, and the proportion of the optical interference area of the zero-order light and ±first-order light generated in a land groove of the optical disk becomes large. Therefore, the proportion of a zero-order light component of a sum signal of the light receiving areas as a denominator becomes small. Consequently, amplitude of the first normalized push-pull signal becomes large.

Generally, an offset amount $S_{OFFSET}$ of a signal S is expressed by the following equation (11) using amplitude $S_{AMPLITUDE}$ and a displacement amount $S_{DISPLACEMENT}$. Therefore, when amplitude of the first normalized push-pull signal becomes large, an offset amount of the first normalized push-pull signal is decreased. Consequently, an offset amount of a tracking error signal generated based on the first normalized push-pull signal is also decreased.

$$S_{OFFSET} = \frac{S_{DISPLACEMENT}}{S_{AMPLITUDE}} \times 100 \quad (11)$$

Each width of the first A and first B signal-light receiving areas in a signal light tangent direction is preferably smaller than 20% of the diameter. When the width is smaller than 20%, amplitude of the first normalized push-pull signal is stabilized, and at the same time, an offset generated by positional deviation of the spot to a signal light tangent direction can be decreased at substantially an equivalent level as compared with when the push-pull signal is normalized by the signal of a total beam diameter. Therefore, there is no problem in manufacturing the optical drive device.

The optical drive device described above further includes a diffraction grating that divides the optical beam irradiated to the multilayered optical disk into zero-order diffracted light and ±first-order diffracted light. The signal light is reflection light of the zero-order diffracted light. The optical detector further includes: a second signal-light receiving surface formed point-symmetrically to a spot center of reflection light of the plus-first-order diffracted light, and line-symmetrically to a straight line passing through the spot center and parallel with a signal light tangent direction, and further divided into second A and second B signal-light receiving areas by the straight line; and a third signal-light receiving surface formed point-symmetrically to a spot center of reflection light of the minus-first-order diffracted light, and line-symmetrically to a straight line passing through the spot center, and parallel with a signal light tangent direction, and further divided into third A and third B signal-light receiving areas by the straight line. The second A and third A signal-light receiving areas correspond to areas at the same side as the first A signal-light receiving area, with each corresponding one of the straight lines as a boundary. The second B and third B signal-light receiving areas correspond to areas at the same side as the first B signal-light receiving area, with each corresponding one of the straight lines as a boundary. The tracking-error signal generator generates a second push-pull signal and a second sum signal based on each light receiving amount in the second A, second B, third A, and third B signal-light receiving areas, generates a second normalized push-pull signal by normalizing the second push-pull signal by using the second sum signal, and generates the tracking error signal also based on the second normalized push-pull signal. Each width of the second A, second B, third A, and third B signal-light receiving areas in a signal light tangent direction can be smaller than a diameter of the spot. According to this, when the differential push-pull method is used, the offset amount of both the first and second normalized push-pull signals can be decreased.

Alternatively, the optical drive device described above further includes a diffraction grating that divides an optical beam irradiated to the multilayered optical disk into zero-order diffracted light and ±first-order diffracted light. The signal light is reflection light of the zero-order diffracted light. The optical detector further includes: a second signal-light receiving surface formed point-symmetrically to a spot center of reflection light of the plus-first-order diffracted light, and line-symmetrically to a straight line passing through the spot center and parallel with a signal light tangent direction, and further divided into second A and second B signal-light receiving areas by the straight line; and a third signal-light receiving surface formed point-symmetrically to a spot center of reflection light of the minus-first-order diffracted light, and line-symmetrically to a straight line passing through the spot center and parallel with a signal light tangent direction, and further divided into third A and third B signal-light receiving areas by the straight line. The second A and third A signal-light receiving areas correspond to areas at the same side as the first A signal-light receiving area, with each corresponding one of the straight lines as a boundary. The second B and third B signal-light receiving areas correspond to areas at the same side as the first B signal-light receiving area, with each corresponding one of the straight lines as a boundary. The tracking-error signal generator generates a third push-pull signal and a third sum signal based on each light receiving amount in the second A, second B signal-light receiving areas, generates a third normalized push-pull signal by normalizing the third push-pull signal by using the third sum signal, generates a fourth push-pull signal and a fourth sum signal based on each light receiving amount in the third A third B signal-light receiving areas, generates a fourth normalized push-pull signal by normalizing the fourth push-pull signal by using the fourth sum signal, and generates the tracking error signal also based on the third and fourth normalized push-pull signals. Each width of the second A, second B, third A, and third B signal-light receiving areas in a signal light tangent direction can be smaller than a diameter of the spot. According to this, when the differential push-pull method is used, the offset amount of both the third and fourth normalized push-pull signals can be decreased.

Each width of the second A, second B, third A, and third B signal-light receiving areas in a signal light tangent direction is preferably smaller than 20% of the diameter. When each width is smaller than 20%, amplitude of the second normalized push-pull signal is stabilized, and at the same time, an offset generated by positional deviation of the spot to a signal light tangent direction can be decreased at substantially an equivalent level as, compared with when the push-pull signal is normalized by the signal of a total beam diameter. Therefore, there is no problem in manufacturing the optical drive device.

In the optical drive device described above, widths of the first A, first B, second A, second B, third A, and third B signal-light receiving areas in a signal light tangent direction can be mutually the same. According to this, the offset amount can be decreased in the same condition for each normalized push-pull signal.

In each of the optical drive devices described above, the optical detector has one or plural stray-light receiving areas arranged to be able to receive stray light as reflection light in a layer other than a layer to be accessed. The tracking-error signal generator has a first corrector that corrects at least one of the first push-pull signal and the first sum signal based on each light receiving amount in at least apart of the one or plural stray-light receiving areas, and can generate the first normalized push-pull signal by using each signal after correction by the first corrector. According to this, the offset amount generated in the tracking error signal by stray light can be decreased.

In this optical drive device, the one or plural stray-light receiving areas include first A and second A stray-light receiving areas provided at both sides of the first signal-light receiving surface in a signal light radial direction. Widths and positions of the first A and first B signal-light receiving areas and the first A and second A stray-light receiving areas in a signal light tangent direction are the same. The first corrector can correct at least one of the first push-pull signal and the first sum signal based on each light receiving amount in the first A and second A stray-light receiving areas. According to this, influence of a record boundary appearing in the stray light appears substantially equally in the first A and second A signal-light receiving areas and the first A and second A stray-light receiving areas. Therefore, even when a record boundary appears in the stray light, an amount of an offset generated in the tracking error signal can be decreased.

In the optical drive device described above, the optical detector has one or plural stray-light receiving areas arranged to be able to receive stray light as reflection light in a layer other than a layer to be accessed. The tracking-error signal generator has a first corrector that corrects at least one of the second push-pull signal and the second sum signal based on each light receiving amount in at least a part of the one or plural stray-light receiving areas, and can generate the second normalized push-pull signal by using each signal after correction by the first corrector. According to this, the offset amount generated in the tracking error signal by stray light can be also decreased when the differential push-pull method is used.

In this optical drive device, the one or plural stray-light receiving areas include third A and fourth A stray-light receiving areas provided at both sides of the second signal-light receiving surface in a signal light radial direction, and fifth A and sixth A stray-light receiving areas provided at both sides of the third signal-light receiving surface in a signal light radial direction. Widths and positions of the second A and second B signal-light receiving areas and the third A and fourth A stray-light receiving areas in a signal light tangent direction are the same. Widths and positions of the third A and third B signal-light receiving areas and the fifth A and sixth A stray-light receiving areas in a signal light tangent direction are the same. The first corrector can correct at least one of the second push-pull signal and the second sum signal based on each light receiving amount in the third A, fourth A, fifth A, and sixth A stray-light receiving areas. According to this, influence of a record boundary appearing in each stray light appears substantially equally in the second A and second B signal-light receiving areas and the third A and fourth A stray-light receiving areas, the third A and third B signal-light receiving areas and the fifth A and sixth A stray-light receiving areas, respectively. Therefore, even when a record boundary appears in the stray light, an amount of an offset generated in the tracking error signal can be decreased.

Alternatively, in the optical drive device described above, the one or plural stray-light receiving areas include a seventh A stray-light receiving area provided between the first signal-light receiving surface and the second signal-light receiving surface, an eighth A stray-light receiving area provided between the first signal-light receiving surface and the third signal-light receiving surface, a third A stray-light receiving area provided at the opposite side of the seventh stray-light receiving area sandwiching the second signal-light receiving surface, and a sixth A stray-light receiving area provided at the opposite side of the eighth stray-light receiving area sandwiching the third signal-light receiving surface. Widths and positions of the second A and second B signal-light receiving areas and the seventh A and third A stray-light receiving areas in a signal light tangent direction are the same. Widths and positions of the third A and third B signal-light receiving areas and the eighth A and sixth A stray-light receiving areas in a signal light tangent direction are the same. The tracking-error signal generator has a first corrector that corrects at least one of the second push-pull signal and the second sum signal based on each light receiving amount in the seventh A, eighth A, third A, and sixth A stray-light receiving areas, and can generate the second normalized push-pull signal by using each signal after correction by the first corrector. According to this, influence of a record boundary appearing in the stray light appears substantially equally in the second A, second B, third A, and third B signal-light receiving areas and seventh A, eighth A, third A, and sixth A stray-light receiving areas. Therefore, even when a record boundary appears in the stray light, an amount of an offset generated in the tracking error signal can be decreased.

In each of the optical drive devices described above, the first signal-light receiving surface further has first C and first D signal-light receiving areas provided respectively at both sides of the first A signal-light receiving area in a signal light tangent direction, and first E and first F signal-light receiving areas provided respectively at both sides of the first B signal-light receiving area in a signal light tangent direction. The tracking-error signal generator has a second corrector that corrects the first normalized push-pull signal based on each light receiving amount in the first C and first D signal-light receiving areas and the first E and first F signal-light receiving areas, and can generate the tracking error signal by using the first normalized push-pull signal after correction by the second corrector. According to this, even when a spot of the signal light is deviated to a signal light tangent direction, a preferred first normalized push-pull signal can be obtained.

In each of the optical drive devices described above, an addition signal of each light receiving amount in the first A and first B signal-light receiving areas can be used as a pull-in signal used at the time of performing focus servo. According to this, when a multilayer optical disk is used, interlayer division of pull-in signals becomes easy. Therefore, focus servo is stabilized, and a signal in each focusing surface can be detected easily.

In each of the optical drive devices described above, the first signal-light receiving surface further has first C and first D signal-light receiving areas provided at both sides of the first A signal-light receiving area in a signal light tangent direction, respectively, and a predetermined distance away from the first A signal-light receiving area, and first E and first F signal-light receiving areas provided at both sides of the first B signal-light receiving area in a signal light tangent direction, respectively, and a predetermined distance away from the first B signal-light receiving area. The tracking-error signal generator can generate a first push-pull signal and a first sum signal based on each light receiving amount in the first A and first B signal-light receiving areas, generate a fifth push-pull signal and a fifth sum signal based on each light receiving amount in the first C to first E signal-light receiving areas, and generate a tracking error signal by normalizing the first and fifth push-pull signals by at least one of the first and fifth sum signals, respectively. According to this, a tracking error signal having small noise and offset can be generated by using an advantage of the first A and first B signal-light receiving areas receiving light near the center of the spot, and by using an advantage of the first C to first F signal-light receiving areas receiving light near an external edge of the spot.

According to another aspect of the present invention, the optical drive device includes: a diffraction grating that divides an optical beam irradiated to a multilayered optical disk into zero-order diffracted light and ±first-order diffracted light; and an optical detector having a second signal-light receiving surface formed point-symmetrically to a spot center of reflection light of the plus-first-order diffracted light, and line-symmetrically to a straight line passing through the spot center and parallel with a signal light tangent direction, and further divided into second A and second B signal-light receiving areas by the straight line, and a third signal-light receiving surface formed point-symmetrically to a spot center of reflection light of the minus-first-order diffracted light, and line-symmetrically to a straight line passing through the spot center and parallel with a signal light tangent direction, and further divided into third A and third B signal-light receiving areas by the straight line. The second signal-light receiving area and the third A signal-light receiving area correspond to areas at the same side, with each corresponding one of the straight lines as a boundary. The second B signal-light receiving area and the third B signal-light receiving area correspond to areas at the same side, with each corresponding one of the straight lines as a boundary. The optical drive device includes a tracking-error signal generator that generates a second push-pull signal based on each light receiving amount in the second A, second B, third A, and third B signal-light receiving areas, and generates a tracking error signal based on the second push-pull signal. Each width of the second A, second B, third A, and third B signal-light receiving areas in a signal light tangent direction is smaller than a diameter of the spot. According to this, an offset of the tracking error signal TE generated by interference between stray light of the main beam MB and the sub beams SB1 and SB2 in the second A, second B, third A, and third B signal-light receiving areas can be decreased.

In the optical drive device described above, the tracking-error signal generator can generate a second sum signal based on a light receiving amount in the second A, second B, third A, and third B signal-light receiving areas, generate a second normalized push-pull signal by normalizing the second push-pull signal by using the second sum signal, and generate a tracking error signal based on the second normalized push-pull signal. According to this, when the differential push-pull method is used, an offset of the second normalized push-pull signal can be decreased.

In the optical drive device described above, the tracking-error signal generator can generate a third sum signal based on each light receiving amount in the second A and second B signal-light receiving areas, generate a third normalized push-pull signal by normalizing a component based on each light receiving amount of the second A and second B signal-light receiving areas in the second push-pull signal by using the third sum signal, generate a fourth sum signal based on each light receiving amount in the third A and third B signal-light receiving areas, generate a fourth normalized push-pull signal by normalizing a component based on each light receiving amount in the third A and third B signal-light receiving areas of the second push-pull signal by using the fourth sum signal, and generate the tracking error signal based on the third and fourth normalized push-pull signals. According to this, when the differential push-pull method is used, an offset of the third and fourth normalized push-pull signals can be decreased.

According to still another aspect of the present invention, the optical drive device includes: a diffraction grating that divides an optical beam irradiated to a multilayered optical disk into zero-order diffracted light and ±first-order diffracted light; and an optical detector having a first signal-light receiving surface formed point-symmetrically to a spot center of reflection light of the zero-order diffracted light, and line-symmetrically to a straight line passing through the spot center and parallel with a signal light tangent direction, and further including first A and first B signal-light receiving areas divided at mutually opposite sides with a predetermined distance from the straight line, a second signal-light receiving surface formed point-symmetrically to a spot center of reflection light of the plus-first-order diffracted light, and line-symmetrically to a straight line passing through the spot center and parallel with a signal light tangent direction, and further including second A and second B signal-light receiving areas divided at mutually opposite sides with a predetermined distance from the straight line, and a third signal-light receiving surface formed point-symmetrically to a spot center of reflection light of the minus-first-order diffracted light, and line-symmetrically to a straight line passing through the spot center and parallel with a signal light tangent direction, and further including third A and third B signal-light receiving areas divided at mutually opposite sides with a predetermined distance from the straight line. The second A and third A signal-light receiving areas correspond to areas at the same side as the first A signal-light receiving area, with each corresponding one of the straight lines as a boundary, and the second B and third B light receiving areas correspond to areas at the same side as the first B signal-light receiving area, with each corresponding one of the straight lines as a boundary. The optical drive device includes a normalized-signal generator generates a sum signal by using a total of the light receiving amount in the first A, second A, and third A signal-light receiving areas and a total of the light receiving amount in the first B, second B, and third B signal-light receiving areas, and a tracking-error signal generator that generates a tracking error signal by using the normalized signal.

According to the present invention, an offset is canceled within the sum signal. Therefore, when a light receiving surface not using a vicinity of the center is used, an offset generated in the tracking error signal by the lens shift can be decreased.

In the optical drive device described above, the normalized-signal generator can generate a first difference signal by subtracting a total of the light receiving amount in the second A and third A signal-light receiving areas from the light receiving amount in the first A signal-light receiving area, and a first sum signal by totaling the light receiving amount in the first A, second A, and third A signal-light receiving areas, generate a first normalized signal by normalizing the first difference signal by using the first sum signal, generate a second difference signal by subtracting a total of the light receiving amount in the second B and third B signal-light receiving areas from the light receiving amount in the first B signal-light receiving area, and a second sum signal by totaling the light receiving amount in the first B, second B, and third B signal-light receiving areas, and generate a second normalized signal by normalizing the second difference signal by using the second sum signal. The tracking-error signal generator can generate the tracking error signal by using the first normalized signal and the second normalized signal. The normalized-signal generator can generate a third difference signal by subtracting a total of the light receiving amount in the first B, second A, and third A signal-light receiving areas from a total of the light receiving amount in the first A, second B, and third B signal-light receiving areas, and a third sum signal by totaling the light receiving amount in the first A, second B, third B, first B, second A, and third A signal-light receiving areas, and generate a third normalized signal by normalizing the third difference signal by using the third sum signal. The tracking-error signal generator can generate the tracking error signal by using the third normalized signal.

In the optical drive device described above, an isolation distance between the first A and first B signal-light receiving areas, an isolation distance between the second A and second B signal-light receiving areas, and an isolation distance between the third A and third, B signal-light receiving areas are mutually the same. Each of the isolation distances can be determined to make amplitude of the tracking error signal a polar maximum value. Further, each isolation distance can be near 80% of a spot diameter of reflection light of the zero-order diffracted light.

In the optical drive device described above, an isolation distance between the first A and first B signal-light receiving areas, an isolation distance between the second A and second B signal-light receiving areas, and an isolation distance between the third A and third B signal-light receiving areas are mutually the same. Each of the isolation distances can be determined to make a variation width of amplitude of the tracking error signal at the lens shift time a polar minimum value. Further, each isolation distance can be near 50% of a spot diameter of reflection light of the zero-order diffracted light.

According to still another aspect of the present invention, the optical drive device includes: a laser light source; a diffraction grating through which an optical beam passes from the laser light source; an optical detector having a main-beam receiving surface, a plus-first-order sub-beam receiving surface, and a minus-first-order sub-beam receiving surface receiving respectively zero-order diffracted light, plus-first-order diffracted light, and minus-first-order diffracted light of the optical beam obtained by diffraction of the diffraction grating; and a tracking-error signal generator that generates a tracking error signal based on a light receiving amount of the optical beam received in each of the receiving surfaces. Each of the light receiving surfaces is formed point-symmetrically to a spot center of a corresponding one of the diffracted light, and line-symmetrically to a straight line passing through the spot center and parallel with a signal light tangent direction, and is further divided into two signal-light receiving areas by the straight line. The tracking-error signal generator generates a main push-pull signal based on a light receiving amount at a portion of a width W1 at the center of a signal light tangent direction in the main-beam receiving surface, generates a sub push-pull signal based on a light receiving amount at a portion of a width W2 at the center of a signal light tangent direction in the ±first-order sub-beam receiving surfaces, and generates the tracking error signal based on the main push-pull signal and the sub push-pull signal. At least one of the width W1 and the width W2 is smaller than 100% of a diameter of a corresponding spot.

According to the present invention, as shown in FIGS. 26 and 27 described later, as compared with when both the width W1 and the width W2 are equal to or larger than a diameter of the spot, an offset (a TE offset) generated in the tracking error signal becomes small. As the TE offset, an offset by interference between the signal light and stray light (see FIG. 28 described later) is dominant. Therefore, influence given to tracking servo by the interference offset can be decreased.

The widths W1 and W2 can be determined by a width of the light receiving surface, or can be determined by a light receiving area not formed with a light shielding film, by forming a light shielding film on the light receiving surface.

In the optical drive device described above, at least one of the width W1 and the width W2 can be equal to or smaller than 70% of a diameter of a corresponding spot.

Normally, the assembly offset described above occurs due to a deviation of a positional relationship between a spot of the optical beam and the optical detector to a signal light radial direction. However, when each width of first to sixth signal-light receiving areas in a signal light tangent direction is smaller than a diameter of the spot, a deviation to the signal light tangent direction also becomes a cause of the assembly offset. According to the present invention, as shown in FIG. 29 described later, even when a positional deviation is present in a signal light tangent direction, the TE offset including the assembly offset can be made small as compared with when both the width W1 and the width W2 are equal to or larger than the diameter of the spot. Therefore, influence given to tracking servo by the increase of offsets due to the assembly offset can be decreased.

In the optical drive device described above, the tracking-error signal generator can generate a main sum signal based on a light receiving amount at a portion of the width W1 at the center of a signal light tangent direction in the main-beam receiving surface, generate a sub sum signal based on a light receiving amount at a portion of the width W2 at the center of a signal light tangent direction in the ±first-order sub-beam receiving surfaces, and generate the tracking error signal also based on the main sum signal and the sum signal. The tracking-error signal generator can generate the tracking error signal by dividing a differential push-pull signal obtained by subtracting a signal obtained by amplifying the sub push-pull signal by a predetermined first amplification factor from the main push-pull signal, by a normalization sum signal obtained by adding a signal obtained by amplifying the sub sum signal by a predetermined second amplification factor to the main sum signal. Further, the tracking-error signal generator can generate the tracking error signal based on a normalized main push-pull signal obtained by normalizing the main push-pull signal by the main sum signal, and based on a normalized sub push-pull signal obtained by normalizing the sub push-pull signal by the sub sum signal.

The optical drive device further includes a total-sum signal generator that generates a total sum signal based on a light receiving amount of the optical beam received in the light receiving surface. The total-sum signal generator can generate a total sum signal based on a light receiving amount at a portion of a width W3 at the center of a signal light tangent direction in the main-beam receiving surface, and the width W3 can be equal to or smaller than 160% of a diameter of a spot of the zero-order diffracted light.

In the optical drive device described above, the width W3 can be equal to or smaller than a diameter of a spot of the zero-order diffracted light.

According to still another aspect of the present invention, the optical drive device includes: a laser light source; an optical detector having a light receiving surface receiving an optical beam from the laser light source; and a total-sum signal generator that generates a total sum signal based on the light receiving amount of the optical beam received in the light receiving surface. The light receiving surface is formed point-symmetrically to a spot center of the optical beam, and line-symmetrically to a straight line passing through the spot center and parallel with a signal light tangent direction. A width of the light receiving surface in a signal light tangent direction is equal to or smaller than 160% of a diameter of a spot of the optical beam.

The pull-in signal mentioned above is a kind of a total sum signal. According to the present invention, as shown in FIG. 39 described later, a vale (a minimum portion) of a pull-in signal when a focus position of the optical beam moves between the recording layers can be secured. Therefore, layer recognition by the pull-in signal becomes possible regardless of variation of reflectance ratios between recording layers of the multilayered optical disk.

In the optical drive device, a width of the light receiving surface in a signal light tangent direction can be equal to or smaller than a diameter of a spot of the optical beam.

According to this, as shown in FIG. 39 described later, an isolation index between pull-in signal layers ($\Delta 2/\Delta 1 \times 100$) can be stabilized regardless of a width of a light receiving area in a signal light tangent direction used to generate the pull-in signal. Therefore, layer recognition by the pull-in signal can be stabilized.

By using only a center portion of the light receiving area, both a signal light component and a stray light component can be decreased in the pull-in signal, and interlayer isolation is facilitated. Because the laser light is in a Gaussian distribution, a beam of signal light has stronger intensity toward the center portion. On the other hand, a distribution of stray light is substantially uniform. Therefore, isolation becomes easier as the center width is made smaller. That is, an S (signal light)/N (stray light) ratio is improved. The RF signal normally becomes a total sum signal which is the same as the pull-in signal. Similarly, it is convenient to use a center portion for the RF signal, from the viewpoint of the S/N ratio including noise. When a width of the center portion is smaller than a spot diameter, the interlayer isolation is stabilized regardless of a center width, and this is preferable.

In a ROM disk, a DPD method (a differential phase detection method) is used as a tracking control method. For example, in a quartered main light receiving area shown in FIG. 57, a phase difference between $I_{111A}$ and $I_{111B}$ and a phase difference between $I_{111C}$ and $I_{111D}$ are detected respectively, and tracking control is performed to set a total of these phase differences to zero. In FIG. 22, tracking control is similarly performed by detecting a phase difference between $I_{1Ba}$ and $I_{1Aa}$, a phase difference between $(I_{1Ea}+I_{1Ia})$ and $(I_{1Ca}+I_{1Ga})$, and a phase difference between $(I_{1Fa}+I_{1Ja})$ and $(I_{1Da}+I_{1Ha})$. Tracking control can be also performed by detecting only a phase difference between $(I_{1Ea}+I_{1Ia})$ and $(I_{1Ca}+I_{1Ga})$ and a phase difference between $(I_{1Fa}+I_{1Ja})$ and $(I_{1Da}+I_{1Ha})$ at a portion other than the center portion, or at only the center portion. Tracking control can be performed by the configuration shown in FIG. 36, in a similar manner to that of FIG. 57.

According to still another aspect of the present invention, the optical drive device includes: a laser light source; a diffraction grating through which an optical beam passes from the laser light source; an optical detector having a main-beam receiving surface, a plus-first-order sub-beam receiving surface, and a minus-first-order sub-beam receiving surface receiving respectively zero-order diffracted light, plus-first-order diffracted light, and minus-first-order diffracted light of the optical beam obtained by diffraction of the diffraction grating; and a tracking-error signal generator that generates a tracking error signal based on the light receiving amount of the optical beam received in each of the receiving surfaces. Each of the light receiving surfaces is formed point-symmetrically to a spot center of a corresponding one of the diffracted light, and line-symmetrically to a straight line passing through the spot center and parallel with a signal light tangent direction. The main-beam receiving surface is divided into first and second signal-light receiving areas isolated by a predetermined distance to mutually opposite directions from the corresponding straight line. The plus-first-order sub-beam receiving surface is divided into third and fourth signal-light receiving areas isolated by a predetermined distance to the same direction as the first and second signal-light receiving areas from the corresponding straight line. The minus-first-order sub-beam receiving surface is divided into fifth and sixth signal-light receiving areas isolated by a predetermined distance to the same direction as the first and second signal-light receiving areas from the corresponding straight line. The tracking-error signal generator generates a main push-pull signal and a main sum signal based on a light receiving amount at a portion excluding a portion of a width W4 at both sides respectively of the corresponding straight line in the main-beam receiving surface, generates a sub push-pull signal and a sub sum signal based on a light receiving amount at a portion excluding a portion of a width W5 at both sides respectively of each of the corresponding straight lines of the ±first-order sub-beam receiving surfaces, and generates the tracking error signal by dividing a differential push-pull signal obtained by subtracting a signal obtained by amplifying the sub push-pull signal by a predetermined first amplification factor from the main push-pull signal, by a normalization sum signal obtained by adding a signal obtained by amplifying the sub sum signal by a predetermined second amplification factor to the main sum signal. The second amplification factor is larger than 1.

The widths W4 and W5 can be determined by a width of the light receiving surface, or can be determined by forming a light shielding film on the light receiving surface.

According to the present invention, as shown in FIG. 45 described later, a variation of a sum signal following a track jump becomes small, as compared with when the second amplification factor is 1 as shown in Japanese Patent Application Laid-open No. H6-176381. Therefore, influence given to tracking servo by the sum signal offset can be decreased.

In the optical drive device, the second amplification factor can be determined not to generate a sum signal variation in the normalization sum signal, or can be determined to set a difference between a top hold value and a bottom hold value of a variation following a track jump of the normalization sum signal to become equal to or smaller than a predetermined threshold value, or can be determined to be substantially equal to a ratio of light intensity of the zero-order diffracted light to a total of light intensities of the plus-first-order diffracted light and the minus-first-order diffracted light.

If there is no influence of stray light, the setting of the second amplification factor equal to a ratio of light intensity of the zero-order diffracted light to a total of light intensities of the plus-first-order diffracted light and the minus-first-order diffracted light eliminates variation of the sum signal. However, because there is influence of stray light actually, when a value of the second amplification factor deviates from this ratio slightly, it becomes in a state that variation of the sum signal is eliminated. Accordingly, as a condition for minimizing the sum signal variation, the second amplification factor can be set equal to a ratio of light intensity of the zero-order diffracted light to a total of light intensities of the plus-first-order diffracted light and the minus-first-order diffracted light, or can beset to the same value as the first amplification factor determined in advance by a differential push-pull signal which is not normalized.

That is, when the second amplification factor is set equal to these values, a sum signal variation can be substantially decreased although there is a possibility of this variation remaining a little. Setting the second amplification factor to these values is expressed as substantially equal in the above.

Accordingly, as shown in FIG. 45 described later, a variation of the sum signal following a track jump becomes small. Therefore, influence given to tracking servo by the sum signal offset can be decreased.

An amplification factor determination method according to the present invention is a method of determining first and second amplification factors in an optical drive device including: a laser light source; a diffraction grating through which an optical beam passes from the laser light source; an objective lens that condenses the optical beam passed through the diffraction grating onto an optical disk recording surface; an optical detector having a main-beam receiving surface, a plus-first-order sub-beam receiving surface, and a minus-first-order sub-beam receiving surface receiving respectively zero-order diffracted light, plus-first-order diffracted light, and minus-first-order diffracted light of the optical beam obtained by diffraction of the diffraction grating; and a tracking-error signal generator that generates a tracking error signal based on the light receiving amount of the optical beam received in each of the receiving surfaces. Each of the light receiving surfaces is formed point-symmetrically to a spot center of a corresponding one of the diffracted light, and line-symmetrically to a straight line passing through the spot center and parallel with a signal light tangent direction. The tracking-error signal generator generates a main push-pull signal and a main sum signal based on a light receiving amount at a portion excluding a portion of a width W4 at both sides respectively of the corresponding straight line in the main-beam receiving surface, generates a sub push-pull signal and a sub sum signal based on a light receiving an amount at a portion excluding a portion of a width W5 at both sides of the corresponding straight line in the ±first-order sub-beam receiving surfaces, and generates the tracking error signal by dividing a differential push-pull signal obtained by subtracting a signal obtained by amplifying the sub push-pull signal by a predetermined first amplification factor from the main push-pull signal, by a normalization sum signal obtained by adding a signal obtained by amplifying the sub sum signal by a predetermined second amplification factor to the main sum signal. After determining the second amplification factor, the first amplification factor is determined by using the tracking error signal to which the determined second amplification factor is applied.

To remove a lens shift offset, in principle, a first amplification factor is preferably determined to set a variation intermediate value of a differential push-pull signal to zero while rotating the optical disk in a state of shifting an objective lens in a focused state (a state that focus servo is once completed, and the objective lens is focused on a recording surface). However, in place of the differential push-pull signal, a normalized tracking error signal is sometimes used because amplitude of the differential push-pull signal becomes small, to decrease offset and other reasons. In this case, when a sum signal variation occurs in the normalization sum signal, the "asymmetry of a push-pull waveform" described above appears in the tracking error signal. As a result, the first amplification factor cannot be correctly determined, and the "sum signal offset" described above occurs in the tracking error signal.

According to the present invention, because the first amplification factor is determined after the second amplification is determined, the first amplification factor can be determined by using a tracking signal generated based on a normalization sum signal generating no sum signal variation. Therefore, it is possible to prevent generation of a sum-signal offset in the tracking error signal.

The amplification factor determination method described above can include: a first step of obtaining the normalization sum signal while rotating the optical disk in a state of shifting the objective lens in an on-focus state, and determining the second amplification factor not to generate a sum signal variation in the normalization sum signal; and a second step of obtaining the tracking error signal by using the second amplification factor determined at the first step, while rotating the optical disk in a state of shifting the objective lens, and determining the first amplification factor to set a variation intermediate value of the tracking error signal to zero.

In the amplification factor determination method, at the first step, the second amplification factor can be determined to set a difference between a top hold value and a bottom hold value of a variation following a track jump of the normalization sum signal to become equal to or smaller than a predetermined threshold value.

BRIEF DESCRIPTION OF THE DRAWINGS

FIG. 3A shows an example of a signal light spot when there is no lens shift; and FIG. 3B shows an example of a signal light spot shifted by a maximum amount by a lens shift;

FIGS. 5A to 5E show each main beam and stray light a spot formed on a light receiving surface according to the embodiment when there is no lens shift;

FIGS. 6A to 6E show spots shifted to a constant direction by a lens shift corresponding to FIGS. 5A to 5E;

FIG. 44 is a plan view of an optical detector according to a second embodiment (B) of the present invention;

FIG. 54(a) shows an end surface of a cross section of the optical disk according to the background technique, and an optical beam (incident light, reflection light (zero-order diffracted light, ±first-order diffracted light)), and FIG. 54(b) shows a change of each output signal.

DETAILED DESCRIPTION OF THE EMBODIMENTS

First Embodiment

A first embodiment of the present invention is explained below in detail with reference to the accompanying drawings.

Figure 1:
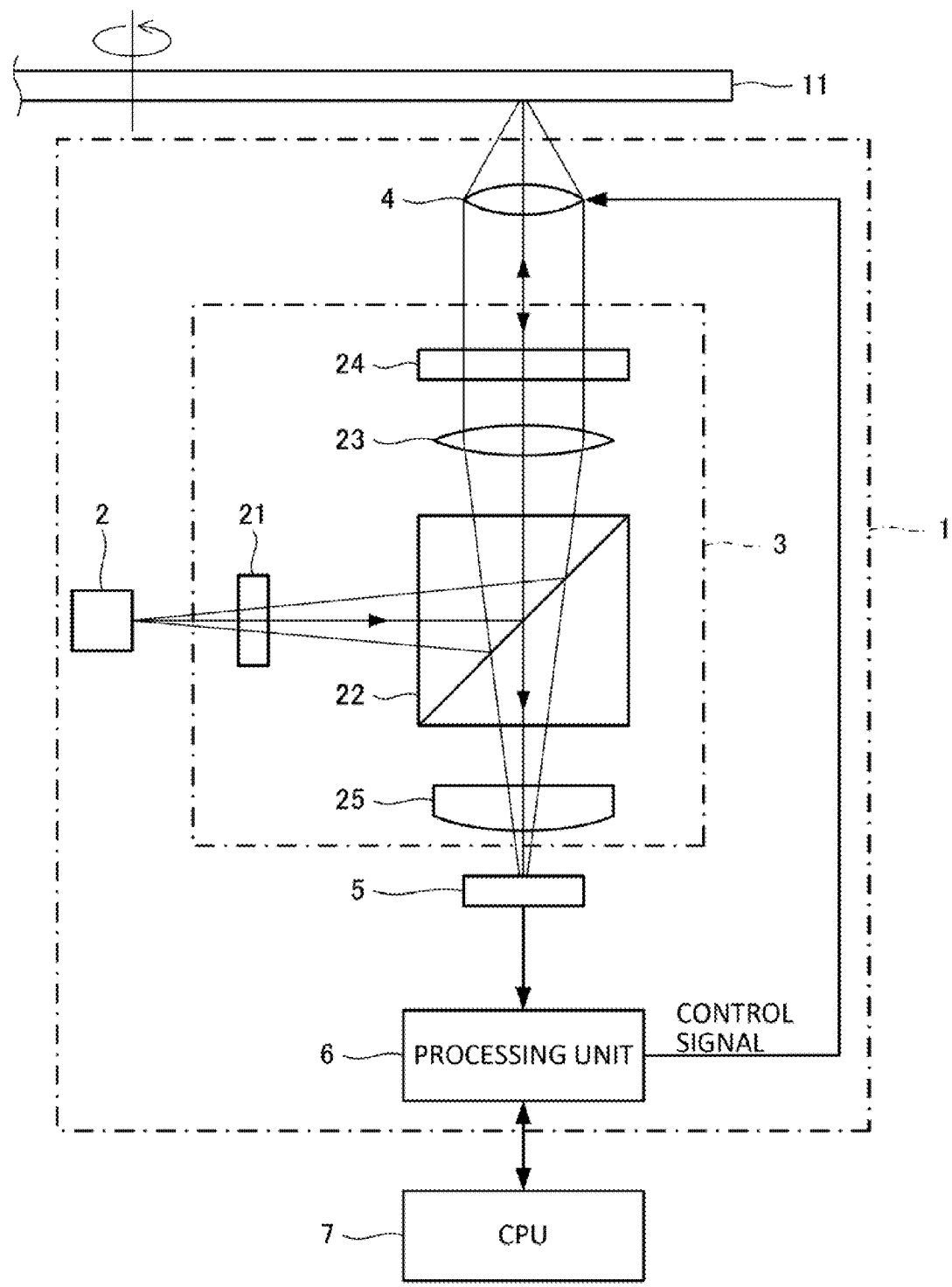
FIG. 1 is a schematic diagram of an optical drive device according to an embodiment of the present invention.

FIG. 1 is a schematic diagram of an optical drive device 1 according to the first embodiment.

The optical drive device 1 performs reproduction and recording of the optical disk 11. Various optical recording mediums such as a CD, a DVD, and a BD can be used for the optical disk 11. In the embodiment, particularly a disc-shaped optical disk having a multilayered recording surface using a multilayered film is used.

As shown in FIG. 1, the optical drive device 1 includes a laser light source 2, an optical system 3, an objective lens 4, an optical detector 5, and a processing unit 6. The laser light source 2, the optical system 3, the objective lens 4, and the optical detector 5 among these units constitute an optical pickup.

The optical system 3 includes a diffraction grating 21, a beam splitter 22, a collimator lens 23, a quarter-wave plate 24, and a sensor lens (a cylindrical lens) 25. The optical system 3 functions as an outward optical system that leads an optical beam generated by the laser light source 2 to the optical disk 11, and also functions as a returning optical system that leads a returned beam from the optical disk 11 to the optical detector 5.

First, in the outward optical system, the diffraction grating 21 decomposes the optical beam generated by the laser light source 2 into three beams (the main beam MB, the sub beam SB1, the sub beam SB2), and inputs the decomposed beams into the beam splitter 22 as P polarized light. The beam splitter 22 reflects the input P polarized light, and bends a proceeding path of the light to a direction of the optical disk 11. The collimator lens 23 changes the optical beam input from the beam splitter 22 to parallel light. The quarter-wave plate 24 changes the optical beam passing the collimator lens 23 into circularly-polarized light. The optical beam passing the quarter-wave plate 24 is incident to the objective lens 4.

Figure 55:
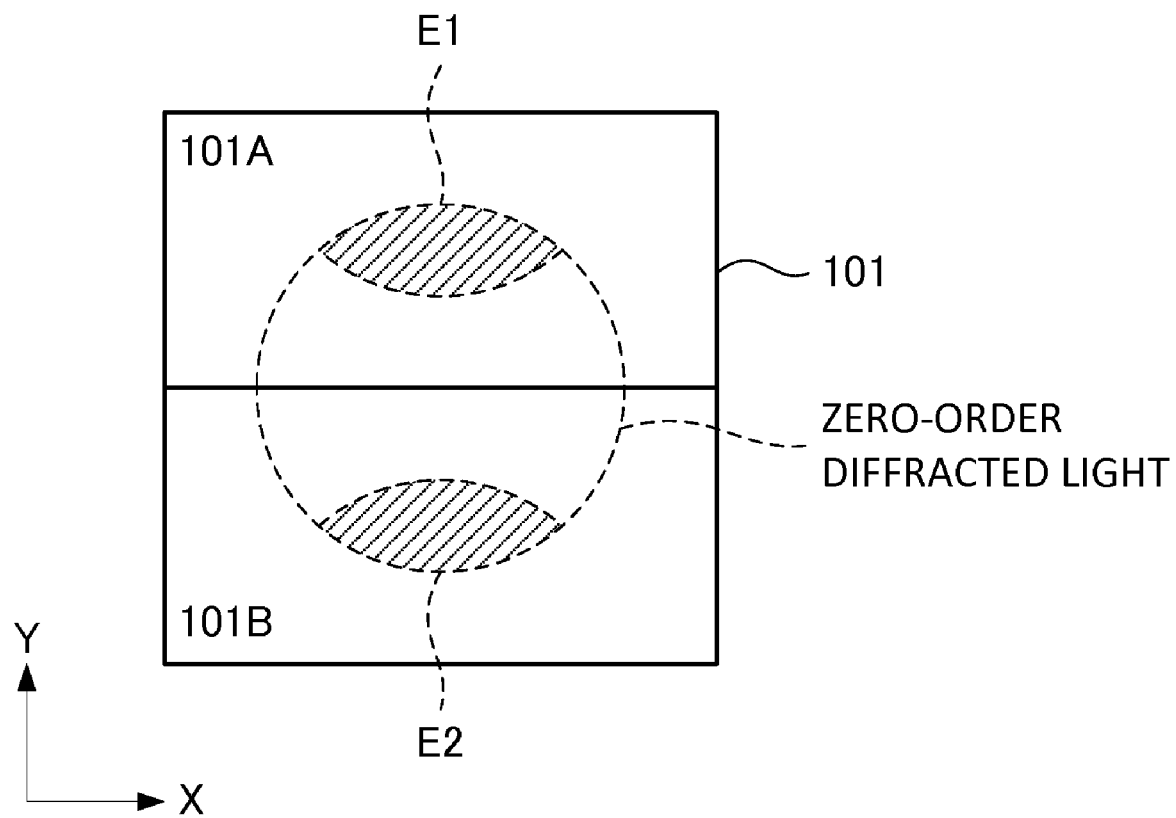
FIGS. 55 to 59 show a light receiving surface of an optical detector according to the background technique.
Figure 56:
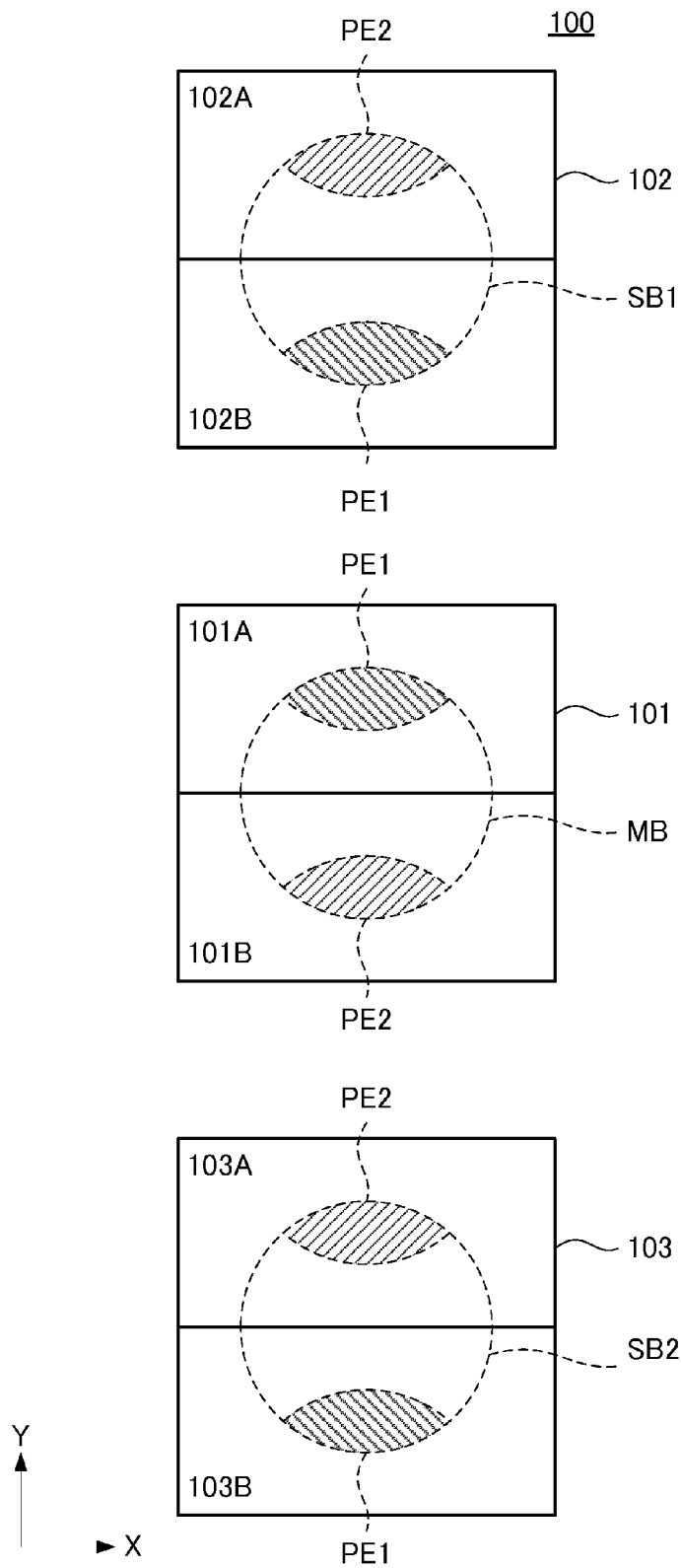

The objective lens 4 condenses the optical beam (the optical beam in a state of parallel light) input from the optical system 3 onto the optical disk 11, and returns the returned optical beam reflected from the recording surface of the optical disk 11 to the parallel light. This returned optical beam is diffracted on the recording surface, and is decomposed into zero-order diffracted light and ±first-order diffracted light, as explained with reference to FIGS. 54(a) and 54(b). The main beam MB, the sub beam SB1, the sub beam SB2 generate reflection light having a push-pull area as explained with reference to FIGS. 54 and 55.

Next, in the returning optical system, the optical beam that passes through the objective lens 4 and becomes S polarized light by reciprocating the quarter-wave plate 24 is incident to the collimator lens 23. The optical beam passing through the collimator lens 23 is incident to the beam splitter 22 while being condensed. The beam splitter 22 transmits the incident optical beam by 100%, and inputs this optical beam to the sensor lens 25 (the cylindrical lens). The sensor lens 25 gives astigmatism to the optical beam incident from the beam splitter 22. The optical beam to which the astigmatism is given is incident to the optical detector 5.

Figure 2:
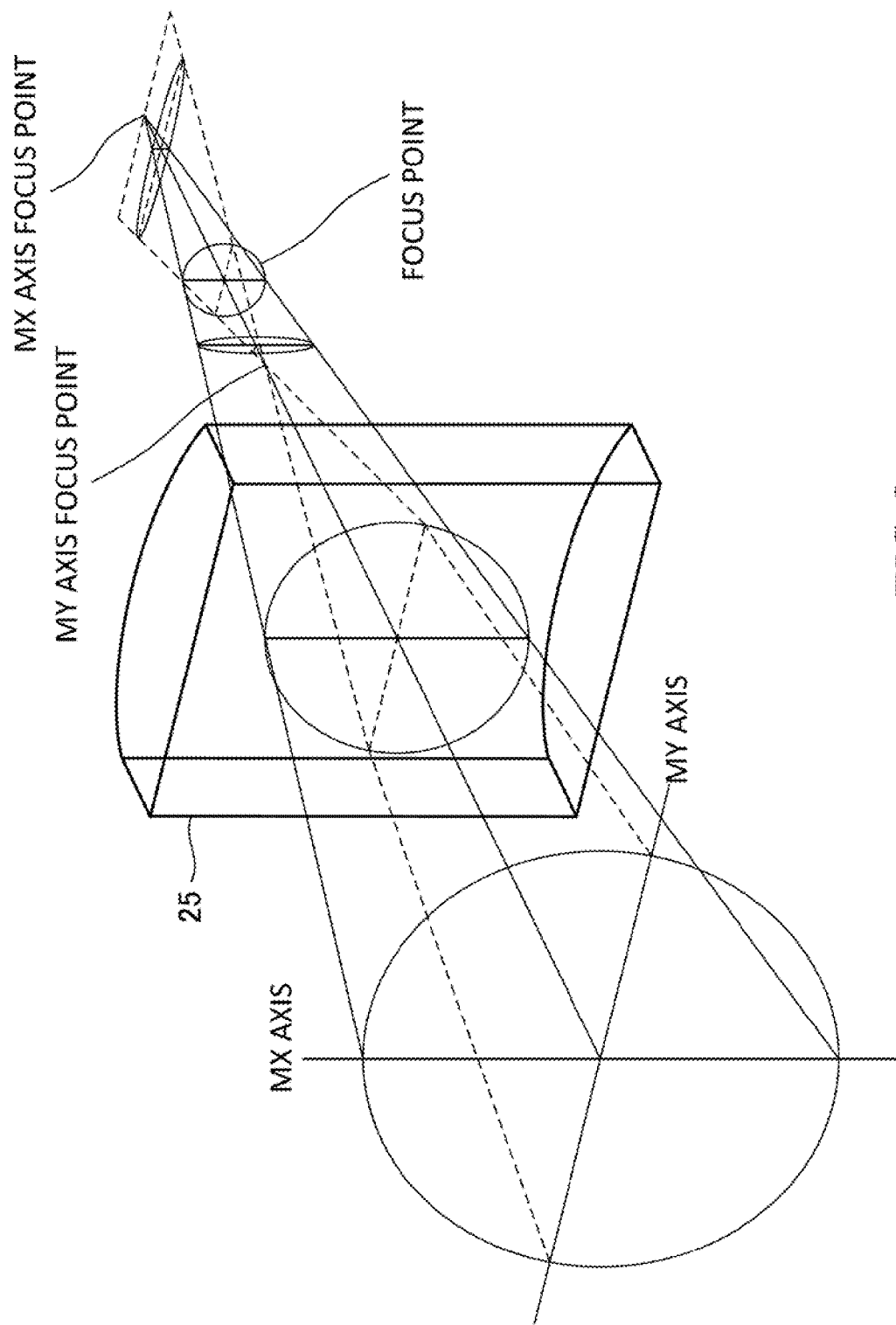
FIG. 2 is an explanatory diagram of astigmatism given by a sensor lens according to the embodiment.

FIG. 2 is an explanatory diagram of astigmatism given by the sensor lens 25. As shown in FIG. 2, the sensor lens 25 has a lens effect to only one direction (MY axis direction=child line direction). Therefore, a focus position of the optical system configured by the collimator lens 23 (FIG. 1) and the sensor lens 25 is different in the MY axis direction and in an MX axis direction (a mother line direction) as a direction perpendicular to the MY axis direction (MY axis focus point and an MX focus point shown in FIG. 2). A point at which a length of the optical beam in the MY axis direction is equal to a length of the optical beam in the MX axis direction is called "focus point".

In the optical drive device 1, position control of the objective lens 4 (focus servo) is performed to position on the optical detector 5 a focus point of an optical beam (a signal light) reflected from a layer (a layer to be accessed) on which light is to be focused. Conversely, a focus point of an optical beam (stray light) reflected from a layer other than a layer to be accessed is not positioned on the optical detector 5. A spot (a stray light spot) formed on the optical detector 5 by stray light has a shape spread to at least one of the MY axis direction and the MX axis direction, as compared with a spot (a signal light spot) formed on the optical detector 5 by the signal light.

Referring back to FIG. 1, the optical detector 5 is set on a plane surface orthogonal with an optical path of the returned optical beam emitted from the optical system 3. The optical detector 5 includes many light receiving surfaces, and each light receiving surface is divided into many light receiving areas. In the optical drive device 1, by suitably combining these light receiving areas, various signals such as the focus error signal FE, the total sum signal (the pull-in signal PI, the RF signal RF), and the tracking error signal TE can be generated by various generation processes. Details thereof are described later.

The processing unit 6 is configured by a DSP (Digital Signal Processor) including an A/D conversion function of converting an analog signal of many channels into digital data as an example. The processing unit 6 receives an output signal of the optical detector 5, and generates various signal such as the tracking error signal TE, the focus error signal FE, and the total sum signal (the pull-in signal PI, the RE signal RF). Details of the process performed by the processing unit 6 are also described later.

A CPU 7 is a processing device incorporated in a computer, a DVD recorder or the like, and transmits an instruction signal to specify an access position on the optical disk 11 to the processing unit 6, via an interface (not shown). The processing unit 6 receives this instruction signal, and controls the objective lens 4 to shift this lens in parallel with the surface of the optical disk 11 (the shift is called "lens shift"), thereby achieving a track-on state (tracking servo). In the track-on state, the CPU 7 obtains an RF signal generated by the processing unit 6 (in the first embodiment, a total signal of a light receiving amount in each light receiving area within a main-beam receiving surface S1a described later) as a data signal.

A lens shift and stray light are explained in detail by using the optical detector (FIG. 55) according to the background technique. In the following explanations, the main beam MB is exclusively focused.

Figure 3A:
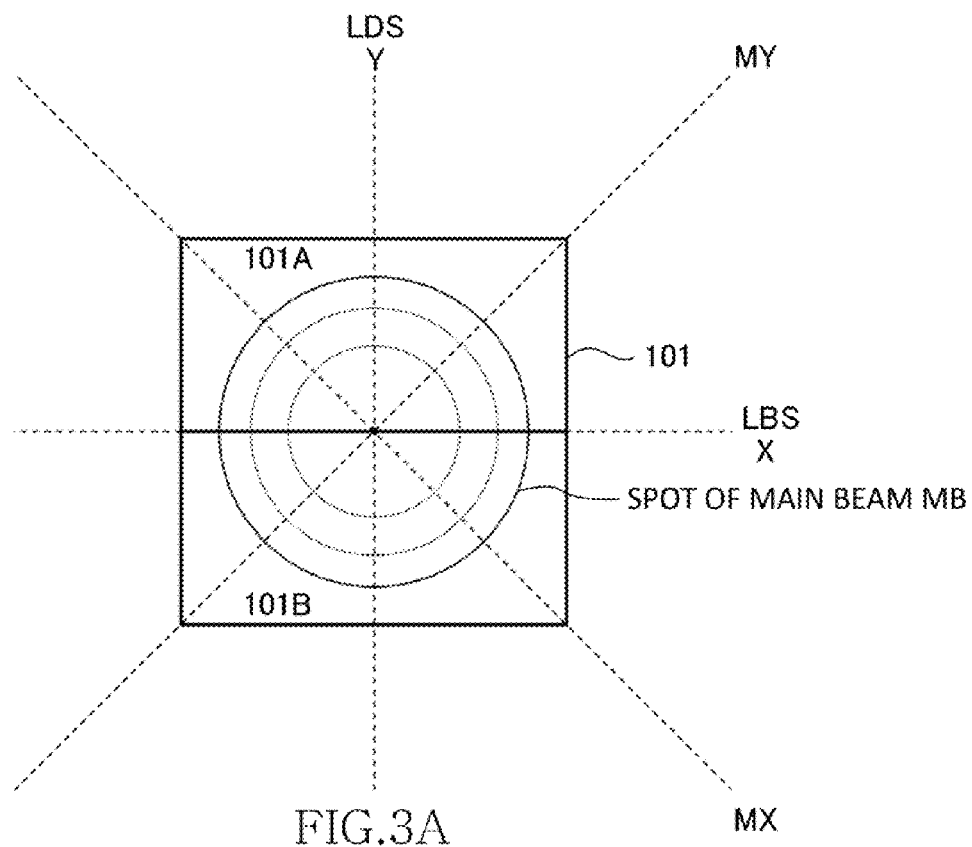
FIGS. 3A and 3B show a spot of a main beam MB irradiated to a light receiving surface of an optical detector by the background technique of the present invention; where
Figure 3B:
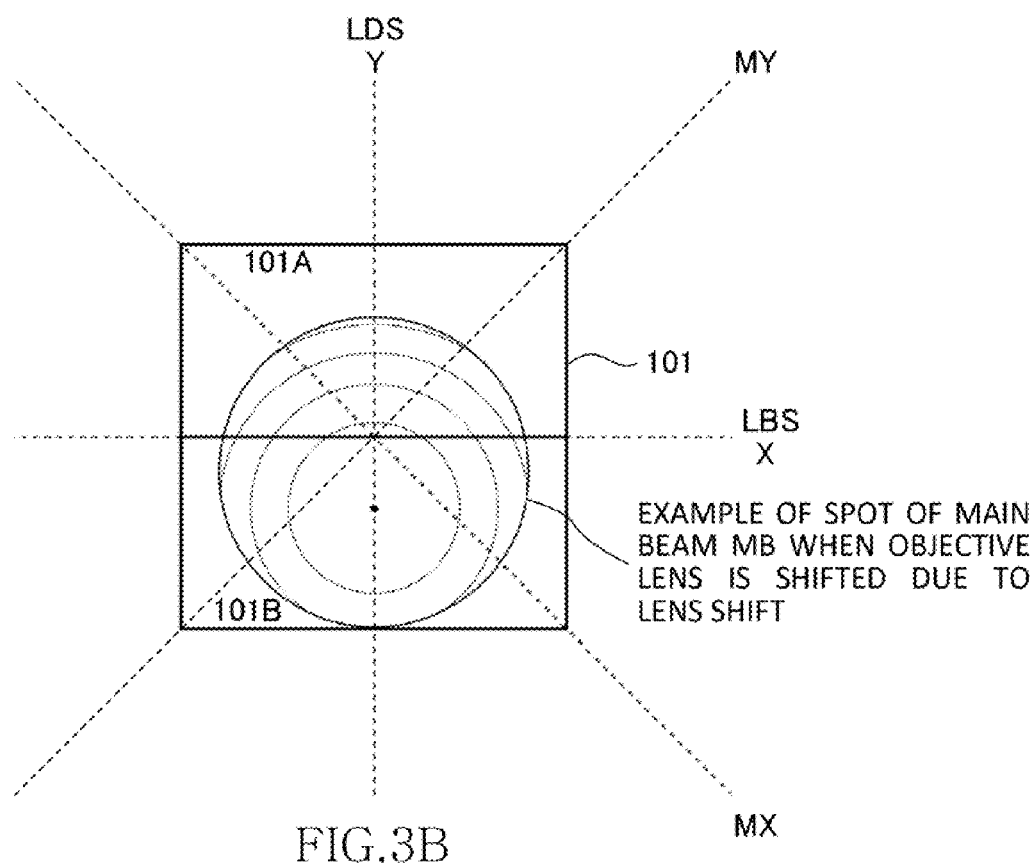

First, FIGS. 3A and 3B show a spot of the main beam MB irradiated to the light receiving surface 101 of the optical detector according to the background technique. In FIGS. 3A, 3B, FIGS. 5A to 5E, and FIGS. 6A to 6E described later, a contour line of light intensity is shown in the spot. The spot of the optical beam has directions corresponding to a tangent direction and a radial direction of the optical disk 11, respectively. In the following explanations, regarding the spot of the main beam MB, a direction corresponding to the tangent direction (signal light tangent direction) is called "X axis", and a direction corresponding to the radial direction (signal light radial direction) is called "Y axis".

The light receiving surface 101 is quadrate, and is formed point-symmetrically to a spot center of the main beam MB, and line-symmetrically to a straight line passing through the spot center and parallel with a signal light tangent direction (the X axis). The light receiving surface 101 is divided into the light receiving areas 101A and 101B by this straight line. Diagonal lines of the light receiving surface 101 coincide with the MX axis direction and the MY axis direction.

FIG. 3A shows an example of a signal light spot when there is no lens shift, and FIG. 3B shows a signal light spot that is shifted by a maximum amount by a lens shift. As shown in FIG. 3A, the spot of the main beam MB shifts to a Y axis direction following the lens shift. A size of the light receiving surface 101 is determined to make it possible to receive the entire spot of the main beam MB even when the spot shifts. In the following explanations, a shift direction of the spot by the lens shift is called "lens shift direction line LDS", and a line becoming a basis of a spot shift by the lens shift is called "lens shift base line LBS". The lens shift direction line LDS and the lens shift base line LBS are parallel with the Y axis and the X axis, respectively.

Figure 4:
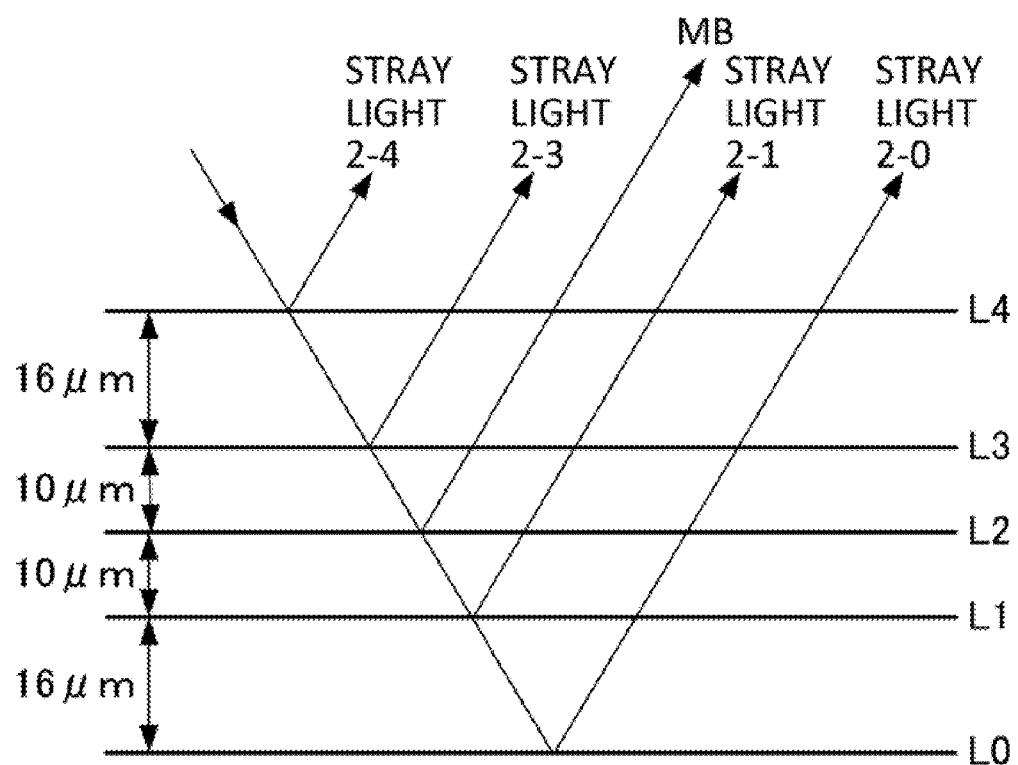
FIG. 4 shows an example of a layer structure of the optical disk according to the embodiment.

FIG. 4 shows an example of a layer structure of the optical disk 11. As shown in FIG. 4, the optical disk 11 in this example has a five-layer structure having layers L0 to L4 form a far side of the objective lens 4. Layer intervals are 16 μm, 10

μm, 10 μm, and 16 μm in this order starting from an interval between the layer L0 and the layer L1.

In the following explanations, when a layer to be accessed is Lx (in this case, x=0 to 4), stray light reflected from a layer Ly (in this case, y=0 to 4, y≠x) is expressed as stray light x-y, and a lens shift direction line and a lens shift base line of the spot of the stray light x-y are expressed as LDx-y and LBx-y, respectively.

An example that a layer to be accessed is the layer L2 is exclusively explained below.

FIGS. 5A to 5E show, for each main beam MB and stray light, a spot formed on the light receiving surface 101 when there is no lens shift (a shift amount of the objective lens 4 is 0). As shown in FIGS. 5A to 5E, a spot formed by each stray light is larger than a size of the light receiving surface 101, and stretches out greatly from the light receiving surface 101.

Among various shapes of stray light, spots of stray light 2-3 and stray light 2-4 have a larger spread to an MX axis direction than a spread to an MY axis direction. This is because the stray light 2-3 and stray light 2-4 form a spot on the optical detector at a position nearer to the sensor lens 25 than to the MY axis focus point (FIGS. 2A and 2B). The spot of the stray light 2-3 is smaller than the spot of the stray light 2-4. This is because the layer L3 is nearer to the layer L2 to be accessed, than the layer L4.

On the other hand, spots of stray light 2-1 and stray light 2-0 have a larger spread to an MY axis direction than a spread to an MX axis direction. This is because the stray light 2-1 and stray light 2-0 form a spot on the optical detector at a position farther from the sensor lens 25 than from the MX axis focus point (FIGS. 2A and 2B). The spot of the stray light 2-1 is smaller than the spot of the stray light 2-0. This is because the layer L1 is nearer to the layer L2 to be accessed, than the layer L0.

FIGS. 5A to 5E also show a lens shift direction line and a lens shift base line of each spot.

As shown in FIGS. 5A to 5E, a lens shift direction line and a lens shift base line of each spot of stray light are inclined, as compared with the lens shift direction line LDS and the lens shift base line LBS of the spots of the main beam MB, due to the influence of the sensor lens 25.

Specifically, as spot formation positions come closer to the sensor lens 25 than to the focus point in FIG. 2, both the lens shift direction line and the lens shift base line come closer to the MX axis, and coincide with the MX axis at the focus point at the MY axis side. When the spot formation positions come much closer to the sensor lens 25, the lens shift direction line and the lens shift base line are more inclined exceeding the MX axis (FIGS. 5A and 5B). On the other hand, as spot formation positions move farther from the sensor lens 25 than from the focus point, both the lens shift direction line and the lens shift base line come closer to the MY axis in FIG. 2, and coincide with the MY axis at the focus point at the MX axis side. When the spot formation positions move farther from the sensor lens 25, the lens shift direction line and the lens shift base line are more inclined exceeding the MY axis (FIGS. 5D and 5E).

The lens shift direction line and the lens shift base line are line-symmetrical about the mother line or the child line of the sensor lens 25.

FIGS. 6A to 6E are the spots shifted to a constant direction by a lens shift, corresponding to FIGS. 5A to 5E. As shown in FIGS. 6A to 6E, stray light spots also shift by the lens shift in a similar manner to the spots of the main beam MB. Intensity centers of the stray light spots (black-dots in the drawings) are positioned on the lens shift direction lines.

Figure 7A:
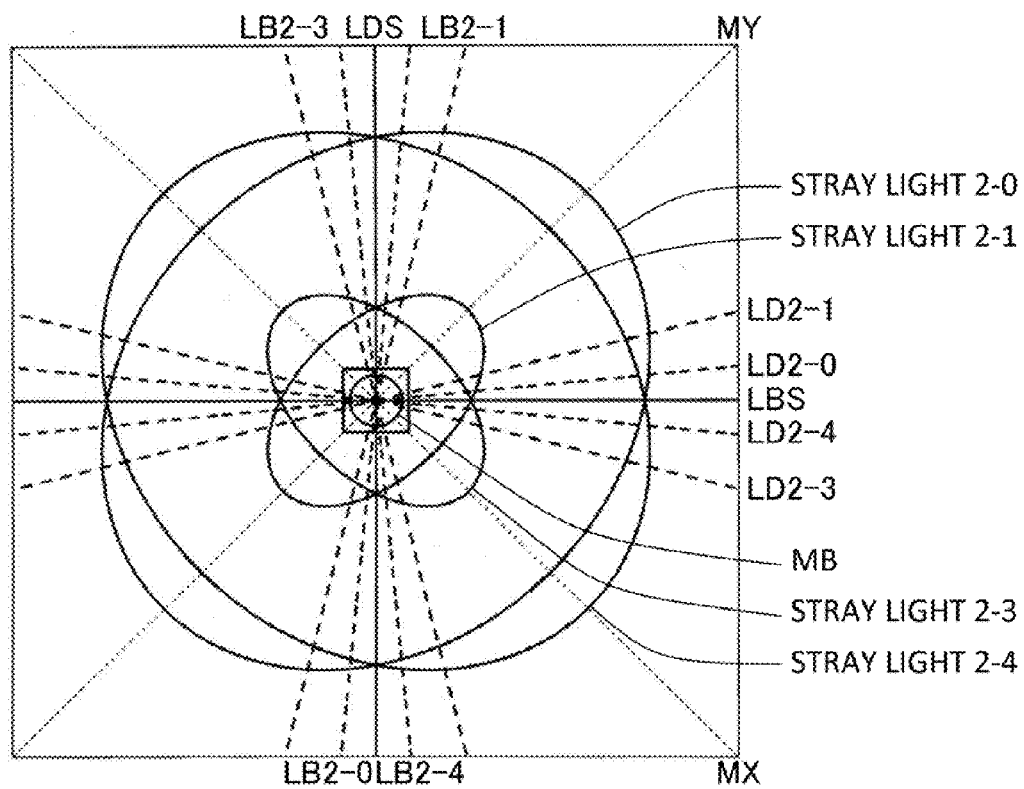
FIG. 7A is a diagram including spots of a main beam and stray light spots shown in FIGS. 5A to 5E, and their lens shift direction lines and lens shift base lines.
Figure 7B:
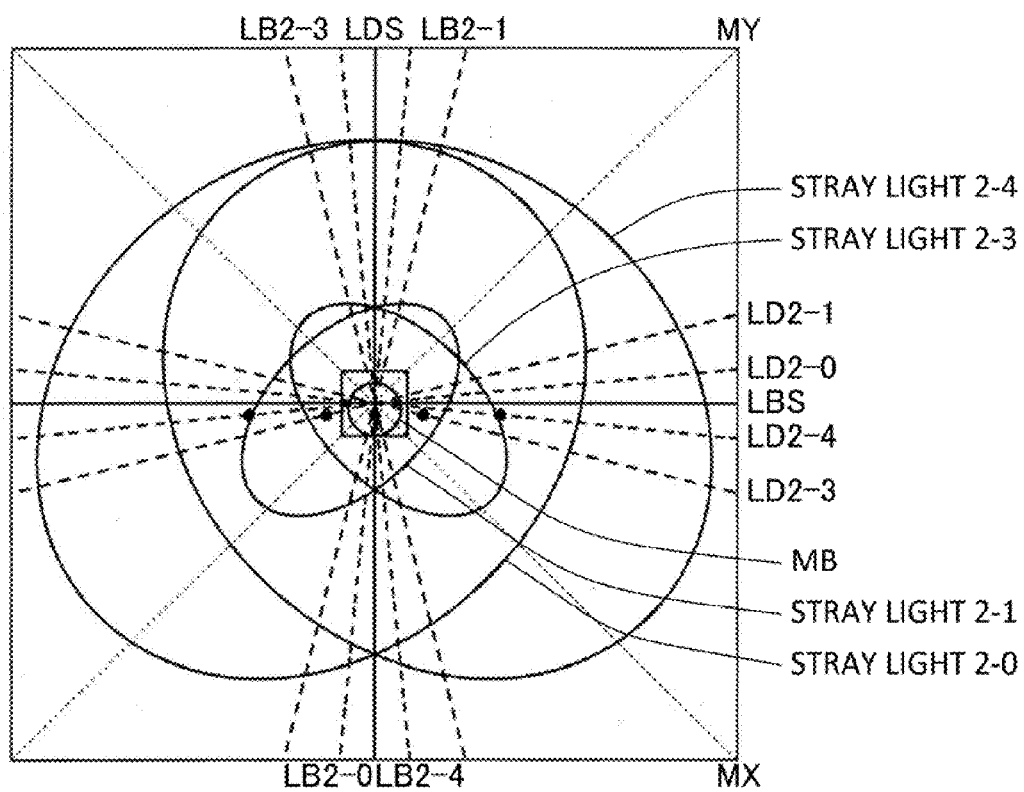
FIG. 7B is a diagram including spots of a main beam and stray light spots shown in FIGS. 6A to 6E, and their lens shift direction lines and lens shift base lines.

FIG. 7A is a diagram including spots of the main beam MB and stray light spots shown in FIGS. 5A to 5E, and their lens shift direction lines and lens shift base lines. Similarly, FIG. 7B is a diagram including spots of the main beam MB and stray light spots shown in FIGS. 6A to 6E, and their lens shift direction lines and lens shift base lines. In FIGS. 7A and 7B, contour lines are omitted. The spots are irradiated in superimposition on the optical detector 5, as shown in FIGS. 7A and 7B.

Details of the configuration of the optical detector 5 included in the optical drive device 1 according to the first embodiment and details of the process of the processing unit 6 are explained below.

Figure 8:
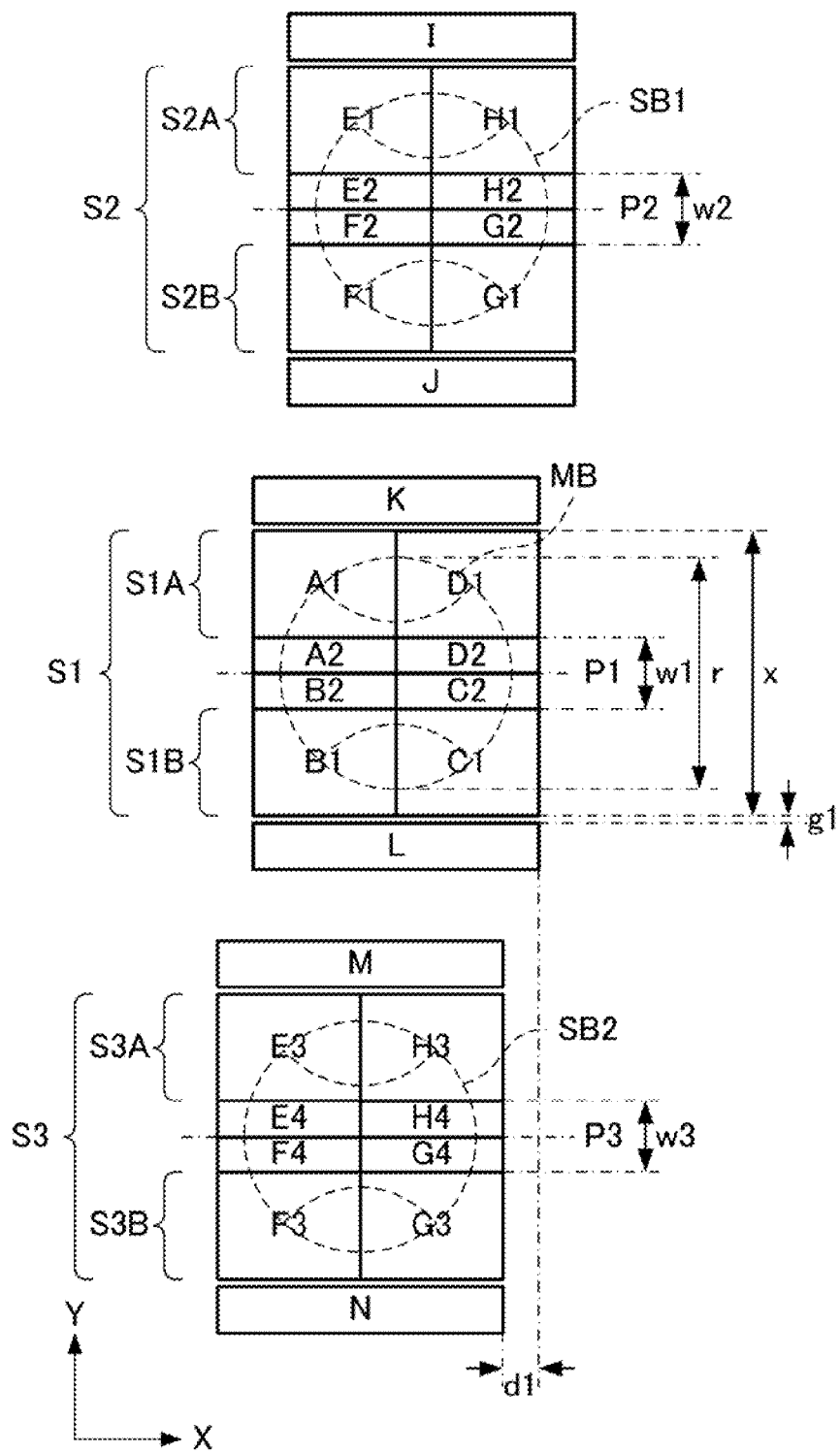
FIG. 8 is a plan view of an optical detector according to a first embodiment of the present invention.

FIG. 8 is a plan view of the optical detector 5 according to the first embodiment, and shows light receiving surfaces and light receiving areas. FIG. 8 also shows spots of signal light. As shown in FIG. 8, the optical detector 5 has nine light receiving surfaces including a main-beam receiving surface S1, sub-beam receiving surfaces S2 and S3, and stray-light receiving surfaces I to N.

The main-beam receiving surface S1 is a quadrate having x ($\geqq$ a spot diameter r≅50 μm) as a length of one side. The main-beam receiving surface S1 is formed point-symmetrically to a spot center of the main beam MB, and line-symmetrically to a straight line P1 passing through the spot center and parallel with a signal light tangent direction.

The main-beam receiving surface S1 further includes light receiving areas S1A and S1B provided in isolation at mutually opposite sides with a predetermined distance (=w1/2) from the straight line P1. The light receiving area S1A is equally divided into light receiving areas A1 and D1 by a division line provided at the center of a signal light tangent direction. Similarly, the light receiving area S1B is equally divided into light receiving areas B1 and C1 by a division line provided at the center of a signal light tangent direction.

A light receiving area A2 is provided between the light receiving area A1 and the straight line P1. A light receiving area B2 is provided between the light receiving area B1 and the straight line P1. A light receiving area C2 is provided between the light receiving area C1 and the straight line P1. A light receiving area D2 is provided between the light receiving area D1 and the straight line P1.

The sub-beam receiving area S2 is a quadrate having the same size as that of the main-beam receiving surface S1, is formed point-symmetrically to a spot center of reflection light of the sub beam SB1, and line-symmetrically to a straight line P2 passing through the spot center and parallel with a signal light tangent direction.

The sub-beam receiving surface S2 includes light receiving areas S2A and S2B provided in isolation at mutually opposite sides with a predetermined distance (=w2/2) from the straight line P2, in a similar manner to that of the main-beam receiving surface S1. The light receiving area S2A corresponds to the area of the same side as that of the light receiving area S1A, with the straight lines P1 and P2 as boundaries, respectively. The light receiving area S2A is equally divided into light receiving areas E1 and H1 by a division line provided at the center of a signal light tangent direction, in a similar manner to that of the light receiving area S1A. The light receiving area S2B corresponds to the area of the same side as that of the light receiving area S1B, with the straight lines P1 and P2 as boundaries, respectively. The light receiving area S2B is equally divided into light receiving areas F1 and G1 by a division line provided at the center of a signal light tangent direction.

A light receiving area E2 is provided between the light receiving area E1 and the straight line P2. A light receiving area F2 is provided between the light receiving area F1 and the straight line P2. A light receiving area G2 is provided between the light receiving area G1 and the straight line P2. A light receiving area H2 is provided between the light receiving area H1 and the straight line P2.

The sub-beam receiving surface S2 is arranged at a position deviated from the main-beam receiving surface S1 by d1 in a signal light tangent direction. This is because, in the first embodiment, spot positions of the main beam MB and the sub beam SB1 are deviated to a signal light tangent direction by d1. A size of a deviation of the beams changes depending on configurations of the optical system 3.

The sub-beam receiving area S3 is a quadrate having the same size as that of the main-beam receiving surface S1, is formed point-symmetrically to a spot center of reflection light of the sub beam SB2, and line-symmetrically to a straight line P3 passing through the spot center and parallel with a signal light tangent direction.

The sub-beam receiving surface S3 includes light receiving areas S3A and S3B provided in isolation at mutually opposite sides with a predetermined distance (=w3/2) from the straight line P3, in a similar manner to that of the main-beam receiving surface S1. The light receiving area S3A corresponds to the area of the same side as that of the light receiving area S1A, with the straight lines P1 and P3 as boundaries, respectively. The light receiving area S3A is equally divided into light receiving areas E3 and H3 by a division line provided at the center of a signal light tangent direction, in a similar manner to that of the light receiving area S1A. The light receiving area S3B corresponds to the area of the same side as that of the light receiving area SIB, with the straight lines P1 and P3 as boundaries, respectively. The light receiving area S3B is equally divided into light receiving areas F3 and G3 by a division line provided at the center of a signal light tangent direction.

A light receiving area E4 is provided between the light receiving area E3 and the straight line P3. A light receiving area F4 is provided between the light receiving area F3 and the straight line P3. A light receiving area G4 is provided between the light receiving area G3 and the straight line P3. A light receiving area H4 is provided between the light receiving area H3 and the straight line P3.

The sub-beam receiving surface S3 is arranged at a position deviated from the main-beam receiving surface S1 by d1 in a signal light tangent direction, in a similar manner to that of the sub-beam receiving surface S2. However, a direction of the deviation is opposite to that of the sub-beam receiving surface S2.

While the main-beam receiving surface S1 and the sub-beam receiving surfaces S2 and S3 are quadrate, shapes of the light receiving surfaces are not limited to quadrate.

The stray-light receiving surface I is a rectangle having the same width and the same position as those of the sub-beam receiving surface S2 in a signal light tangent direction. The stray-light receiving surface I is isolated by a predetermined distance g1 ($\geq 0$) to one side of the sub-beam receiving surface S2 in a signal light radial direction (upper side in FIG. 8). The stray-light receiving surface I constitutes one light receiving area as a whole.

The stray-light receiving surface J is a rectangle having the same width and the same position as those of the sub-beam receiving surface S2 in a signal light tangent direction. The stray-light receiving surface J is isolated by the predetermined distance g1 to the other side of the sub-beam receiving surface S2 in a signal light radial direction (lower side in FIG. 8). The stray-light receiving surface J also constitutes one light receiving area as a whole.

The stray-light receiving surface K is a rectangle having the same width and the same position as those of the main-beam receiving surface S1 in a signal light tangent direction. The stray-light receiving surface K is isolated by the predetermined distance g1 to one side of the main-beam receiving surface S1 in a signal light radial direction (upper side in FIG. 8). The stray-light receiving surface K also constitutes one light receiving area as a whole.

The stray-light receiving surface L is a rectangle having the same width and the same position as those of the main-beam receiving surface S1 in a signal light tangent direction. The stray-light receiving surface L is isolated by the predetermined distance g1 to the other side of the main-beam receiving surface S1 in a signal light radial direction (lower side in FIG. 8). The stray-light receiving surface L also constitutes one light receiving area as a whole.

The stray-light receiving surface M is a rectangle having the same width and the same position as those of the sub-beam receiving surface S3 in a signal light tangent direction. The stray-light receiving surface M is isolated by the predetermined distance g1 to one side of the sub-beam receiving surface S3 in a signal light radial direction (upper side in FIG. 8). The stray-light receiving surface M also constitutes one light receiving area as a whole.

The stray-light receiving surface N is a rectangle having the same width and the same position as those of the sub-beam receiving surface S3 in a signal light tangent direction. The stray-light receiving surface N is isolated by the predetermined distance g1 to the other side of the sub-beam receiving surface S3 in a signal light radial direction (lower side in FIG. 8). The stray-light receiving surface N also constitutes one light receiving area as a whole.

The optical detector 5 outputs a signal having amplitude of a value (a light receiving amount) obtained by performing a surface integration of intensities of an optical beam in the light receiving area. In the present specification, an output signal corresponding to the light receiving area X (X is a symbol of the light receiving area) is expressed as I.

Figure 9:
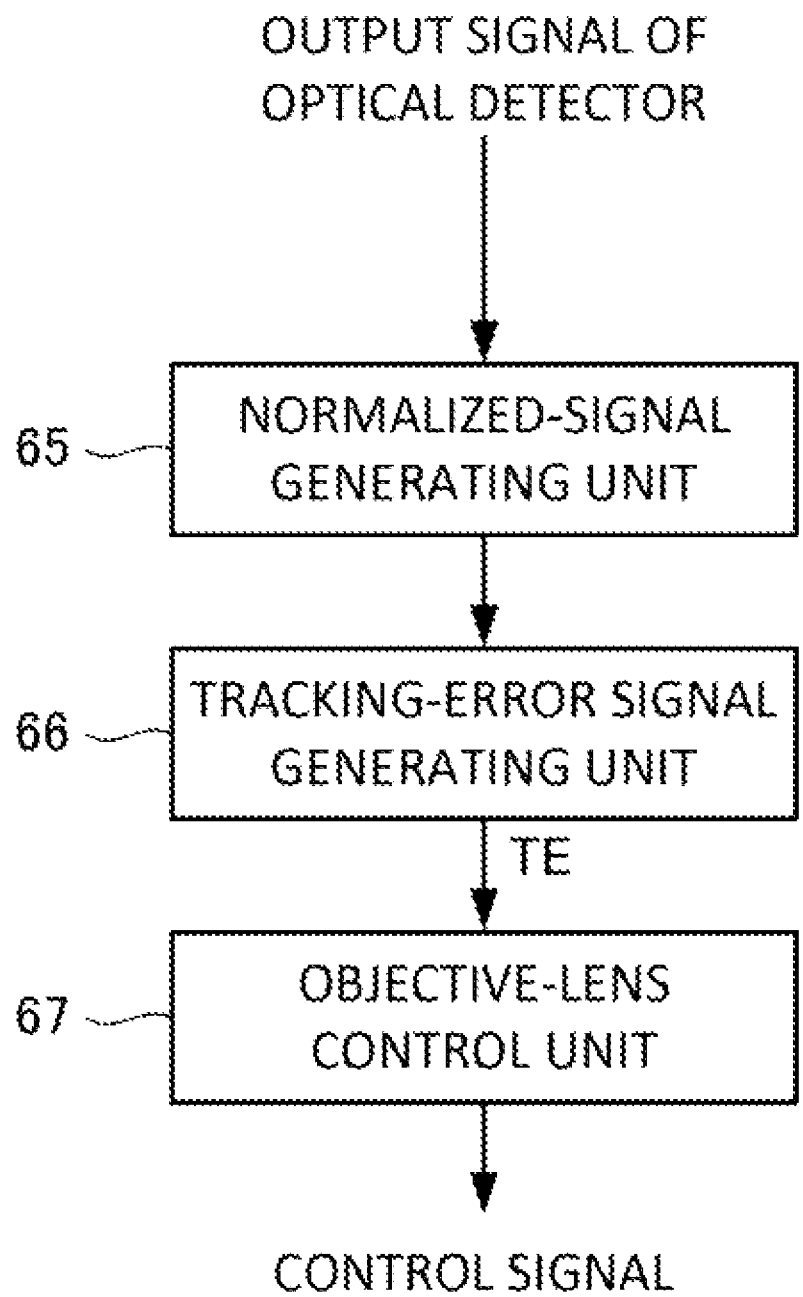
FIG. 9 is a functional block diagram of a processing unit according to the first embodiment.

The configuration of the optical detector 5 has been described above in detail. FIG. 9 is a functional block diagram of the processing unit 6. As shown in FIG. 9, the processing unit 6 includes a normalized-signal generating unit 65 (normalized signal generator), a tracking-error signal generating unit 66 (tracking-error signal generator), and an objective-lens control unit 67.

The normalized-signal generating unit 65 generates a sum signal by using a total of a light receiving amount in the light receiving areas S1A, S2A, and S3A, and a total of a light receiving amount in the light receiving areas S1B, S2B, and S3B. The normalized-signal generating unit 65 also generates a difference signal by using each light receiving amount in each light receiving area. The normalized-signal generating unit 65 also uses each light receiving amount in the stray-light receiving areas I to N, when necessary. On the other hand, in generating these signals, the normalized-signal generating unit 65 does not use center portions (the light receiving areas A2, B2, C2, D2, E2, E4, F2, F4, G2, G4, H2, and H4) of the main-beam receiving surface S1 and the sub-beam receiving surfaces S2 and S3. The normalized-signal generating unit 65 generates a normalized signal by normalizing the generated difference signal by using the generated sum signal, and outputs the normalized signal to the tracking-error signal generating unit 66. This is explained below with reference to four detailed examples.

In a first example, the normalized-signal generating unit 65 generates a sum signal SUM1 (a first sum signal) obtained by totaling a light receiving amount in the light receiving areas S1A, S2A, and S3A, and a difference signal PP1 (a first difference signal) obtained by subtracting a total of the light receiving amount in the light receiving areas S2A and S3A from the light receiving amount in the light receiving area S1A. In obtaining the sum signal SUM1, a given constant $k_1$ is multiplied to the total of the light receiving amount in the light receiving areas S2A and S3A. Similarly, in obtaining the difference signal PP1, the constant $k_1$ is multiplied to the total of the light receiving amount in the light receiving areas S2A and S3A. Specifically, the normalized-signal generating unit 65 performs calculation of the following equations (12) and (13). The constant $k_1$ is determined to cancel an offset generated in the difference signal PP1 by a lens shift.

$$SUM1 = (I_{A1} + I_{D1}) + k_1(I_{E1} + I_{E3} + I_{H1} + I_{H3}) \quad (12)$$

$$PP1 = (I_{A1} + I_{D1}) - k_1(I_{E1} + I_{E3} + I_{H1} + I_{H3}) \quad (13)$$

The normalized-signal generating unit 65 generates a normalized signal PP1N (a first normalized signal) by normalizing the difference signal PP1 by the sum signal SUM1. Specifically, the normalized-signal generating unit 65 performs division of the following equation (14).

$$PP1N = \frac{PP1}{SUM1} \quad (14)$$

The normalized-signal generating unit 65 also generates a sum signal SUM2 (a second sum signal) obtained by totaling a light receiving amount in the light receiving areas S1B, S2B, and S3B, and a difference signal PP2 (a second difference signal) obtained by subtracting a total of the light receiving amount in the light receiving areas S2B and S3B from the light receiving amount in the light receiving area S1B. In obtaining the sum signal SUM2, a given constant $k_2$ is multiplied to the total of the light receiving amount in the light receiving areas S2B and S3B. Similarly, in obtaining the difference signal PP2, the constant $k_2$ is multiplied to the total of the light receiving amount in the light receiving areas S2B and S3B. Specifically, the normalized-signal generating unit 65 performs calculation of the following equations (15) and (16). The constant $k_2$ is determined to cancel an offset generated in the difference signal PP1 by a lens shift. Normally, $k_1$ is equal to $k_2$.

$$SUM2 = (I_{B1} + I_{C1}) + k_2(I_{F1} + I_{F3} + I_{G1} + I_{G3}) \quad (15)$$

$$PP2 = (I_{B1} + I_{C1}) - k_2(I_{F1} + I_{F3} + I_{G1} + I_{G3}) \quad (16)$$

The normalized-signal generating unit 65 generates a normalized signal PP2N (a second normalized signal) by normalizing the difference signal PP2 by the sum signal SUM2. Specifically, the normalized-signal generating unit 65 performs division of the following equation (17).

$$PP2N = \frac{PP2}{SUM2} \quad (17)$$

In a second example, the normalized-signal generating unit 65 generates difference signals PP1A and PP2A, and sum signals SUM1A and SUM2A, corresponding to the above difference signals PP1 and PP2 and sum signals SUM1 and SUM2, respectively, by using the stray light receiving surfaces I to N. The "A" at the end of each signal means "correction". That is, in the second example, the normalized-signal generating unit 65 corrects each signal generated in the first example by using the light receiving amount in the stray light receiving surfaces I to N. Specifically, the normalized-signal generating unit 65 performs calculation of the following equation (18) to (21). Constants $k_3$ to $k_8$ are determined to cancel offsets generated in the difference signals PP1A and PP2A by a lens shift.

$$SUM1A = (I_{A1} + I_{D1} - k_3 I_K) + k_1(I_{E1} + I_{E3} + I_{H1} + I_{H3} - k_4 I_L - k_5 I_M) \quad (18)$$

$$PP1A = (I_{A1} + I_{D1} - k_3 I_K) - k_1(I_{E1} + I_{E3} + I_{H1} + I_{H3} - k_4 I_L - k_5 I_M) \quad (19)$$

$$SUM2A = (I_{B1} + I_{C1} - k_6 I_L) + k_2(I_{F1} + I_{F3} + I_{G1} + I_{G3} - k_7 I_L - k_8 I_N) \quad (20)$$

$$PP2A = (I_{B1} + I_{C1} - k_6 I_L) - k_2(I_{F1} + I_{F3} + I_{G1} + I_{G3} - k_7 I_L - k_8 I_N) \quad (21)$$

The normalized-signal generating unit 65 generates normalized-signals PP1NA and PP2NA by normalizing the difference signals PP1A and PP2A by the sum signals SUM1A and SUM2A. Specifically, the normalized-signal generating unit 65 performs division of the following equations (22) and (23).

$$PP1NA = \frac{PP1A}{SUM1A} \quad (22)$$

$$PP2NA = \frac{PP2A}{SUM2A} \quad (23)$$

In a third example, the normalized-signal generating unit 65 generates a sum signal SUM3 (a third sum signal) obtained by totaling the light receiving amount in the light receiving areas S1A, S2A, S3A, S1B, S2B, and S3B, and a difference signal PP3 (a third difference signal) obtained by subtracting a total of the light receiving amount in the light receiving areas S1B, S2A, and S3A from a total of the light receiving amount in the light receiving areas S1A, S2B, and S3B. In obtaining the sum signal SUM3, a given constant $k_9$ is multiplied to each light receiving amount in the light receiving areas S2A, S3A, S2B, and S3B. Similarly, in obtaining the difference signal PP3, the constant $k_9$ is multiplied to each light receiving amount in the light receiving areas S2A, S3A, S2B, and S3B. Specifically, the normalized-signal generating unit 65 performs calculation of the following equations (24) and (25). The constant $k_9$ is determined to cancel an offset generated in the difference signal PP3 by a lens shift.

$$SUM3 = \{(I_{A1} + I_{D1}) + k_9(I_{E1} + I_{E3} + I_{H1} + I_{H3})\} + \{(I_{B1} + I_{C1}) + k_9(I_{F1} + I_{F3} + I_{G1} + I_{G3})\} \quad (24)$$

$$PP3 = \{(I_{A1} + I_{D1}) - (I_{B1} + I_{C1})\} - k_9\{(I_{E1} + I_{E3} + I_{H1} + I_{H3}) - (I_{F1} + I_{F3} + I_{G1} + I_{G3})\} \quad (25)$$

The normalized-signal generating unit 65 generates a normalized-signal PP3N (a third normalized signal) by normalizing the difference signal PP3 by the sum signal SUM3. Specifically, the normalized-signal generating unit 65 performs division of the following equation (26).

$$PP3N = \frac{PP3}{SUM3} \quad (26)$$

In a fourth example, the normalized-signal generating unit 65 generates a difference signal PP3A and a sum signal SUM3A, corresponding to the above difference signal PP3 and sum signal SUM3, respectively, by using the stray light receiving surfaces I to N. The "A" at the end of each signal means "correction". That is, in the fourth example, the normalized-signal generating unit 65 corrects each signal generated in the third example by using the light receiving amount in the stray light receiving surfaces I to N. Specifically, the normalized-signal generating unit 65 performs calculation of the following equations (27) and (28). Constants $k_{10}$ to $k_{15}$ are determined to cancel an offset generated in the difference signal PP3A by a lens shift.

$$PP3A=\{(I_{A1}+I_{D1}-k_{10}I_{K})+k_{9}(I_{F1}+I_{G1}+I_{F3}+I_{G3}-k_{11}I_{J}-k_{12}I_{N})\}-\{(I_{B1}+I_{C1}-k_{13}I_{L})+k_{9}(I_{E1}+I_{H1}+I_{E3}+I_{H3}-k_{14}I_{J}-k_{15}I_{M})\} \quad (27)$$

$$SUM3A=\{(I_{A1}+I_{D1}-k_{10}I_{K})+k_{9}(I_{F1}+I_{G1}+I_{F3}+I_{G3}-k_{11}I_{J}-k_{12}I_{N})\}+\{(I_{B1}+I_{C1}-k_{13}I_{L})+k_{9}(I_{E1}+I_{H1}+I_{E3}+I_{H3}-k_{14}I_{J}-k_{15}I_{M})\} \quad (28)$$

The normalized-signal generating unit 65 generates a normalized-signal PP3NA by normalizing the difference signal PP3A by the sum signal SUM3A. Specifically, the normalized-signal generating unit 65 performs division of the following equation (29).

$$PP3NA = \frac{PP3A}{SUM3A} \quad (29)$$

The tracking-error signal generating unit 66 generates the tracking error signal TE by using a normalized signal generated by the normalized-signal generating unit 65. Specifically, when the normalized-signal generating unit 65 generates the normalized signal PP1N and the normalized signal PP2N, the normalized-signal generating unit 65 generates a tracking error signal TE1 by performing a subtraction process as shown in the following equation (30). Normally, the constant $k_{16}$ is equal to 1. In generating the normalized signal PP1NA and the normalized signal PP2NA, the normalized-signal generating unit 65 generates a tracking error signal TE1A by performing a subtraction process as shown in the following equation (31). On the other hand, in generating the normalized signals PP3N and PP3NA, the normalized-signal generating unit 65 straightly uses these signals as tracking error signals TE2 and TE2A, as shown by the following equations (32) and (33).

$$TE1=PP1N-k_{16}PP2N \quad (30)$$

$$TE1A=PP1NA-k_{17}PP2NA \quad (31)$$

$$TE2=PP3N \quad (32)$$

$$TE2A=PP3NA \quad (33)$$

The objective-lens control unit 67 generates a control signal of the objective lens 4 based on the tracking-error signal TE generated by the tracking-error signal generating unit 66, and outputs the control signal to an actuator (not shown) to control the position of the objective lens 4 (tracking servo).

When the tracking error signal TE is generated as explained above, an offset generated in the tracking error signal can be suppressed to a low level by increasing push-pull amplitude and by suppressing a variation of push-pull amplitude at a lens shift time, although the tracking error signal is generated without using a vicinity of the light receiving surface. This is explained below in detail.

Figure 58:
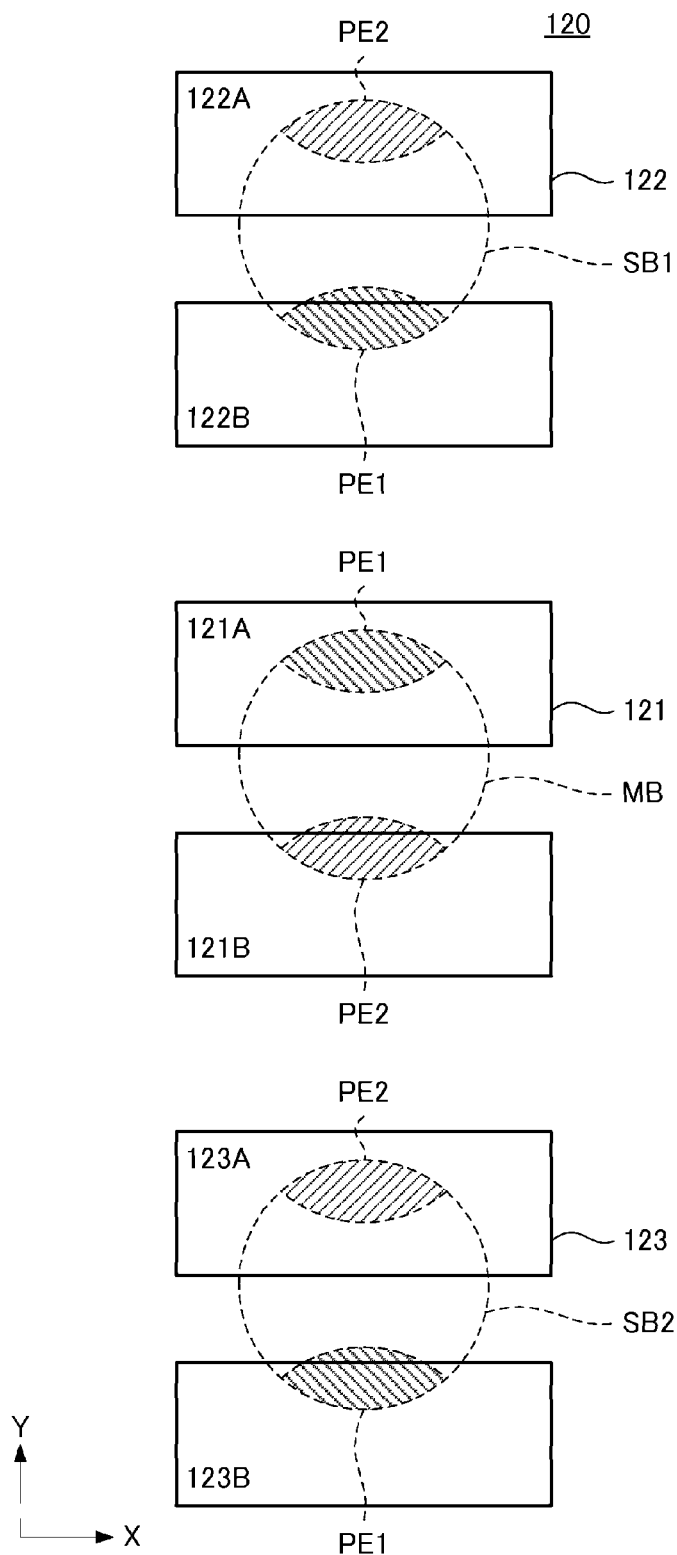
Figure 59:
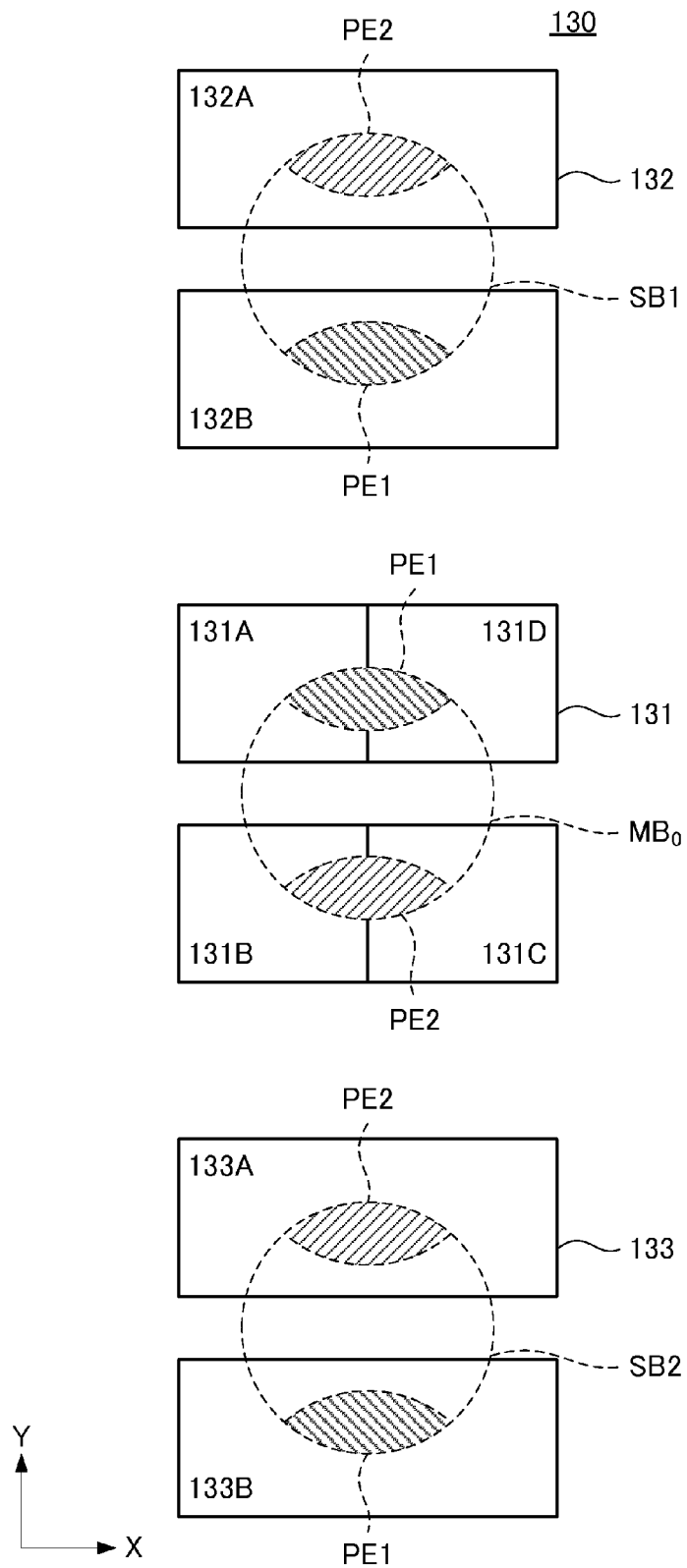

The sum signal SUM2, for example, is a signal showing a total of the light receiving amount in the light receiving areas S1B, S2B, and S3B. These light receiving areas are positioned at a lower side of the corresponding division lines P1, P2, and P3 in FIG. 8, respectively. Therefore, when a shift of the spot as shown in FIG. 58 occurs due to a lens shift, for example, areas and shapes of push-pull areas included in the light receiving area S1B and the light receiving areas S2B and S3B are the same, when the isolation distances w1, w2, and w3 are the same. Because a phase of the push-pull signal in the light receiving area S1B is opposite to those in the light receiving areas S2B and S3B, the sum signal SUM2 becomes a constant value without a variation at a track jump time, by suitably determining the constant $k_2$. At an on-track position on the disk when there is no offset due to a lens shift and the like, there is no variation at a track jump time and the sum signal SUM2 becomes constant, when signal intensity in the light receiving area S1B becomes equal to signal intensity obtained by multiplying $k_2$ to a sum of light receiving an amount in the light receiving areas S2B and S3B. Therefore, the constant $k_2$ is normally determined in this way. In other words, the constant $k_2$ becomes an intensity ratio of a main beam to a sub beam. When the isolation distances w1, w2, and w3 are not equal to each other, the sum signal SUM2 varies at a track jump time and push-pull amplitude varies, when the push-pull area enters a center portion (the light receiving areas A2, B2, C2, and D2) of the main-beam receiving surface S1, and this is not preferable. When there is a small variation of the sum signal SUM2, the isolation distances w1, w2, and w3 do not necessarily need to be set equal.

The above similarly applies to other sum signals. In each sum signal, a variation at a track jump time can be avoided at a lens shift time.

Therefore, at a lens shift time, a variation of an offset generated in the tracking error signal due to a variation of push-pull amplitude generated due to a variation of a sum signal at a track jump time can be prevented. Consequently, an offset generated in the tracking error signal can be suppressed to a low level.

The above effect obtained by the optical drive device 1 is explained with reference to a simulation result. In the following simulation, optical magnification of the optical system 3 is set as 15 times, the optical disk 11 is a one-layer optical disk having a track pitch 0.32 µm and a trench depth 0.02 µm, and a length x of one side of the main-beam receiving surface S1a is set as 100 µm. NA of an objective lens is set as 0.85, and a wavelength λ is set as 405 nm.

Figure 10:
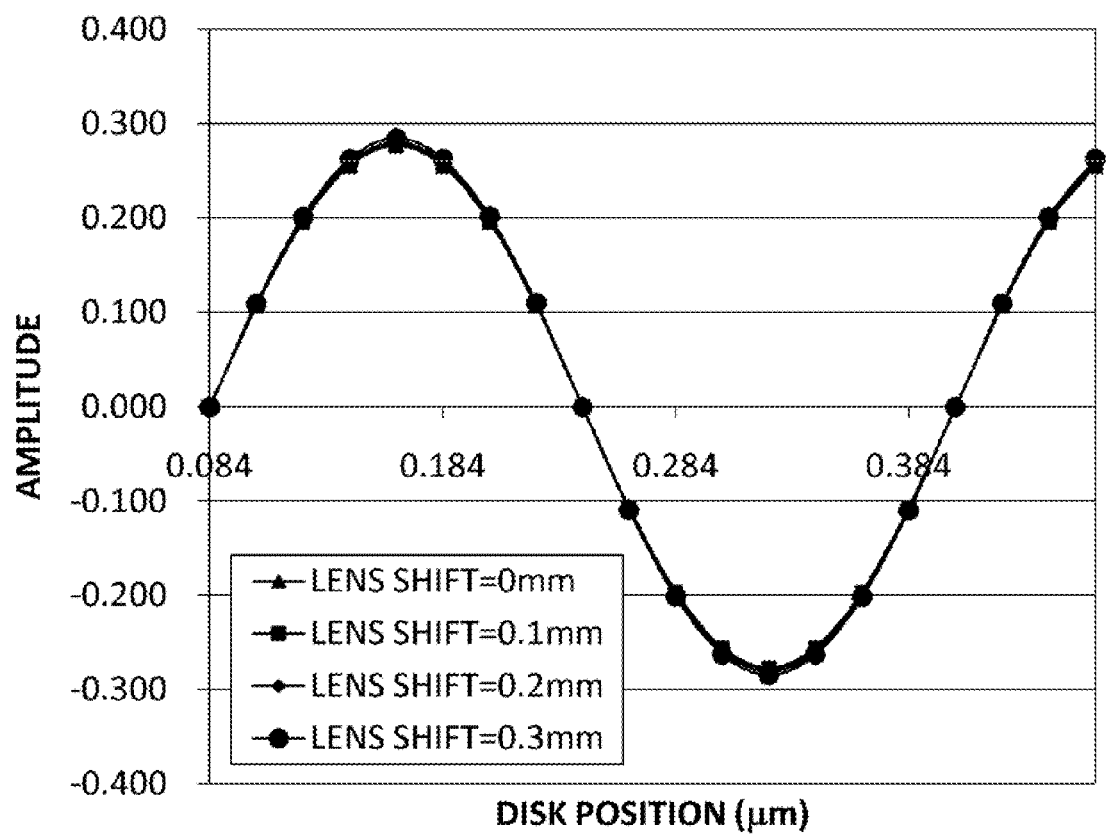
FIG. 10 is a plot diagram of a tracking error signal according to the background technique of the present invention, obtained by a simulation for each size of a lens shift at positions (μm) relative to a disk.
Figure 12:
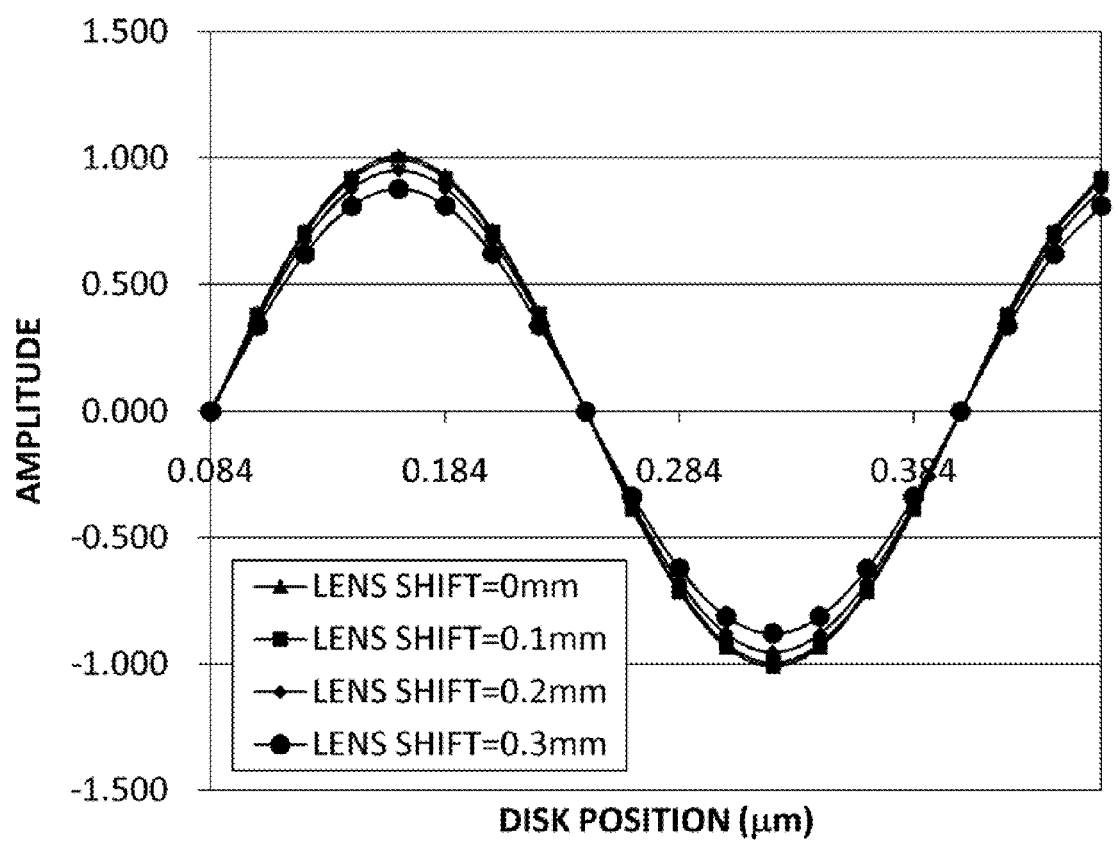
FIG. 12 is a plot diagram of a tracking error signal according to the first embodiment, obtained by a simulation for each size of a lens shift at positions (μm) relative to a disk.
Figure 13:
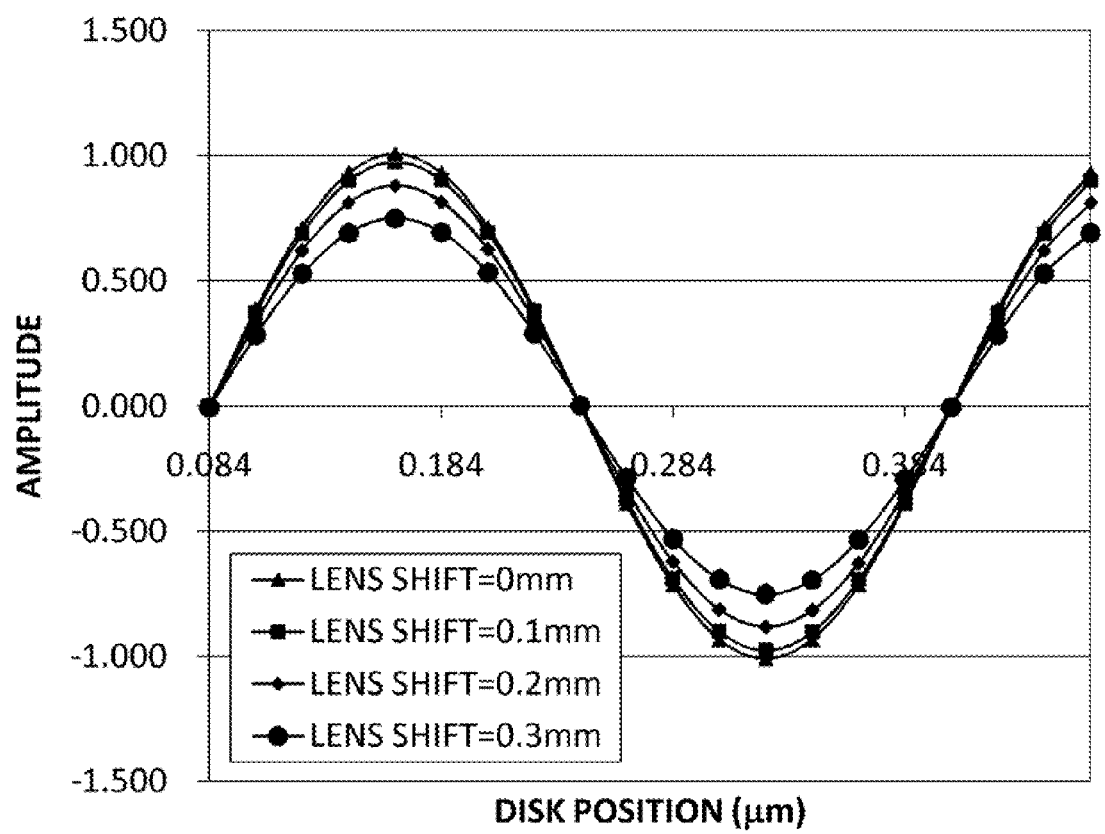
FIG. 13 is a plot diagram of a tracking error signal according to the first embodiment, obtained by a simulation for each size of a lens shift at positions (μm) relative to a disk.

First, as a comparative example, FIG. 10 shows a tracking error signal generated by the equation (7) "by using the entire light receiving surface". As can be seen from FIG. 10, a variation of push-pull amplitude at a lens shift time is small. But a size of the amplitude is smaller than that in the first embodiment (FIGS. 12 and 13 described later). That is, an offset is larger than that in the present invention.

Figure 11:
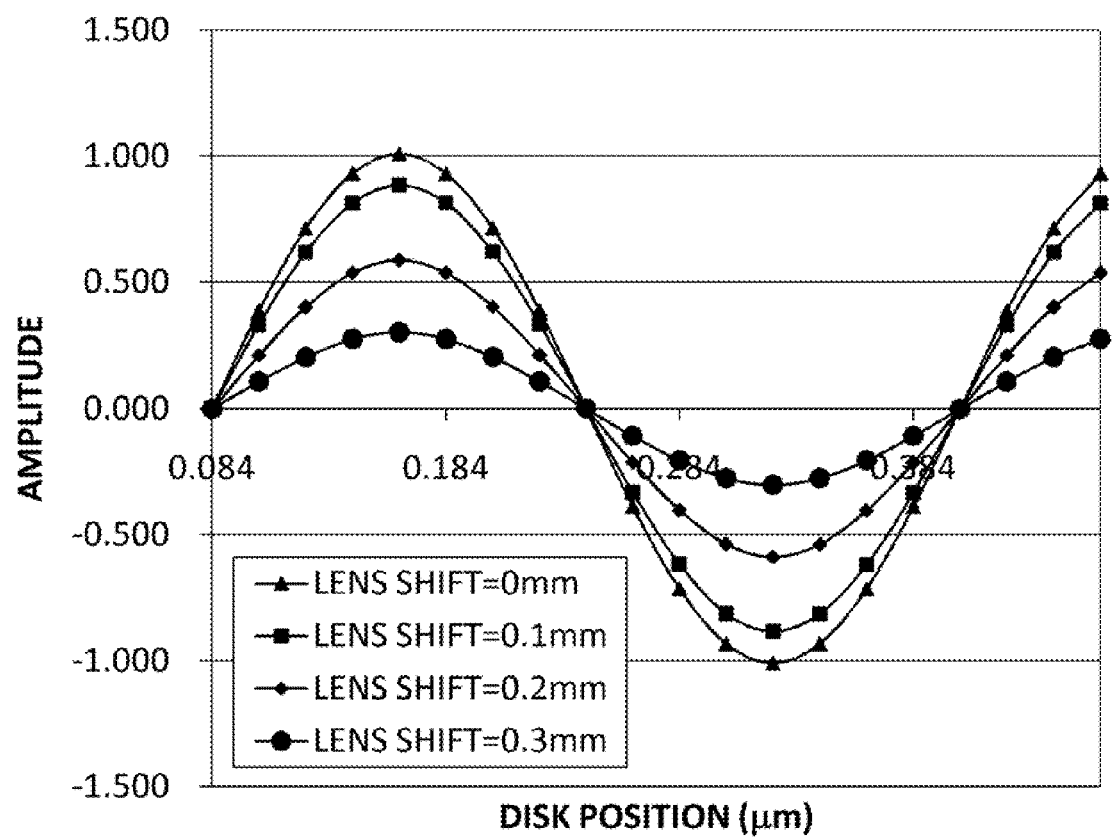
FIG. 11 is a plot diagram of a tracking error signal according to the background technique, obtained by a simulation for each size of a lens shift at positions (μm) relative to a disk.

As another comparative example, FIG. 11 shows a normal tracking error signal generated by the equation (7) "without using a vicinity of a light receiving surface". As can be seen from FIG. 11, while push-pull amplitude becomes large to about four times, it is understood that push-pull amplitude fluctuates widely corresponding to a size of a lens shift.

Generally, an offset amount $S_{OFFSET}$ is expressed by the equation (11) by using amplitude $S_{AMPLITUDE}$ and a displacement amount $S_{DISPLACEMENT}$. Therefore, when amplitude of the tracking error signal fluctuates widely, an offset amount of the tracking error signal also fluctuates widely.

FIG. 12 shows a simulation result of a tracking error signal generated by the optical drive device 1. FIG. 12 shows the tracking error signal TE1 generated by the equation (30). A constant $K_{16}$ is equal to 1.

As is clear from FIG. 12, in the tracking error signal TE1, a variation of push-pull amplitude corresponding to a size of a lens shift is suppressed more than that in the comparative example in FIG. 11. A size of the amplitude itself is also larger than that of the comparative example in FIG. 10. Therefore, an amount of an offset generated by the lens shift in the tracking error signal TE1 is decreased more than those of the comparative examples in FIGS. 10 and 11.

FIG. 13 also shows a simulation result of a tracking error signal generated by the optical drive device 1. FIG. 13 shows the tracking error signal TE2 generated by the equation (32).

As is clear from FIG. 13, in the tracking error signal TE2, a variation of amplitude corresponding to a size of a lens shift is also suppressed more than that in the comparative example in FIG. 11. A size of the amplitude itself is also larger than that of the comparative example in FIG. 10, like in the tracking error signal TE1. Therefore, an amount of an offset generated by the lens shift in the tracking error signal TE2 is decreased more than those of the comparative examples in FIGS. 10 and 11.

An optimum value of an isolation distance in the light receiving area S1A and the light receiving area S1B is explained next. While the isolation distances w1, w2, and w3 do not necessarily need to be the same as described above, a beam diameter of the main beam MB is substantially the same as beam diameters of the sub beams SB1 and SB2 in many cases. In this case, the isolation distances w1, w2, and w3 are preferably the same with each other. Therefore, in the following explanations, values of w1, w2, and w3 are set as w.

Figure 14:
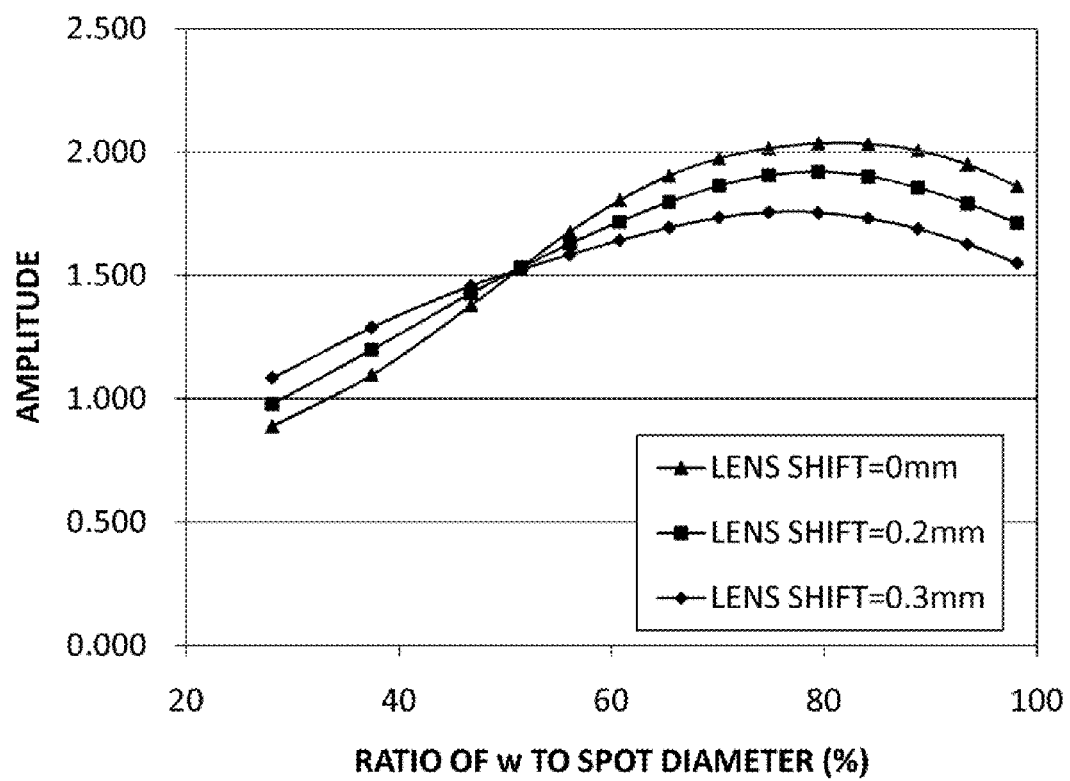
FIG. 14 shows each size of a lens shift a relationship between amplitude of a tracking error signal and an isolation distance according to the first embodiment.
Figure 15:
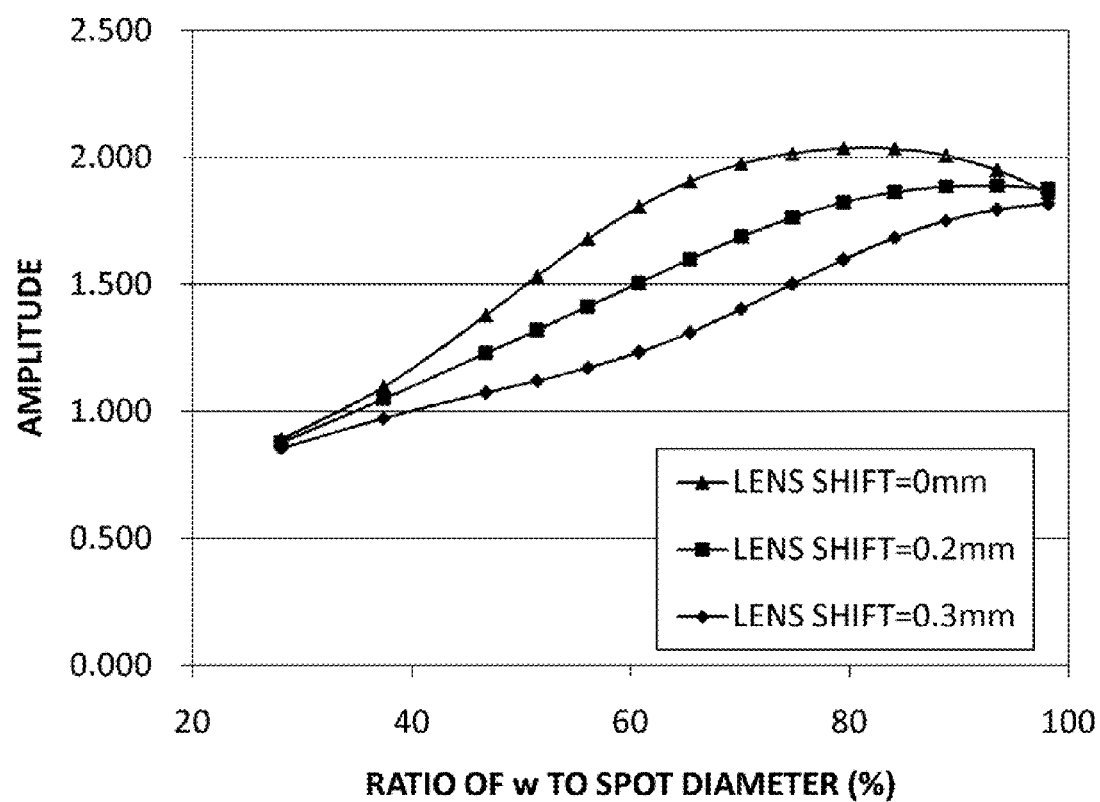
FIG. 15 shows each size of a lens shift a relationship between amplitude of a tracking error signal and an isolation distance according to the first embodiment.

FIG. 14 shows each size of a lens shift a relationship between amplitude and the isolation distance w of the tracking error signal TE1. FIG. 15 shows each size of a lens shift a relationship between amplitude and the isolation distance w of the tracking error signal TE2. In lateral axes of these drawings, a ratio of the isolation distance w to a spot diameter is expressed. A diameter of the spot is 53.5 µm.

As shown in FIG. 14, amplitude of the tracking error signal TE1 becomes a polar maximum value when the isolation distance w is set within a range of 70% to 80% of the spot diameter. A variation of the amplitude becomes a polar minimum value when the isolation distance w is 50% of the spot diameter. Therefore, the isolation distance w is preferably set within a range of about 50% to 80% of the spot diameter.

On the other hand, as shown in FIG. 15, amplitude of the tracking error signal TE2 becomes larger when the isolation distance w is nearer 100% of the spot diameter, when there is a lens shift. A variation of the amplitude becomes smaller than that of the tracking error signal TE1 when the isolation distance w exceeds about 80% of the spot diameter. Therefore, the isolation distance w is preferably set within a range of about 80% to 100% of the spot diameter. However, because the size of the spot light also varies due to the variation of the optical system, the isolation distance w needs to be set as a size not exceeding the diameter of the spot light even when the size of the spot light varies.

That is, as shown in FIGS. 14 and 15, the amplitudes of the tracking error signals TE1 and TE2 become a polar maximum value when the isolation distance w is near 80% of the spot diameter. Therefore, when the value of the isolation distance w is set near 80% of the sport diameter, the offset of the tracking error signals TE1 and TE2 can be minimized. The vicinity of 80% is preferably 80%±10%. Further, as shown in FIGS. 14 and 15, when the isolation distance w is near 80% of the spot diameter, a change of amplitude relative to a change of the isolation distance w also becomes small. Therefore, it is also possible to prevent a decrease of amplitude of the tracking error signals TE1 and TE2 due to the variation of the optical system.

As shown in FIG. 14, a variation width (an amplitude variation width) of amplitude of the tracking error signal TE1 when a lens shift occurs becomes a polar minimum value when the isolation distance w takes a value near 50% of the spot diameter. Therefore, when the value of the isolation distance w is set near 50% of the sport diameter, a variation of the amplitude of the tracking error signal TE1 when a lens shift occurs can be minimized. Tracking control can be performed stably for a portion of no amplitude variation. The vicinity of 50% is preferably 50%±10%.

The tracking error signal TE1 is a signal obtained by calculating bright and dark areas of push-pull in a main signal and a sub signal by using the same dimension and the same area for the bright and dark signals, and by normalizing the signal. That is, in an area of a shift direction at a lens shift time, a zero-order light component increases in the sum signal, and the proportion of the push-pull area becomes small. Therefore, push-pull amplitude becomes small. In the opposite area, a zero-order light component decreases, and the proportion of the push-pull area becomes large. Therefore, the push-pull amplitude becomes large, and an amplitude variation also becomes small. That is, one of the normalized push-pull signals PP1N and PP2N constituting the tracking error signal TE1 has a small amplitude variation in a direction of a lens shift. On the other hand, in the tracking error signal TE2, a sum signal of a denominator always includes zero-order light. Therefore, amplitude of both the main signal and the sub signal of the normalized push-signal PP3N always varies, and an amplitude variation of the tracking error signal TE2 becomes larger than that of the tracking error signal TE1. Accordingly, in the case of the tracking error signal TE1, when an optimum value is selected for a center width, the normalized push-pull signal PP1N and the normalized push-pull signal PP2N cancel increase and decrease of push-pull amplitude each other, and prevent the occurrence of an amplitude variation. That is, an offset variation becomes small. As described above, this is achieved when the center width is set to be about 50% of the spot diameter.

When a width of the center portion is increased, push-pull amplitude becomes large. This is because the area of the zero-order light decreases and because the proportion of the push-pull area becomes large.

As expressed by the equation (11), an offset amount $TE_{OFFSET}$ of the tracking error signal TE is defined as a value obtained by dividing a displacement amount $TE_{DISPLACEMENT}$ by amplitude $TE_{AMPLITUDE}$ of the tracking error signal TE. When the vicinity of the center is not used, the displacement amount $TE_{DISPLACEMENT}$ does not become large. Therefore, the offset amount $TE_{OFFSET}$ becomes small when the amplitude $TE_{AMPLITUDE}$ becomes large. As for the offset amount $TE_{OFFSET}$, an offset due to interference between signal light and stray light at a lens shift time is dominant. The offset amount $TE_{OFFSET}$ due to this interference is confirmed to become small when the vicinity of the center is not used.

A simulation result of the offset amount $TE_{OFFSET}$ of the tracking error signal TE is explained below.

Figure 16:
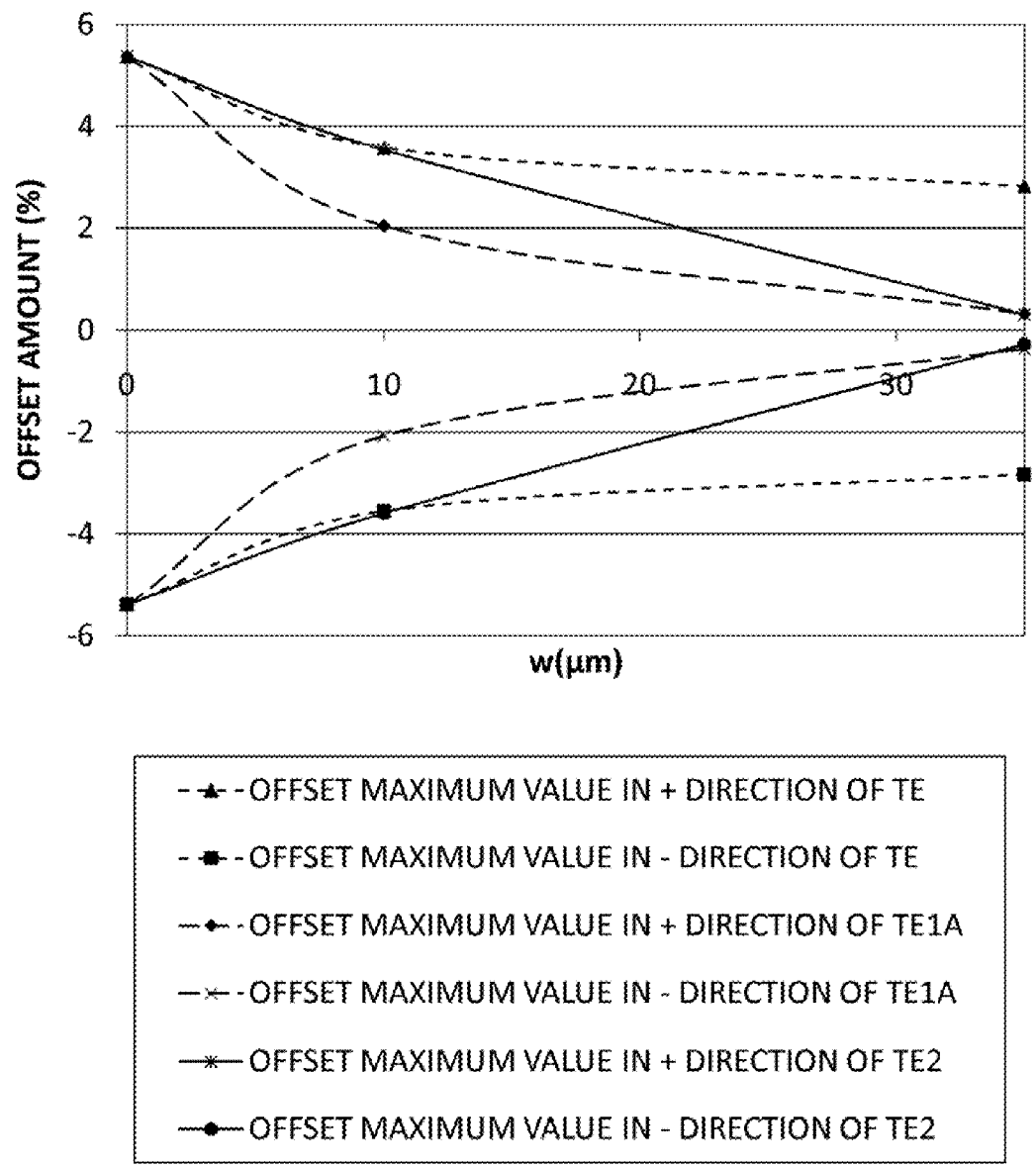
FIG. 16 shows a result of a simulation of a relationship between an offset amount of a tracking error signal and an isolation distance according to the first embodiment.

FIG. 16 shows a result of simulating the $TE_{OFFSET}$, $TE1A_{OFFSET}$, and $TE2_{OFFSET}$ of the tracking error signals TE, TE1A, and TE2 generated by the equations (7), (31), and (33). This simulation is performed by assuming that there is no influence of stray light in a main signal (an output signal corresponding to the main-beam receiving surface S1, such as an output signal $I_A$) and that there is influence of stray light of the main beam MB (including influence of interference between stray light of the main beam MB and the sub beams SB1 and SB2) in a sub signal (an output signal corresponding to the sub-beam receiving surfaces S2 and S3, such as an output signal $I_{E1}$). Each offset amount is simulated for each isolation distance w. With this arrangement, in FIG. 16, a change of each offset amount due to the isolation distance w when the stray light of the main beam MB and the sub beams SB1 and SB2 interfere with each other can be confirmed. In FIG. 16, a lateral axis represents the isolation distance w, and a vertical axis represents percentage of an offset amount.

In this simulation, an amount of a lens shift is changed at each 0.05 mm from 0 mm to 0.3 mm. The offset amounts $TE_{OFFSET}$, $TE1A_{OFFSET}$, and $TE2_{OFFSET}$ are obtained for each lens shift amount. In FIG. 16, a maximum value of an offset amount when an offset occurs in a plus direction and a maximum value of an offset amount when an offset occurs in a minus direction are plotted. Optical magnification of the optical system 3 is set as 15 times, the optical disk 11 is a two-layer optical disk having an interlayer distance of 10 μm, and a length x of one side of the main-beam receiving surface S1 is set as 100 μm.

Each signal is obtained as follows. That is, the main push-pull signal MPP and the main sum signal SUMm are obtained first by surface integrating intensity of the main beam MB in the light receiving areas A1, B1, C1, and D1, respectively. In obtaining the main push-pull signal MPP and the main sum signal SUMm, a stray light component and an interference component are not taken into consideration. That is, the main push-pull signal MPP and the main sum signal SUMm are ideal signals having no influence of stray light.

Next, interference between signals having 1/10 of amplitude of the main push-pull signal MPP and the main-sum signal SUMm and stray light of the main-beam MB is simulated. By using this signal as a sub signal, the offset amounts $TE_{OFFSET}$, $TE1A_{OFFSET}$, and $TE2_{OFFSET}$ are simulated by the equations (7), (31), and (33).

Figure 17:
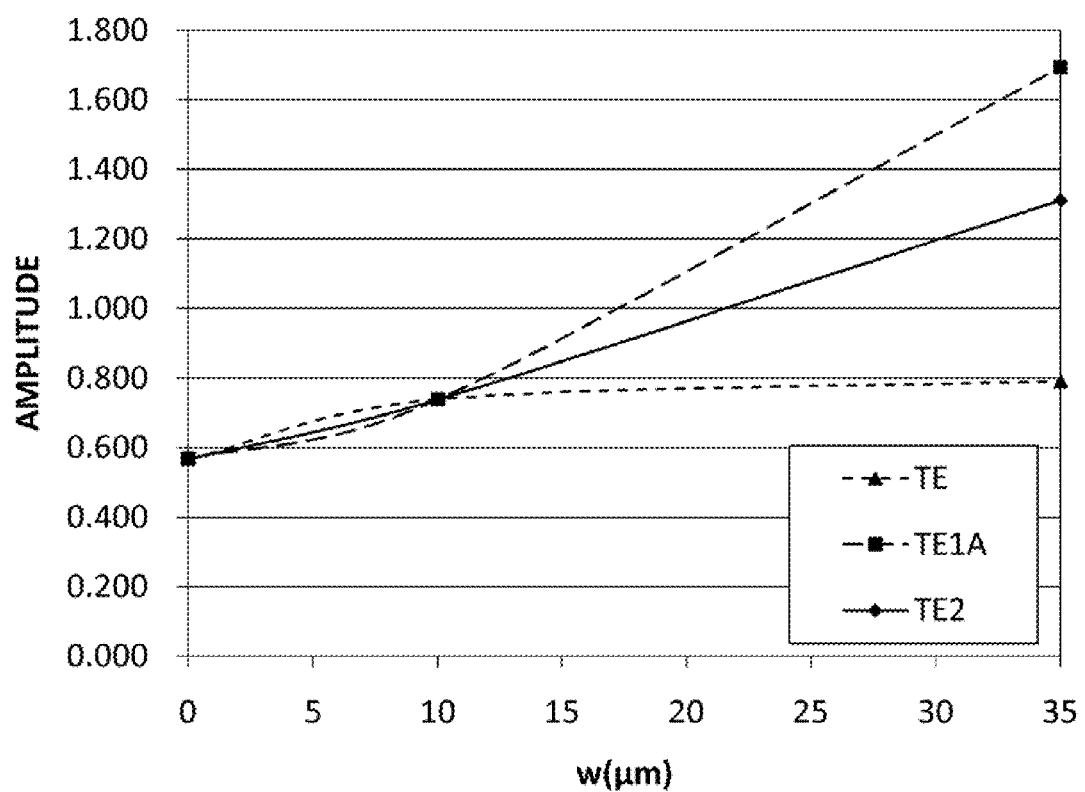
FIG. 17 shows a result of a simulation of a relationship between amplitude of a tracking error signal and an isolation distance according to the first embodiment.

FIG. 17 shows amplitudes $TE_{AMPLITUDE}$, $TE1A_{AMPLITUDE}$, and $TE2_{AMPLITUDE}$ of the tracking error signals TE, TE1A, and TE2 obtained in the middle of the simulation. FIG. 17 shows only minimum amplitude when the amount of a lens shift is changed from 0 mm to 0.3 mm.

As shown in FIG. 16, the offset amounts $TE1A_{OFFSET}$ and $TE2_{OFFSET}$ are smaller than the offset amount $TE_{OFFSET}$ for all isolation distances w. Although not shown, offset amounts $TE1_{OFFSET}$ and $TE2A_{OFFSET}$ of the tracking error signals TE1 and TE2A generated by the equations (30) and (32) are also smaller than the offset amount $TE_{OFFSET}$ for all isolation distances w.

The offset amount $TE_{OFFSET}$ also becomes smaller when the isolation distance w becomes larger as shown in FIG. 16. This is because a certain size of amplitude is obtained depending on a lens shift amount as shown in FIG. 11.

Decrease of the offset amount by increasing the isolation distance w can be explained from results of the simulation shown in FIGS. 16 and 17. That is, when FIG. 16 is compared with FIG. 17, it can be understood that the proportion that the offset amount becomes small due to the increase of the isolation distance w is larger than the proportion that the amplitude becomes large. From this understanding, it can be understood that an offset-amount reduction effect larger than an offset-amount reduction effect obtained by increasing the amplitude is obtained by increasing the isolation distance w.

In the above simulation, tracking error signals obtained by performing normalization have been exclusively explained. As for a tracking error signal (the tracking error signal TE obtained by the equation (1)) obtained without performing normalization, the offset amount is similarly decreased by increasing the isolation distance w. However, in the tracking error signal obtained without performing normalization, this method cannot be actually easily applied, because amplitude becomes small by receiving influence of a variation of a reflectance ratio and the like. That is, when the amplitude becomes small, influence of a new noise component generated in an amplifier circuit and a transmission path at the time of amplification becomes large, and the offset amount increases due to this influence. Therefore, to obtain an offset-amount reduction effect securely by increasing the isolation distance w, it is preferable to use a tracking error signal obtained by performing normalization.

When calculation is performed by normalizing the sum signal at the lens shift time to become constant at the track jump time as well like in the tracking error signals TE1 and TE2, the sum signal can be held at a large value by suppressing a variation of push-pull amplitude even when the center width is increased to increase the push-pull amplitude.

A specific effect obtained by generating tracking error signals by using the stray-light receiving areas I to N is explained next.

First, for the tracking error signal TE1, a light intensity distribution also shifts in addition to the shift of spot light at the lens shift time as described above. Therefore, intensity in a shift direction becomes large. That is, one of the sum signals SUM1 and SUM2 becomes large and the other signal becomes small at the lens shift time. A variation of the sum signals SUM1 and SUM2 is a variation at the lens shift time, and is not a variation at the track jump time. In the difference signals PP1 and PP2, offsets of signal light at the lens shift time are canceled each other by a main signal and a sub signal. Offsets of stray light occur at about the same level in the difference signal PP1 and the difference signal PP2, because the difference signals are generated by multiplying the sub signal by k times. A shift direction of stray light is substantially a signal light tangent direction. Therefore, offsets generated in the difference signals PP1 and PP2 do not vary so much at the lens shift time, and the sum signals SUM1 and SUM2 vary in an opposite direction as described above. Accordingly, the offset of stray light becomes large in the calculation of the tracking error signal TE1. Offsets of stray light are canceled by the difference signal PP1 and the difference signal PP2 and are not generated, when the sum signals SUM1 and SUM2 do not vary at the lens shift time. Accordingly, the offsets generated in the difference signals PP1 and PP2 are preferably canceled by using the stray-light receiving regions I to N, to avoid influence of variation of the sum signals SUM1 and SUM2 even when the variation occurs at the lens shift time.

Next, as for the tracking error signal TE2, offsets of stray light are substantially canceled respectively by subtraction of main signals and subtraction of sub signals by calculating the differential signal PP3. Therefore, correction using the stray-light receiving areas I to N like in the tracking error signal TE1 is not necessarily required, and only correction of the sum signal can be sufficient. An unrecorded/recorded track boundary on stray light appears substantially in parallel with a signal light radial direction. Accordingly, by arranging stray light correcting patterns in the same width and at the same position in a signal light radial direction, influence of offsets generated at the unrecorded/recorded track boundary of stray light can be decreased.

While an exemplary embodiment of the present invention has been explained above, the present invention is not limited to the embodiment, and it is needless to mention that the present invention can be carried out by various embodiments without departing from the scope of the invention.

Figure 18:
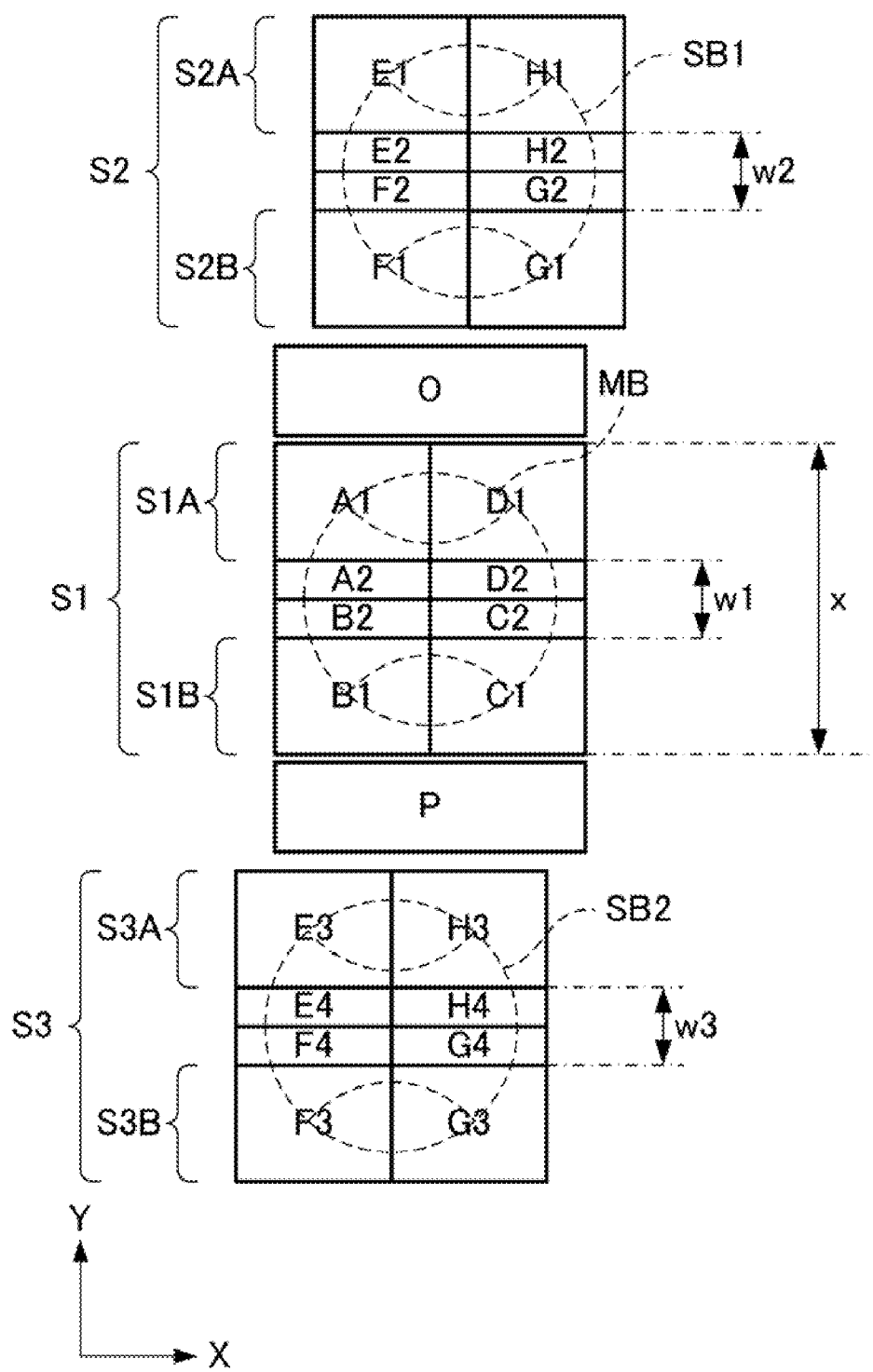
FIG. 18 shows a modification of the optical detector according to the first embodiment.

For example, depending on a configuration of the optical system, the optical detector as shown in FIG. 18 can be also used. This optical detector is used when sufficient space for a light receiving surface cannot be obtained. This optical detector has stray-light receiving surfaces O and P having a larger width in a signal light radial direction in place of the stray-light receiving surfaces K and L in FIG. 8, and has a configuration having no stray-light receiving surfaces I, J, M, and N.

When the optical detector in FIG. 18 is used, the equations (18) to (21) are rewritten by the following equations (34) to (37), respectively.

$$SUM1A = (I_{A1}+I_{D1}+k_{18}(I_O+I_P))-2k_{19}I_O+k_1(I_{E1}+I_{E3}+I_{H1}I_{H3}) \quad (34)$$

$$PP1A = \{I_{A1}+I_{D1}-k_{18}(I_O+I_P)\}-k_1(I_{E1}+I_{E3}+I_{H1}+I_{H3}) \quad (35)$$

$$SUM2A = (I_{B1}+I_{C1}+k_{20}(I_O+I_P))-2k_{21}I_P+k_1(I_{F1}+I_{F3}+I_{G1}+I_{G3}) \quad (36)$$

$$PP2A = (I_{B1}+I_{C1}-k_{20}(I_O+I_P))-k_1(I_{F1}+I_{F3}+I_{G1}+I_{G3}) \quad (37)$$

A deriving process of the equation (34) is explained. This is similarly applied to the equation (36).

First, $\alpha$ represents intensity of stray light received in the light receiving areas A1 and D1, and $\beta$ represents $k_1$ times of intensity of stray light received in the light receiving areas E1, E3, H1, and H3. A stray light component $SUM1_{STRAY}$ within the sum signal SUM1 expressed by the equation (12) and a stray light component $PP1_{STRAY}$ within the difference signal PP1 expressed by the equation (13) are expressed by the following equations (38) and (39), respectively.

$$SUM1_{STRAY}=\alpha+\beta \quad (38)$$

$$PP1_{STRAY}=\alpha-\beta \quad (39)$$

In canceling the stray light component $PP1_{STRAY}$ within the difference signal PP1 by using a light receiving amount in the stray-light receiving surfaces O and P, a constant $k_{18}$ is determined to satisfy the following equation (40). A method of determining the constant $k_{18}$ is described later.

$$PP1_{STRAY}=k_{18}(I_O+I_P) \quad (40)$$

By the equations (39) and (40), the right side of the equation (38) can be rewritten to the following equation (41).

$$\alpha+\beta=-k_{18}(I_O+I_P)+2\alpha \quad (41)$$

Further, $\alpha$ can be written as shown in the following equation (42), and a constant $k_{19}$ can be uniquely determined from a design specification of the optical system 3. The constant $k_{21}$ is determined in a similar manner.

$$\alpha=k_{19}I_O \quad (42)$$

By the equations (38), (41), and (42), the equation (34) to cancel the stray light component $SUM1_{STRAY}$ from the sum signal SUM1 is derived by the following equation (43).

$$\begin{aligned}SUM1A &= (I_{A1}+I_{D1})+k_1(I_{E1}+I_{E3}+I_{H1}+I_{H3})-SUM1_{STRAY} \\ &= (I_{A1}+I_{D1})+k_1(I_{E1}+I_{E3}+I_{H1}+I_{H3})-(\alpha+\beta) \\ &= (I_{A1}+I_{D1})+k_1(I_{E1}+I_{E3}+I_{H1}+I_{H3}) - \\ &\quad (-k_{18}(I_O+I_P)+2\alpha) \\ &= (I_{A1}+I_{D1})+k_1(I_{E1}+I_{E3}+I_{H1}+I_{H3}) - \\ &\quad (-k_{18}(I_O+I_P)+2k_{19}I_O) \\ &= (I_{A1}+I_{D1}+k_{18}(I_O+I_P))-2k_{19}I_O+k_1 \\ &\quad (I_{E1}+I_{E3}+I_{H1}+I_{H3}) \end{aligned} \quad (43)$$

A method of determining the constant $k_{18}$ is explained below in detail. First, a stray light component XPP1 contained in the light receiving amount in the signal-light receiving surface when there is no lens shift is obtained by the following equation (44). At the right side of the equation (44), a signal light component is canceled.

$$XPP1=(I_{A1}+I_{B1}+I_{C1}+I_{D1})-k_1(I_{E1}+I_{E3}+I_{H1}+I_{H3}+I_{F1}+I_{F3}+I_{G1}+I_{G3}) \quad (44)$$

The constant $k_{18}$ is determined by the following equation (45). By the equation (45), a half of the stray light component XPP1 is canceled by using the light receiving amount in the stray-light receiving surfaces O and P. The half of the stray light component XPP1 is equal to stray light components contained in the difference signals PP1 and PP2, respectively when there is no lens shift. The constant $k_{20}$ can be the same as the constant $k_{18}$.

$$\frac{XPP}{2}=k_{18}(I_O+I_P) \quad (45)$$

While the constant $k_{18}$ can be determined in the manner as described above, a value of the constant $k_{18}$ is not necessarily strictly obtained. Therefore, the constant $k_{18}$ can be a value including an error. To obtain a tracking error signal having a few offset variations regardless of the error of the constant $k_{18}$, the isolation distance w is preferably small. This is explained by showing a simulation result.

Figure 19:
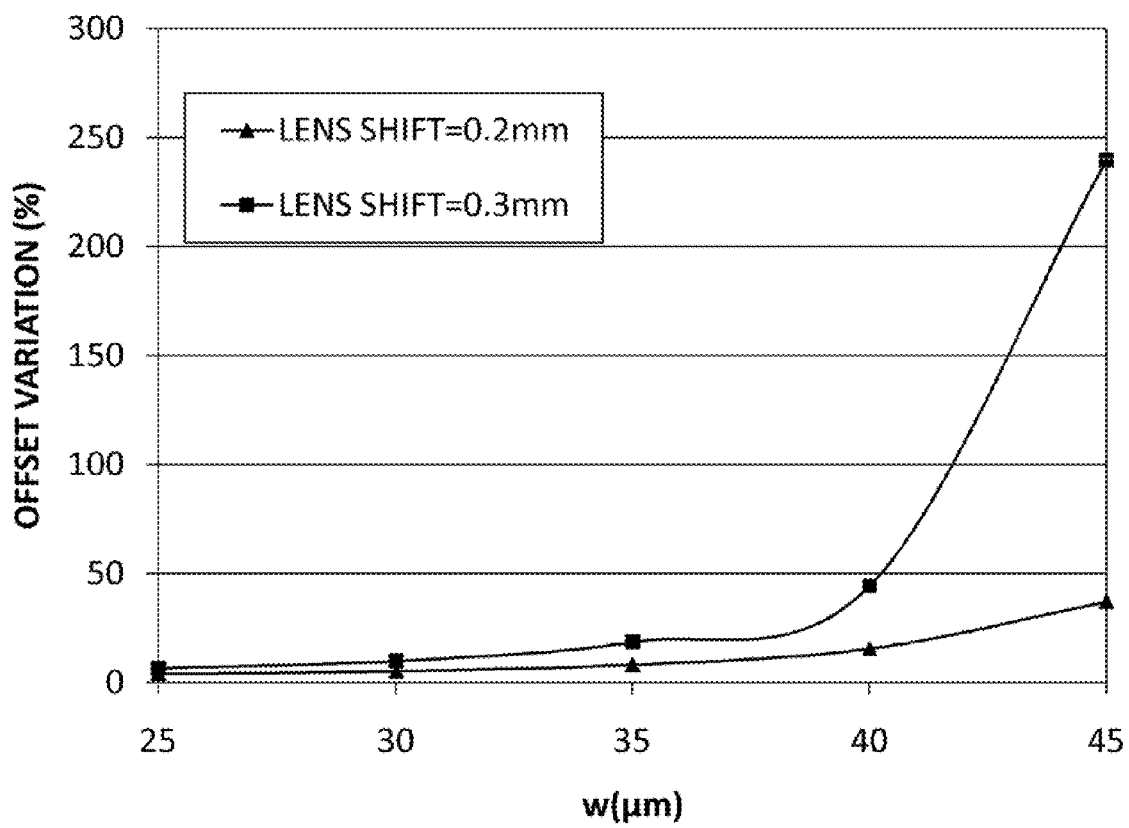
FIG. 19 shows an offset variation (%) of a tracking error signal for each lens shift amount.

FIG. 19 shows an offset variation (%) of a tracking error signal for each lens shift amount when an error of the constant $k_{18}$ is ±10%. As shown in FIG. 19, when a lens shift is any one of 0.2 mm and 0.3 mm, an offset becomes small when the isolation distance w is small. Therefore, to obtain a tracking error signal having a small offset variation regardless of the constant $k_{18}$, the isolation distance w is preferably small. Conversely, when the isolation distance w is desired to be large, an offset variation of the tracking error signal becomes large. In this case, to obtain a tracking error signal having a small offset variation regardless of the error of the constant $k_{18}$, it is preferable to obtain an optimum value by a learning process, instead of determining the constant $k_{15}$ by calculating the equation (45) only once.

When the optical disk 11 having a small interlayer distance is used, in the optical detector in FIG. 8, it can happen that a stray light spot does not appear in the stray-light receiving surface I although a stray light spot appears in the light receiving area S2A, for example. In this case, a stray light spot is arranged not to appear in the light receiving area S2A by increasing an interval between the main beam MB and the sub beams SB1 and SB2 in the light receiving surface by adjusting a diffraction angle of the diffraction grating 21. Alternatively, a stray light spot is arranged to appear in the stray-light receiving surface I, by increasing optical magnification of the optical system 3.

Second Embodiment

A second embodiment of the present invention is explained in detail next with reference to the accompanying drawings.

Configurations of the optical drive device 1 and the optical disk 11 according to the second embodiment are similar to the configurations of the optical drive device 1 and the optical disk 11 according to the first embodiment explained with reference to FIG. 1 to FIGS. 7A and 7B, except the following.

A detailed configuration of the optical detector 5 and a detailed process of the processing unit 6 included in the optical drive device 1 according to the second embodiment are explained below.

Figure 20:
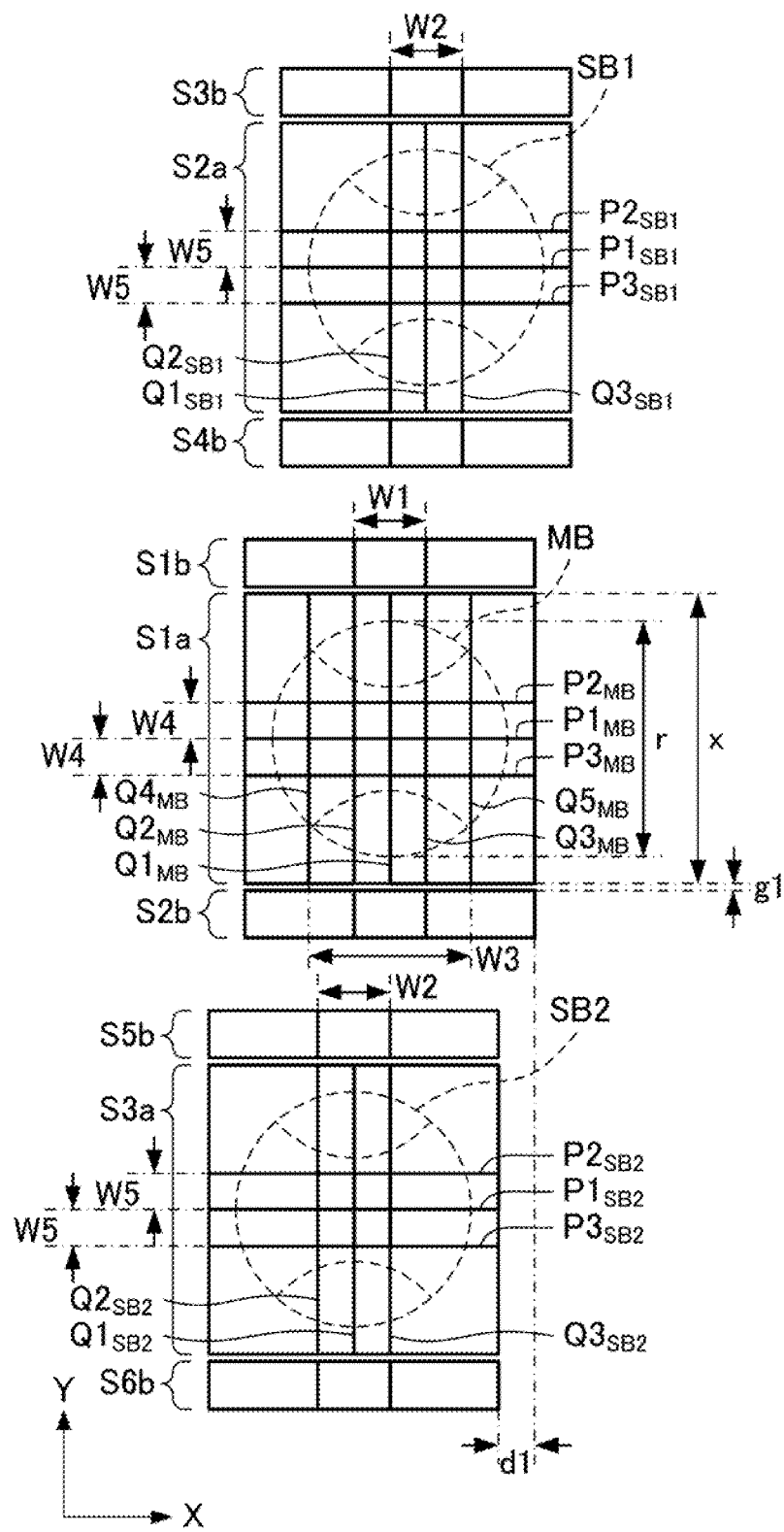
FIG. 20 is a plan view of an optical detector according to a second embodiment of the present invention.

FIG. 20 is a plan view of the optical detector 5 according to the second embodiment, and shows light receiving surfaces and light receiving areas. FIG. 20 also shows spots of signal light. As shown in FIG. 20, the optical detector 5 has nine light receiving surfaces including a main-beam receiving surface S1$a$, sub-beam receiving surfaces S2$a$ and S3$a$, and stray-light receiving surfaces S1$b$ to S6$b$.

The main-beam receiving surface S1$a$ is a quadrate having x ($\geq$a spot diameter r$\approx$50 μm) as a length of one side. The main-beam receiving surface S1$a$ is formed point-symmetrically to a spot center of the main beam MB, and line-symmetrically to a straight line P1$_{MB}$ passing through the spot center and parallel with a signal light tangent direction. The main-beam receiving surface S1$a$ is also formed line-symmetrically to a straight line Q1$_{MB}$ passing through a spot center of the main beam MB and parallel with a signal light tangent direction. Generally, a value of x is about two times a spot diameter. This is because an area necessary to receive a signal of the entire spot in performing focus control using the astigmatic method is about two times of the spot diameter.

The main-beam receiving surface S1$a$ is divided into 24 light receiving areas by eight straight lines. The eight straight lines include: the above straight line P1$_{MB}$; two straight lines P2$_{MB}$ and P3$_{MB}$ parallel with the straight line P1$_{MB}$ and isolated to mutually opposite directions by each distance W4 from the straight line P1$_{MB}$; a straight line Q1$_{MB}$ passing through a spot center of the main beam MB and parallel with a signal light radial direction; two straight lines Q2$_{MB}$ and Q3$_{MB}$ parallel with the straight line Q1$_{MB}$ and isolated to mutually opposite directions by each distance W1/2 from the straight line Q1$_{MB}$; and two straight lines Q4$_{MB}$ and Q5$_{MB}$ parallel with the straight line Q1$_{MB}$ and isolated to mutually opposite directions by each distance W3/2 from the straight line Q1$_{MB}$.

The sub-beam receiving surface S2$a$ is a quadrate of the same size as that of the main-beam receiving surface S1$a$, and is formed point-symmetrically to a spot center of the sub beam SB1, and line-symmetrically to a straight line P1$_{SB1}$ passing through the spot center and parallel with a signal light tangent direction. The sub-beam receiving surface S2$a$ is also formed line-symmetrically to a straight line Q1$_{SB1}$ passing through the spot center of the sub beam SB1 and parallel with a signal light tangent direction. The sub-beam receiving surface S3$a$ is similarly a quadrate of the same size as that of the main-beam receiving surface S1$a$, and is formed point-symmetrically to a spot center of the sub beam SB2, and line-symmetrically to a straight line P1$_{SB2}$ passing through the spot center and parallel with a signal light tangent direction. The sub-beam receiving surface S3$a$ is also formed line-symmetrically to a straight line Q1$_{SB2}$ passing through the spot center of the sub beam SB2 and parallel with a signal light tangent direction. The sub-beam receiving surface S3$a$ is arranged at the opposite side of the sub-beam receiving surface S2$a$ by sandwiching the main-beam receiving surface S1$a$.

The sub-beam receiving surfaces S2$a$ and S3$a$ are arranged at mutually opposite directions by d1 to a signal light tangent direction from the main-beam receiving surface S1$a$. This is because, in the second embodiment, spot positions of the main beam MB and the sub beam SB1 are deviated to a signal light tangent direction by d1. A size of a deviation of the beams changes depending on configurations of the optical system 3. Therefore, a detailed value of the distance d1 can be suitably determined corresponding to the configuration of the optical system 3.

The sub-beam receiving surfaces S2$a$ and S3$a$ are divided into 16 light receiving areas by six straight lines (six lines excluding straight lines corresponding to the straight lines Q4$_{MB}$ and Q5$_{MB}$; for the sub-beam receiving surface S2$a$, six lines including the straight line P1$_{SB1}$ to P3$_{SB1}$ and the straight line Q1$_{SB1}$ to Q3$_{SB1}$; for the sub-beam receiving surface S3$a$, six lines including the straight line P1$_{SB2}$ to P3$_{SB2}$ and the straight line Q1$_{SB2}$ to Q3$_{SB2}$) arranged in a similar manner to that of the main-beam receiving surface S1$a$. However, a distance between the straight lines Q2$_{SB1}$ and Q3$_{SB1}$ respectively and the straight line Q1$_{SB1}$, and a distance between the straight lines Q2$_{SB2}$ and Q3$_{SB2}$ respectively and the straight line Q2$_{SB2}$ are W2/2 instead of W1/2. W2 can be equal to W1 or not equal to W1. A distance between the straight lines P2$_{SB1}$ and P3$_{SB1}$ respectively and the straight line P1$_{SB1}$, and a distance between the straight lines P2$_{SB2}$ and P3$_{SB2}$ respectively and the straight line P1$_{SB2}$ are W5 instead of W4. W5 can be equal to W4 or not equal to W4.

While the main-beam receiving surface S1$a$ and the sub-beam receiving surfaces S2$a$ and S3$a$ are quadrate in the above explanations, shapes of these light receiving surfaces are not limited to quadrate.

The stray-light receiving surface S1$b$ is a rectangle having the same width and the same position as those of the main-beam receiving surface S1$a$ in a signal light tangent direction. The stray-light receiving surface S1$b$ is isolated by the predetermined distance g1 ($\geq$0) to one side of the main-beam receiving surface S1$a$ in a signal light radial direction (upper side in FIG. 20). The stray-light receiving surface S2$b$ is also a rectangle having the same width and the same position as those of the main-beam receiving surface S1$a$ in a signal light tangent direction. The stray-light receiving surface S2$b$ is isolated by the predetermined distance g1 to the other side of the main-beam receiving surface S1$a$ in a signal light radial direction (lower side in FIG. 20). The stray-light receiving surfaces S1$b$ and S2$b$ are divided into three light receiving areas by the lines Q2$_{MB}$ and Q3$_{MB}$ mentioned above.

The stray-light receiving surface S3$b$ is a rectangle having the same width and the same position as those of the sub-beam receiving surface S2$a$ in a signal light tangent direction. The stray-light receiving surface S3$b$ is isolated by the predetermined distance g1 to one side of the sub-beam receiving surface S2$a$ in a signal light radial direction (upper side in FIG. 20). The stray-light receiving surface S4$b$ is also a rectangle having the same width and the same position as those of the sub-beam receiving surface S2$a$ in a signal light tangent direction. The stray-light receiving surface S4$b$ is isolated by the predetermined distance g1 to the other side of the sub-beam receiving surface S2$a$ in a signal light radial direction (lower side in FIG. 20). The stray-light receiving surfaces S3$b$ and S4$b$ are divided into three light receiving areas by the lines Q2$_{SB1}$ and Q3$_{SB1}$ mentioned above.

The stray-light receiving surface S5$b$ is a rectangle having the same width and the same position as those of the sub-beam receiving surface S3$a$ in a signal light tangent direction. The stray-light receiving surface S5$b$ is isolated by the predetermined distance g1 to one side OF the sub-beam receiving surface S3$a$ in a signal light radial direction (upper side in FIG. 20). The stray-light receiving surface S6$b$ is also a rectangle having the same width and the same position as those of the sub-beam receiving surface S3$a$ in a signal light tangent direction. The stray-light receiving surface S5$b$ is isolated by the predetermined distance g1 to the other side of the sub-beam receiving surface S3$a$ in a signal light radial direction (lower side in FIG. 20). The stray-light receiving surfaces S5$b$ and S6$b$ are divided into three light receiving areas by the lines Q2$_{SB2}$ and Q3$_{SB2}$ mentioned above.

As described above, each light receiving surface of the optical detector 5 is divided into a plural of light receiving areas, and the optical detector 5 outputs a signal having amplitude of a value (a light receiving amount) obtained by surface integrating intensity of the optical beam in a light receiving surface, for each light receiving area.

Figure 21:
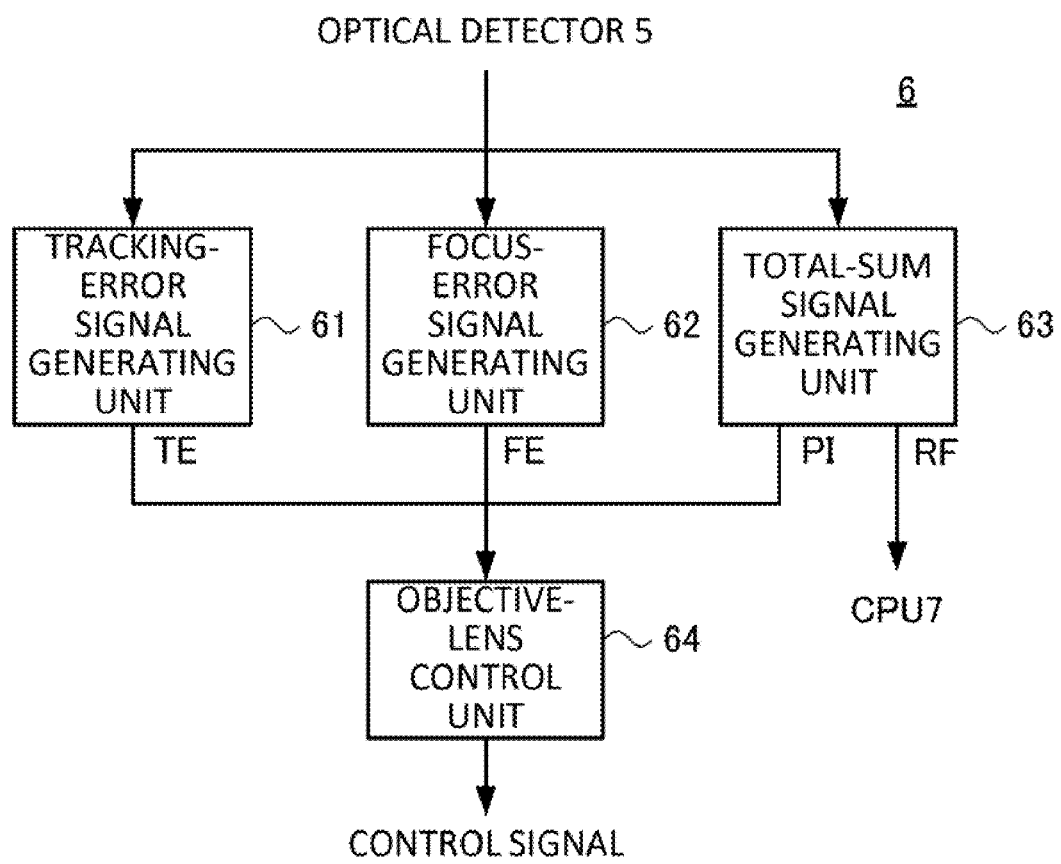
FIG. 21 is a functional block diagram of a processing unit according to the second embodiment.

FIG. 21 is a functional block diagram of a part of the processing unit 6. As shown in FIG. 21, the processing unit includes a tracking-error signal generating unit 61 (tracking-error signal generator), a focus-error signal generating unit 62 (focus-error signal generator), a total-sum signal generating unit 63 (total-sum signal generator), and an objective-lens control unit 64.

The tracking-error signal generating unit 61 generates the tracking error signal TE based on an output signal of the optical detector 5. Detailed generation processes are varied in many ways, and thus they are explained collectively.

The focus-error signal generating unit 62 generates the focus error signal FE based on an output signal of the optical detector 5. The generation process is also described later in detail.

The total-sum signal generating unit 63 generates the pull-in signal PI and the RF signal RF based on an output signal of the optical detector 5. Both the pull-in signal PI and the RF signal RF are signals (total-sum signals) obtained by adding output signals of all right-receiving areas constituting the main-beam receiving surface S1a, and have the same content. However, in a second embodiment (A) of the present invention described later, the total-sum signal generating unit 63 generates a total-sum signal based on a light receiving amount at a portion of the width W3 at the center of a signal light tangent direction, in light receiving areas constituting the main-beam receiving surface S1a. The pull-in signal PI and the RF signal RF are different in their usages. The pull-in signal PI is used to recognize the layers described above, and the RF signal is used as a CPU data signal. Details of this generation process are also described later.

The objective-lens control unit 64 monitors the pull-in signal PI generated by the total-sum signal generating unit 63. When a value of the pull-in signal PI exceeds a predetermined value (layer recognition), the objective-lens control unit 64 generates a control signal of the objective lens 4 based on the focus error signal FE generated by the focus-error signal generating unit 62, and outputs the generated control signal to an actuator (not shown) to control the position of the objective lens 4 (focus servo). The objective-lens control unit 64 also generates a control signal of the objective lens 4 based on the tracking error signal TE generated by the tracking-error signal generating unit 61, and outputs the generated control signal to an actuator (not shown) to control the position of the objective lens 4 (tracking servo). Normally, the tracking servo is performed in a state of applying focus servo (a state that an optical beam passed through the objective lens 4 is focused on the recording surface; that is called "on-focus state").

Generation of signals by each signal generating unit is explained below in detail. The following explanations are divided into 2 parts: the second embodiment (A) and a second embodiment (B), according to how to use division lines of the optical detector 5.

Second Embodiment (A)

Figure 22:
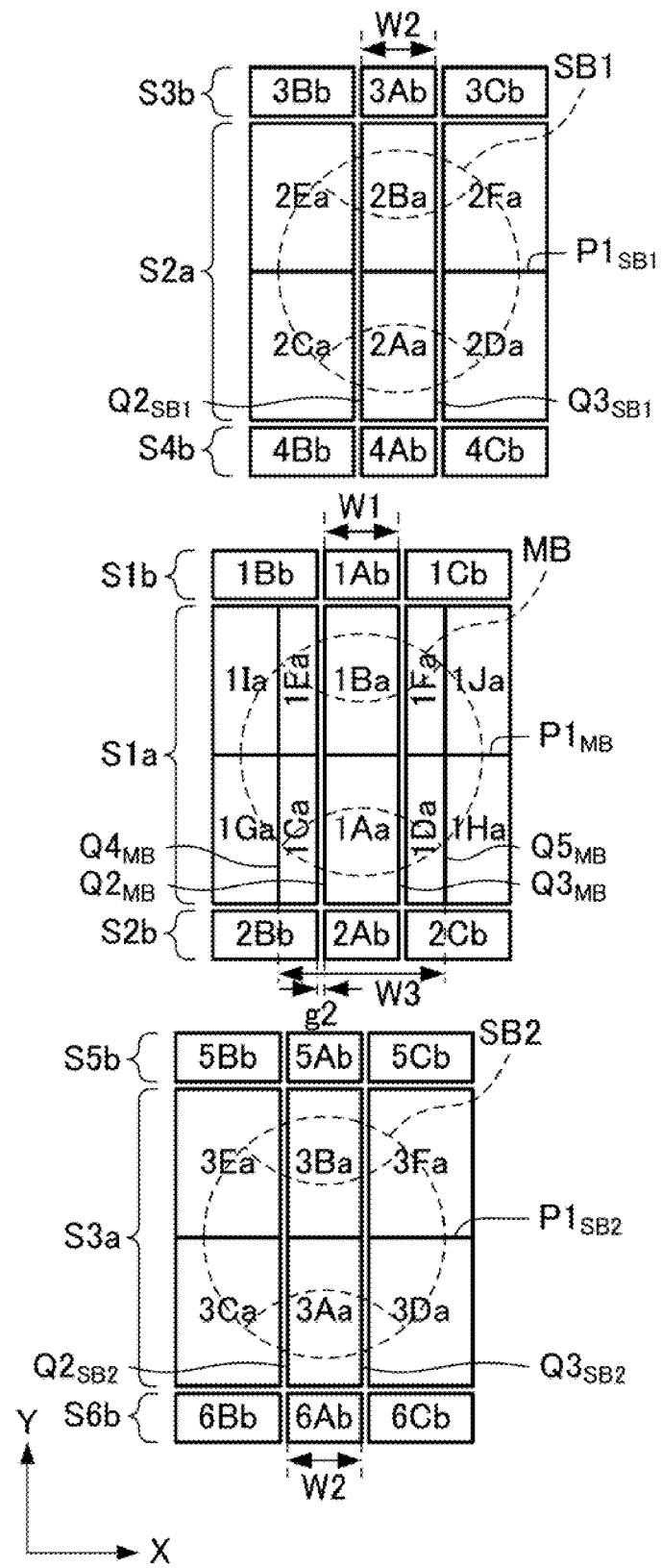
FIG. 22 is a plan view of an optical detector according to a second embodiment (A) of the present invention.

First, FIG. 22 shows how to use division lines according to the second embodiment (A). As shown in FIG. 22, in the optical detector 5 according to the second embodiment (A), the main-beam receiving surface S1a is divided into ten areas including divided areas 1Aa to 1Ja by the straight lines P1$_{MB}$, Q2$_{MB}$, Q3$_{MB}$, Q4$_{MB}$, and Q5$_{MB}$. These divided areas 1Aa to 1Ja are arranged in the order of the divided areas 1Ca, 1Ga, 1Ia, 1Ea, 1Ba, 1Fa, 1Ja, 1Ha, and 1Da, in a clockwise direction from the divided area 1Aa positioned at the center of a lower side of the drawing of the main-beam receiving surface S1a.

The sub-beam receiving surface S2a is divided into six areas including divided areas 2Aa to 2Fa by the straight lines P1$_{SB1}$, Q2$_{SB1}$, and Q3$_{SB1}$. These divided areas 2Aa to 2Fa are arranged in the order of the divided areas 2Ca, 2Ea, 2Ba, 2Fa, and 2Da, in a clockwise direction from the divided area 2Aa positioned at the center of a lower side of the drawing of the sub-beam receiving surface S2a.

The sub-beam receiving surface S1a is also divided into six areas including divided areas 3Aa to 3Fa by the straight lines P1$_{SB2}$, Q2$_{SB2}$, and Q3$_{SB2}$, in a similar manner to that of the sub-beam receiving surface S2a. These divided areas 3Aa to 3Fa are arranged in the order of the divided areas 3Ca, 3Ea, 3Ba, 3Fa, and 3Da, in a clockwise direction from the divided area 3Aa positioned at the center of a lower side of the drawing of the sub-beam receiving surface S1a.

As shown in FIG. 22, in the second embodiment (A), the straight lines P2$_{MB}$, P3$_{MB}$, P2$_{SB1}$, P3$_{SB1}$, P2$_{SB2}$, P3$_{SB2}$, Q1$_{MB}$, Q1$_{SB1}$, and Q1$_{SB2}$ are not used as division lines. A state that "the straight lines are not used as division lines" includes a state that the straight lines are not substantially divided, by the operation of the processing unit 6 that uses total output signals of divided areas adjacent by sandwiching the straight lines, in addition to a state of not really dividing the straight lines.

Each of the straight-light receiving areas S1b to S6b is divided into three light receiving areas shown in FIG. 22 by the corresponding straight lines Q2$_{MB}$ and Q3$_{MB}$. Specifically, the stray-light receiving surface S1b is divided into light receiving areas 1Bb, 1Ab, and 1Cb in this order from the left side in FIG. 22. The stray-light receiving surface S2b is divided into light receiving areas 2Bb, 2Ab, and 2Cb in this order from the left side in FIG. 22. The stray-light receiving surface S1b is divided into light receiving areas 3Bb, 3Ab, and 3Cb in this order from the left side in FIG. 22. The stray-light receiving surface S4b is divided into light receiving areas 4Bb, 4Ab, and 4Cb in this order from the left side in FIG. 22. The stray-light receiving surface S5b is divided into light receiving areas 5Bb, 5Ab, and 5Cb in this order from the left side in FIG. 22. The stray-light receiving surface S6b is divided into light receiving areas 6Bb, 6Ab, and 6Cb in this order from the left side in FIG. 22.

The light receiving areas 1Ca and 1Da are provided in isolation by a predetermined distance g2 (>0) from the straight lines Q2$_{MB}$ and Q3$_{MB}$. This similarly applies to the light receiving areas 1Ea, 1Fa, 2Ca, 2Da, 2Ea, 2Fa, 3Ca, 3Da, 3Ea, 3Fa, 1Bb, 1Cb, 2Bb, 2Cb, 3Bb, 3Cb, 4Bb, 4Cb, 5Bb, 5Cb, 6Bb, and 6Cb. In this way, each division line can be slightly isolated from each light receiving area.

Each signal generating unit according to the second embodiment (A) generates various signals by using a part or all of the above divided areas. First, a tracking-error signal generation process performed by the tracking-error signal generating unit 61 is explained. Thereafter, a signal generation process performed by the focus-error signal generating unit 62 and the total-sum signal generating unit 63 are explained.

[Tracking-Error Signal Generation Process]

In the second embodiment (A), the tracking-error signal generating unit 61 generates the main push-pull signal MPP based on a light receiving amount at portions (the light receiving areas 1Aa and 1Ba) of the width W1 at the center of a signal light tangent direction in the main-beam receiving surface S1a, generates the sub push-pull signal SPP based on a light receiving amount at portions (the light receiving areas 2Aa, 2Ba, 3Aa, and 3Ba) of the width W2 at the center of a signal light tangent direction in the sub-beam receiving surfaces S2a and S3a, and generates the tracking error signal TE based on the main push-pull signal MPP and the sub push-pull signal SPP.

Specifically, the tracking-error signal generating unit 61 generates each of the above signals by the following equations (46) to (48). In the equations, $I_x$ represents an output signal corresponding to the light receiving area X. In the equations, $k_1$ is a positive constant, and this value is adjusted in advance to minimize influence of a lens shift offset appearing in the tracking-error signal TE. This adjustment is performed based on an actual measurement result.

$$MPP = I_{1Ba} - I_{1Aa} \quad (46)$$

$$SPP = (I_{2Ba} + I_{3Ba}) - (I_{2Aa} + I_{3Aa}) \quad (47)$$

$$TE = MPP - k_1 SPP \quad (48)$$

The tracking-error signal generating unit 61 also generates the main sum signal SUMm based on a light receiving amount at portions (the light receiving areas 1Aa and 1Ba) of the width W1 at the center of a signal light tangent direction in the main-beam receiving surface S1a, generates the sub sum signal SUMS based on a light receiving amount at portions (the light receiving areas 2Aa, 2Ba, 3Aa, and 3Ba) of the width W2 at the center of a signal light tangent direction in the sub-beam receiving surfaces S2a and S1a, and can further generate the tracking error signal TE based on the normalized main push-pull signal MPPN obtained by normalizing the main push-pull signal MPP by the main sum signal SUMm, and the normalized sub push-pull signal SPPN obtained by normalizing the sub push-pull signal SPP by the sub sum signal SUMs.

The following equations (49) to (53) are detailed generation equations, where $k_2$ represents a positive constant. This value is adjusted in advance to minimize influence of a lens shift offset appearing in the tracking-error signal TE, in a similar manner to that of the constant $k_1$. When there is no influence of stray light, normally $k_2$ is equal to 1.

$$SUMm = I_{1Ba} + I_{1Aa} \quad (49)$$

$$MPPN = \frac{MPP}{SUMm} \quad (50)$$

$$SUMs = (I_{2Ba} + I_{3Ba}) + (I_{2Aa} + I_{3Aa}) \quad (51)$$

$$SPPN = \frac{SPP}{SUMs} \quad (52)$$

$$TE = MPPN - k_2 SPPN \quad (53)$$

When the tracking error signal TE is generated by the equation (53), amplitude of the tracking error signal TE can be increased more than that when the equation (48) is used. The normalized main push-pull signal MPPN and the normalized sub push-pull signal SPPN have a characteristic of having larger amplitude when the widths W1 and W2 used to generate these normalized signals are smaller. This is because when the widths W1 and W2 are smaller, the proportion of the push-pull areas becomes larger. That is, when the widths W1 and W2 of the light receiving areas are smaller, an offset amount of the tracking error signal TE (described later) can be decreased. In amplifying the tracking error signal TE by an amplifier, the amplifier does not need to increase the gain, and noise generated by the amplifier is not increased. As a result, the offset amount of the tracking error signal TE can be decreased. The former is explained below.

Figure 23:
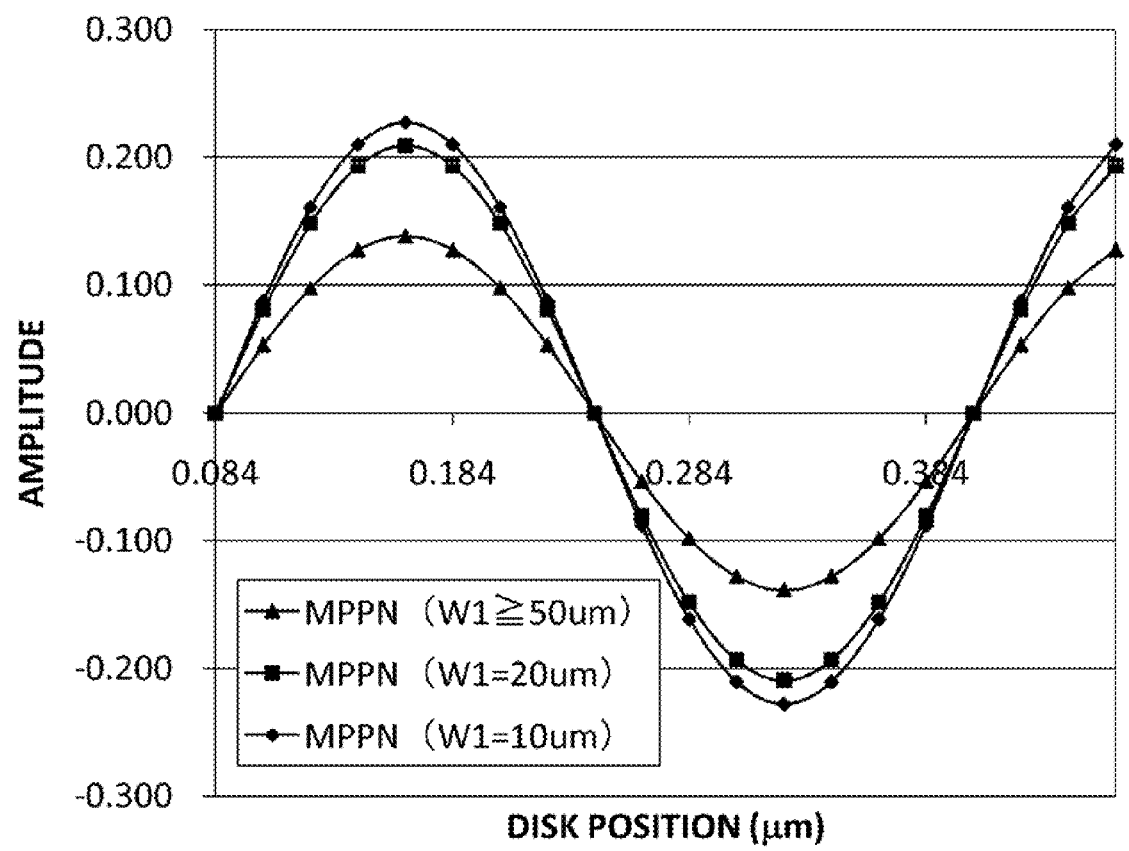
FIG. 23 is a plot diagram of a normalized main push-pull signal MPPN according to the second embodiment (A), obtained by a simulation for a width W1 at positions (μm) relative to a disk.
Figure 24:
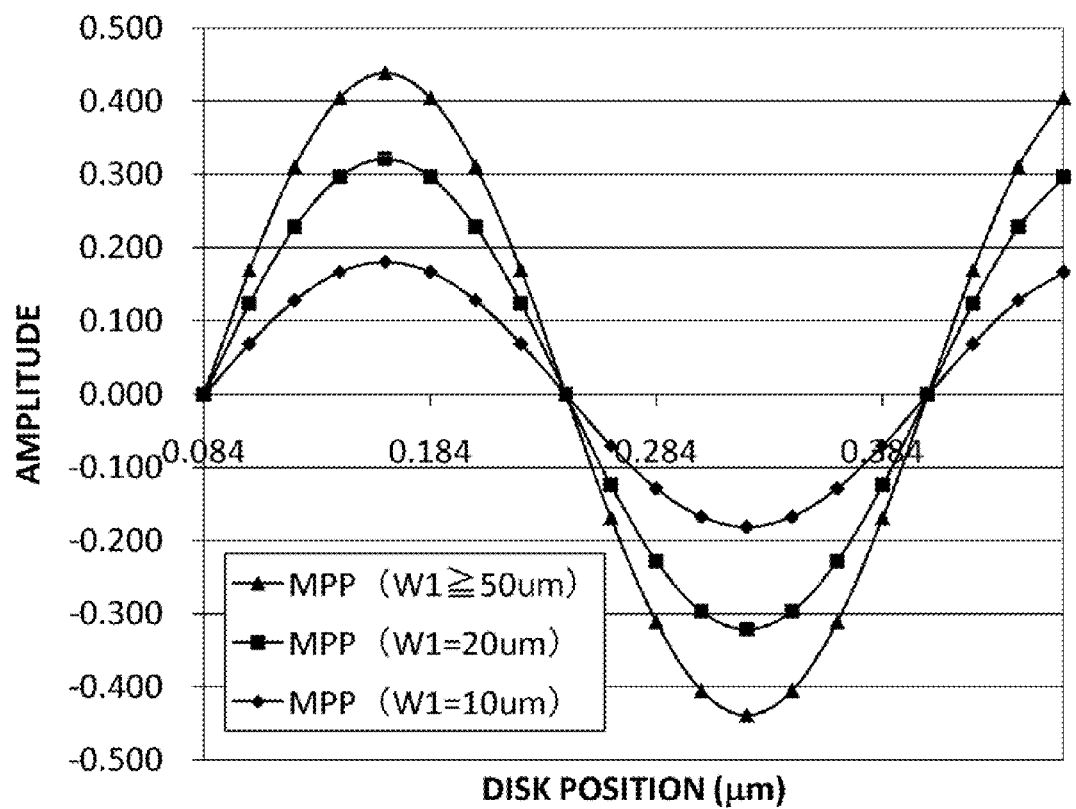
FIG. 24 shows a main push-pull signal MPP according to the second embodiment (A), plotted by the same conditions as those in FIG. 23.
Figure 29:
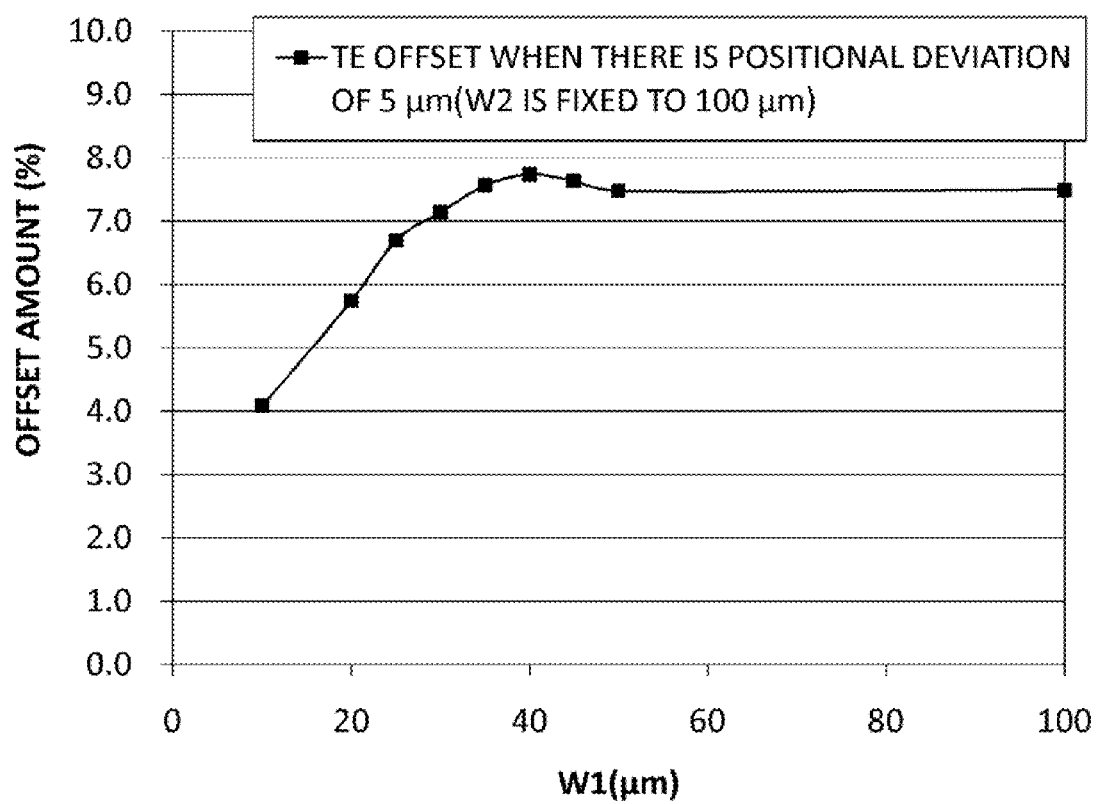
FIG. 29 shows a result of simulating again the simulation shown in FIG. 26, by adding a condition that a position of the optical detector is deviated by 5 μm from a correct position to a signal light tangent direction.

FIG. 23 is a plot diagram of the normalized main push-pull signal MPPN obtained by a simulation for each width W1 at positions (μm) relative to a disk. FIG. 24 is a plot diagram of the main push-pull signal MPP as a comparative example, plotted in the same conditions as those in FIG. 23. As shown in these drawings, the amplitude of the main push-pull signal MPP becomes smaller when the width W1 is smaller. However, when normalization is not performed, there is a variation of a reflectance ratio, and this cannot be easily applied. This indicates that to decrease the offset amount of the tracking error signal TE by decreasing the width W1, the normalized main push-pull signal MPPN must be used instead of the main push-pull signal MPP, as the tracking error signal TE. That is, when the main push-pull signal, MPP which is not normalized is used, a new noise component generated in an amplifier circuit and a transmission path is also amplified, and this noise component appears as an offset. Therefore, depending on the noise component, an offset amount of the tracking error signal TE expressed by the equation (11) increases as a result. FIGS. 23 and 29 show cases that the width W1=10 μm and 20 μm, and W1≧50 μm (=spot diameter) as a comparative example. In this simulation, an optical magnification of the optical system 3 is set as 15 times, the optical disk 11 is a one-layer optical disk having a track pitch 0.32 μm and a trench depth 0.02 μm, and a length x of one side of the main-beam receiving surface S1a is set as 100 μm. The main push-pull signal MPP and the main sum signal SUMm are obtained by surface integrating intensity of the main beam MB in the light receiving areas. 1Aa and 1Ba, respectively. Influence of stray light (a light receiving amount of stray light and an offset generated by interference between signal light and stray light) is not taken into consideration.

It can be understood from FIG. 23 that when the width w1 is smaller, the amplitude of the normalized main push-pull signal MPPN increases. On the other hand, as shown in FIG. 24, the amplitude of the main push-pull signal MPP becomes smaller when the width W1 is smaller.

Figure 25:
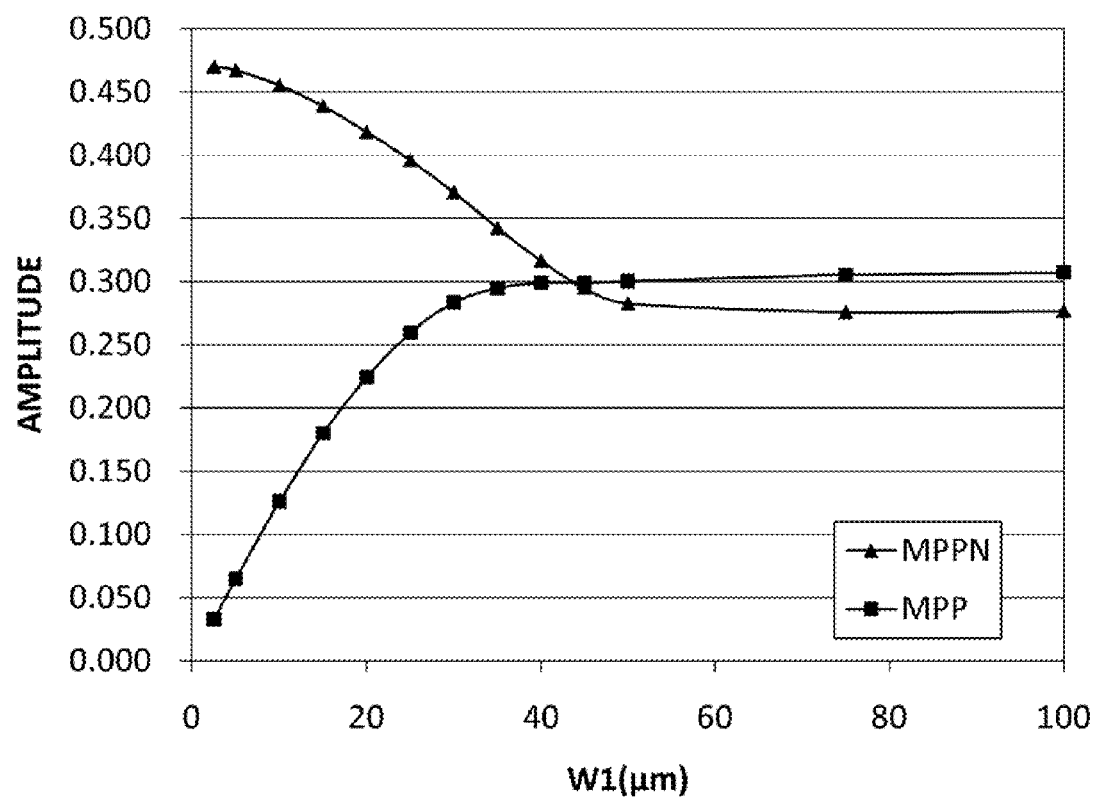
FIG. 25 is a plot diagram of a main push-pull signal MPP and a normalized main push-pull signal MPPN according to the second embodiment (A), obtained by plotting amplitude using more values of the width W1.

FIG. 25 is a plot diagram of the main push-pull signal MPP and the normalized main push-pull signal MPPN obtained by plotting amplitude using more values of the width W1. Simulation conditions are similar to those in FIG. 23. However, the amplitude of the main push-pull signal MPP is expressed as 35%, by considering that amplitude of the main push-pull signal MPP which is not normalized varies due to a record boundary or other reflectance variation. It can be also understood from FIG. 25 that when the width W1 is decreased, the normalized main push-pull signal MPPN becomes large and the main push-pull signal MPP becomes small.

In addition, according to FIG. 25, when the width W1 becomes smaller than 10 μm (20% of the spot diameter 50 μm), amplitude of the normalized main push-pull signal MPPN is substantially saturated, and stabilized. Therefore, to achieve stable tracking servo, the width W1 is preferably smaller than 20% of the spot diameter. However, actually, the width W1 cannot be set smaller than 20% of the spot diameter for manufacturing reasons. In this case, the width W1 is preferably a manufacturing limit value.

Furthermore, when the width W1 is minimized as far as possible, an offset generated due to a positional deviation of the spot of the main beam MB to a signal light tangent direction can be decreased. This is because a change of a light receiving amount when a spot is deviated becomes small.

Generally, the offset amount $S_{OFFSET}$ of the signal S is expressed by the equation (11) by using the amplitude $S_{AMPLITUDE}$ and the offset displacement $S_{DISPLACEMENT}$. The offset displacement $S_{DISPLACEMENT}$ can be obtained by subtracting a signal $S_0$ having no offset from the signal S. That is, $S_{DISPLACEMENT}=S-S_0$. A unit of the offset displacement $S_{DISPLACEMENT}$ is the same as the amplitude, and a unit of the offset amount $S_{OFFSET}$ is %.

When the width W1 is decreased, the amplitude of the normalized main push-pull signal MPPN becomes large as described above. Therefore, when the width W1 is smaller than that in the equation (11), the offset amount of the normalized main push-pull signal MPPN is decreased. This similarly applies to the normalized sub push-pull signal SPPN, and the offset amount of the normalized sub push-pull signal SPPN is decreased when the width W2 is decreased. Accordingly, the offset amount of the tracking error signal TE can be decreased by decreasing the widths W1 and W2.

When the optical disk 11 is a multilayered optical disk, the offset displacement of the normalized main push-pull signal MPPN also becomes small. That is, when the optical disk 11 is a multilayered optical disk, each light receiving area receives stray light in addition to the signal light. Displacement of this stray light component occurs in the normalized main push-pull signal MPPN. When the width W1 is smaller, the proportion of the light receiving amount of the stray light in the light receiving amount of the signal light becomes smaller. This is because the light receiving amount of the signal light increases nearer the center of the light receiving area S1a, although it can be considered that the light receiving amount of the stray light is substantially uniform in the entire area of the light receiving area S1a. Therefore, when the width W1 is smaller, the offset displacement of the normalized main push-pull signal MPPN becomes smaller. As a result, the offset amount of the normalized main push-pull signal MPPN expressed by the equation (17) is further decreased.

A case of taking the influence of stray light is explained next. The influence of stray light can be decreased by various methods described later. A method of decreasing the influence of stray light by adjusting the widths W1 and W2 of the light receiving area is explained below.

Figure 26:
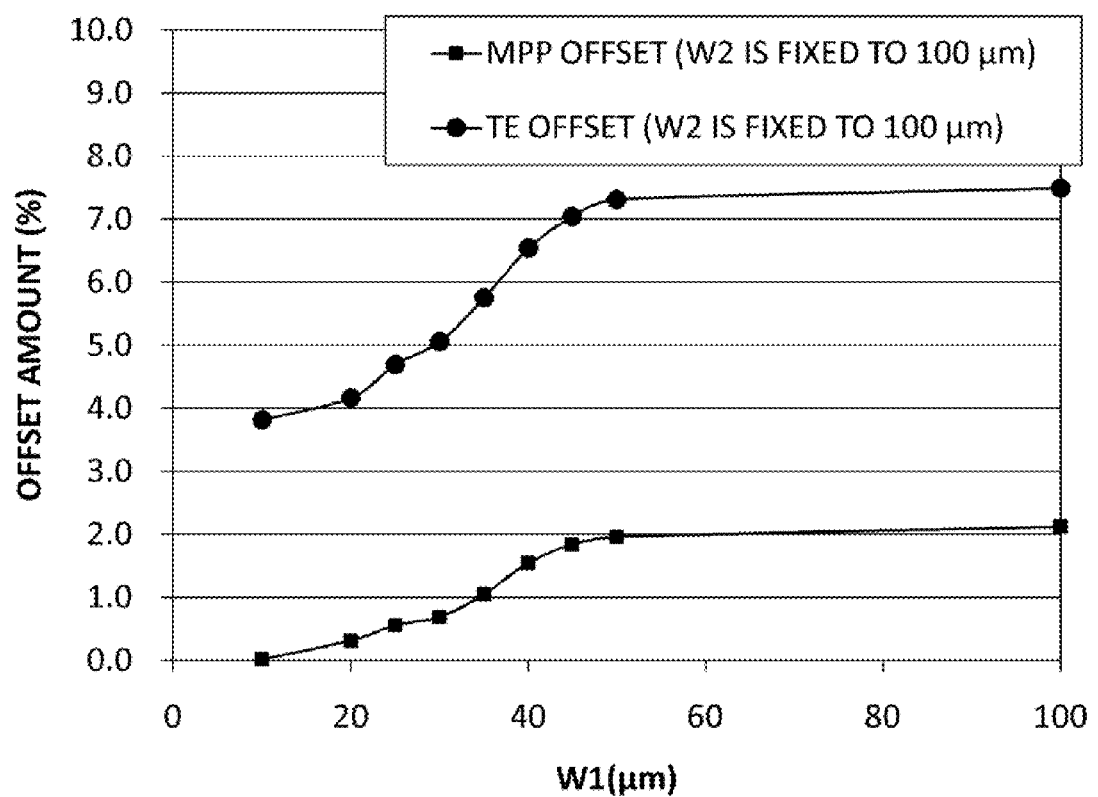
FIG. 26 shows a result of simulating an amount of offset appearing in the main push-pull signal MPP and a tracking error signal TE according to the second embodiment (A), when the width W2 is fixed to two times of a spot diameter and when the width W1 is changed.

FIG. 26 shows a result of simulating an offset amount (%) of an offset (an offset generated by stray light) appearing in the main push-pull signal MPP and the tracking error signal TE, when the width W2 is fixed to 100 μm (=two times of a spot diameter) and when the width W1 is changed in a range from 10 μm to 100 μm. On the other hand, FIG. 27 shows a result of simulating an offset amount (%) of an offset appearing in the sub push-pull signal SPP and the tracking error signal TE, when the width W1 is fixed to 100 μm (=two times of a spot diameter) and when the width W2 is changed in a range from 10 μm to 100 μm.

Figure 27:
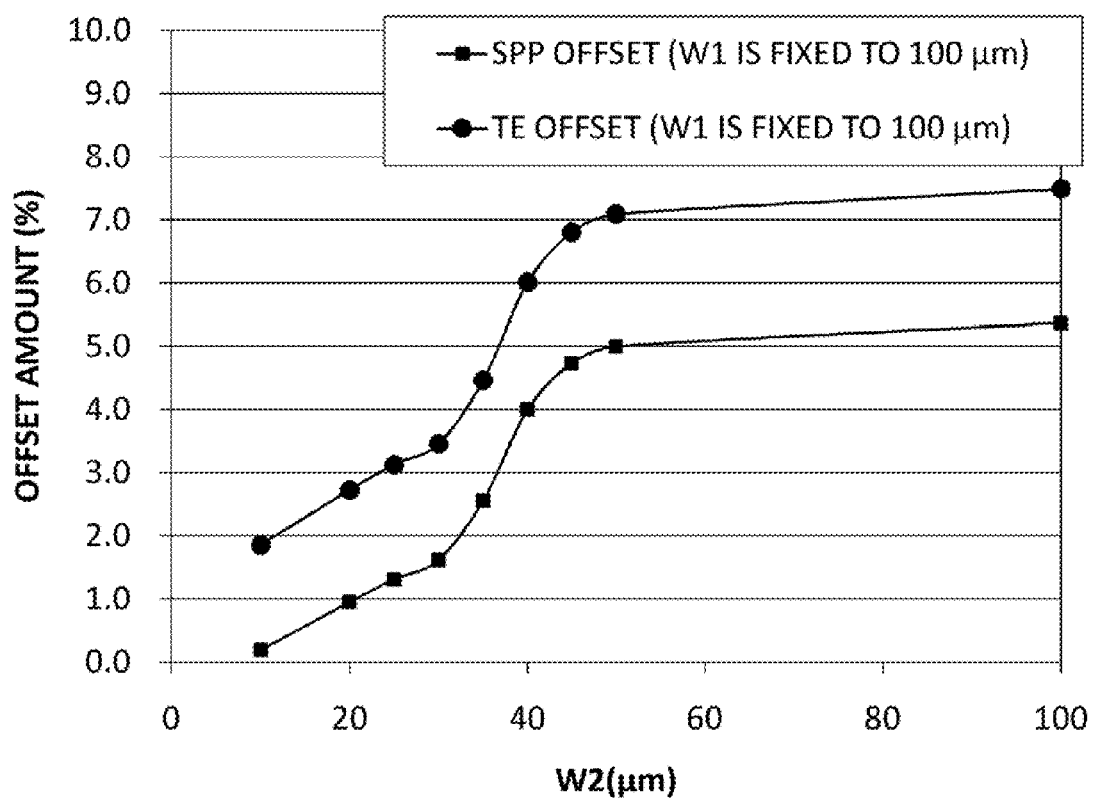
FIG. 27 shows a result of simulating an offset amount appearing in a sub push-pull signal SPP and the tracking error signal TE according to the second embodiment (A), when the width W1 is fixed to two times of a spot diameter and when the width W2 is changed.

In the simulation in FIGS. 26 and 27, it is assumed that the main beam MB, the sub beams SB1 and SB2, and stray light of the main beam are irradiated to the optical detector 5, and the output beam $I_x$ corresponding to each light receiving area X is simulated. The tracking error signal TE is generated by the equation (16). A simulation is performed by changing a size of the lens shift by every 0.05 mm from 0 mm to 0.3 mm, and the amount (%) of offsets generated in the tracking error signal TE are plotted. A value of the constant $k_2$ used in this simulation is determined as follows. First, a value of the constant $k_2$ is provisionally determined. In this state, a size of the lens shift is changed by every 0.05 mm from 0 mm to 0.3 mm, and the amount (%) of offsets generated in the tracking error signal TE are plotted. A plus maximum value and an absolute value of a minus maximum value are obtained. This is repeated while changing the value of the constant $k_2$. A simulation is performed by using a value of the constant $k_2$ which minimizes a difference between the two obtained values (a plus maximum value and an absolute value of a minus maximum value). Optical magnification of the optical system 3 is set as 15 times, the optical disk 11 is a two-layer optical disk having an interlayer distance of 10 μm, and the length x of one side of the main-beam receiving surface S1a is set as 100 μm.

Figure 57:
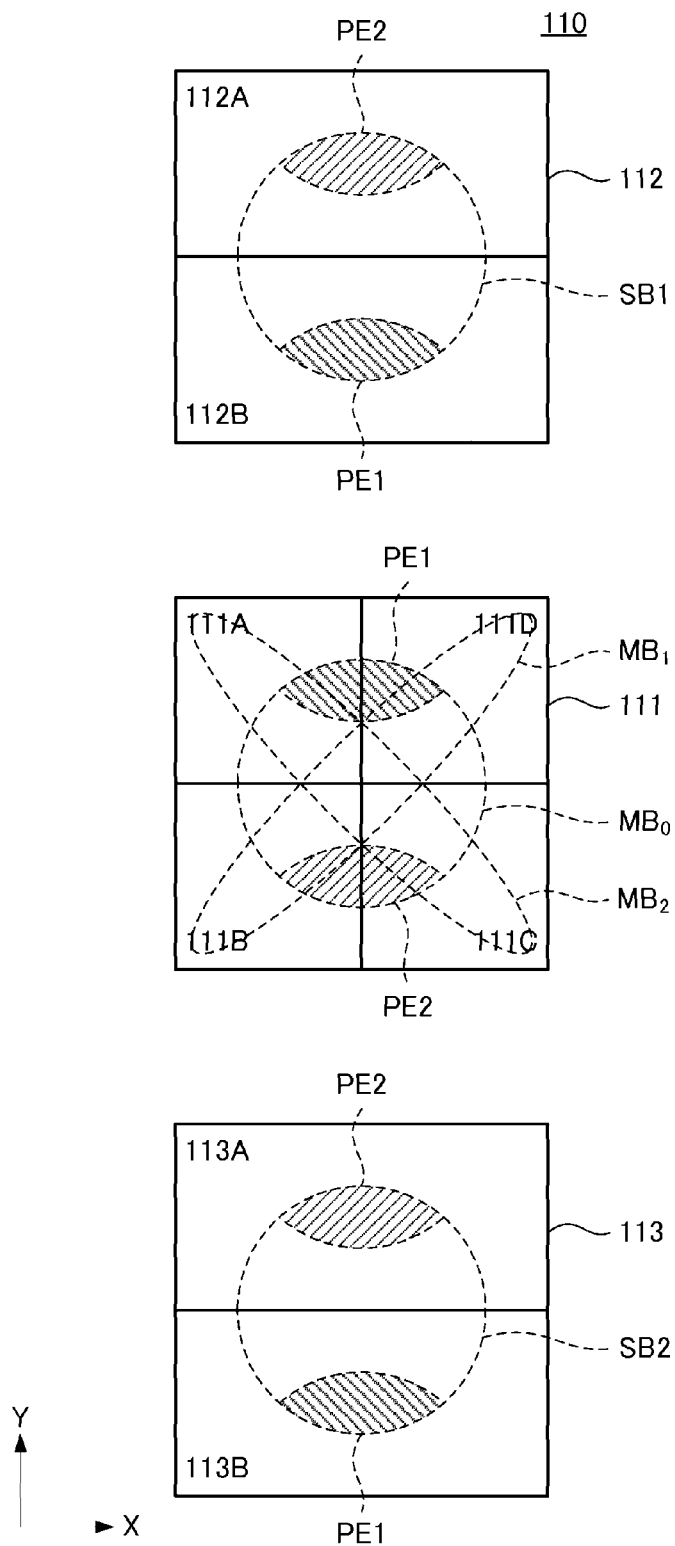

For signal light components $I_{1Aa\_SIGNAL}$ and $I_{1Ba\_SIGNAL}$ of output signals corresponding to the light receiving areas 1Aa and 1Ba within the main-beam receiving surface S1a, intensity of the main beam MB is obtained by surface integrating in the corresponding light receiving areas 1Aa and 1Ba. On the other hand, intensities of signal light components $I_{2Aa\_SIGNAL}$, $I_{2Ba\_SIGNAL}$, $I_{3Aa\_SIGNAL}$, and $I_{3Ba\_SIGNAL}$ of output signals corresponding to the light receiving areas 2Aa, 2Ba, 3Aa, and 3Ba within the sub-beam receiving surface S2a, S3a are assumed to be 1/10 of the signal light components $I_{1Aa\_SIGNAL}$ and $I_{1Ba\_SIGNAL}$ of the output signals. That is, these are calculated by the following equations (54) and (55). The equations (54) and (55) reflect a fact that a positional relationship between the push-pull area PE1 and the push-pull area PE2 are opposite for the main beam MB and the sub beams SB1 and SB2 (see FIG. 57).

$$I_{2Aa\_SIGNAL} = I_{3Aa\_SIGNAL} = \frac{1}{10} \cdot I_{1Ba\_SIGNAL} \quad (54)$$

$$I_{2Ba\_SIGNAL} = I_{3Ba\_SIGNAL} = \frac{1}{10} \cdot I_{1Aa\_SIGNAL} \quad (55)$$

For stray light components $I_{1Aa\_STRAY}$ and $I_{1Ba\_STRAY}$ of output signals corresponding to the light receiving areas 1Aa and 1Ba within the main-beam receiving surface S1a, intensity of the stray light of the main beam MB is obtained by surface integrating in the corresponding light receiving areas 1Aa and 1Ba. For stray light components $I_{2Aa\_STRAY}$, $I_{2Ba\_STRAY}$, $I_{3Aa\_STRAY}$, and $I_{3Ba\_STRAY}$ of output signals corresponding to the light receiving areas 2Aa, 2Ba, 2Aa, and 3Ba within the sub-beam receiving surface S2a, intensities of the stray light are similarly obtained.

An interference component $\Delta I_x$ between the main beam MB appearing in the output signal $I_x$ in the light receiving area X and the stray light of the main beam MB is obtained by the following equation (56). In the equation, $\phi_x$ represents a phase difference between interference light.

$$\Delta I_X = (I_{X\_SIGNAL} \cdot I_{X\_STRAY})^{\frac{1}{2}} \cdot \cos\varphi_X \quad (56)$$

The main push-pull signal MPP, the main sum signal SUMm, the sub push-pull signal SPP, and the sub sum signal SUMs obtained as a result of calculating each output signal as described above become as shown in the following equations (57) to (60).

$$MPP = (I_{1Ba\_SIGNAL} - I_{1Aa\_SIGNAL}) + (I_{1Ba\_STRAY} - I_{1Aa\_STRAY}) + \quad (57)$$
$$\left\{ \begin{array}{l} (I_{1Ba\_SIGNAL} \cdot I_{1Ba\_STRAY})^{\frac{1}{2}} \cdot \cos\varphi_{1Ba} - \\ (I_{1Aa\_SIGNAL} \cdot I_{1Aa\_STRAY})^{\frac{1}{2}} \cdot \cos\varphi_{1Aa} \end{array} \right\}$$

-continued $$SUMm = (I_{1Ba\_SIGNAL} + I_{1Aa\_SIGNAL}) + (I_{1Ba\_STRAY} + I_{1Aa\_STRAY}) + \begin{Bmatrix} (I_{1Ba\_SIGNAL} \cdot I_{1Ba\_STRAY})^{\frac{1}{2}} \cdot \cos\varphi_{1Ba} + \\ (I_{1Aa\_SIGNAL} \cdot I_{1Aa\_STRAY})^{\frac{1}{2}} \cdot \cos\varphi_{1Aa} \end{Bmatrix} \quad (58)$$

$$SPP = \begin{pmatrix} \frac{2}{10} \cdot I_{1Aa\_SIGNAL} - \\ \frac{2}{10} \cdot I_{1Ba\_SIGNAL} \end{pmatrix} + \begin{pmatrix} I_{2Ba\_STRAY} + I_{3Ba\_STRAY} - \\ I_{2Aa\_STRAY} - I_{3Aa\_STRAY} \end{pmatrix} + \quad (59)$$

$$\begin{Bmatrix} \left(\frac{1}{10} \cdot I_{1Aa\_SIGNAL} \cdot I_{2Ba\_STRAY}\right)^{\frac{1}{2}} \cdot \cos\varphi_{2Ba} + \\ \left(\frac{1}{10} \cdot I_{1Aa\_SIGNAL} \cdot I_{3Ba\_STRAY}\right)^{\frac{1}{2}} \cdot \cos\varphi_{3Ba} - \\ \left(\frac{1}{10} \cdot I_{1Ba\_SIGNAL} \cdot I_{2Aa\_STRAY}\right)^{\frac{1}{2}} \cdot \cos\varphi_{2Aa} - \\ \left(\frac{1}{10} \cdot I_{1Ba\_SIGNAL} \cdot I_{3Aa\_STRAY}\right)^{\frac{1}{2}} \cdot \cos\varphi_{3Aa} \end{Bmatrix}$$

$$SUMs = \left(\frac{2}{10} \cdot I_{1Aa\_SIGNAL} + \frac{2}{10} \cdot I_{1Ba\_SIGNAL}\right) + \quad (60)$$
$$(I_{2Ba\_STRAY} + I_{3Ba\_STRAY} + I_{2Aa\_STRAY} + I_{3Aa\_STRAY}) +$$

$$\begin{Bmatrix} \left(\frac{1}{10} \cdot I_{1Aa\_SIGNAL} \cdot I_{2Ba\_STRAY}\right)^{\frac{1}{2}} \cdot \cos\varphi_{2Ba} + \\ \left(\frac{1}{10} \cdot I_{1Aa\_SIGNAL} \cdot I_{3Ba\_STRAY}\right)^{\frac{1}{2}} \cdot \cos\varphi_{3Ba} + \\ \left(\frac{1}{10} \cdot I_{1Ba\_SIGNAL} \cdot I_{2Aa\_STRAY}\right)^{\frac{1}{2}} \cdot \cos\varphi_{2Aa} + \\ \left(\frac{1}{10} \cdot I_{1Ba\_SIGNAL} \cdot I_{3Aa\_STRAY}\right)^{\frac{1}{2}} \cdot \cos\varphi_{3Aa} \end{Bmatrix}$$

The amplitude and the offset displacement of the main push-pull signal MPP and the sub push-pull signal SPP are obtained by the equations (57) and (59). The amplitude and the offset displacement of the tracking error signal TE are obtained by generating the tracking error signal TE by the equation (53) by signals shown in the equations (57) to (60).

As can be understood from FIGS. 26 and 27, a reduction effect of the offset amount (%) of the tracking error signal TE can be obtained, when one of the widths W1 and W2 is smaller than 50 μm, that is, when one of the widths W1 and W2 is smaller than a diameter of the spot. That is, when one of the widths W1 and W2 is smaller than 100% of a diameter of the spot, the effect of stray light appearing in the tracking error signal TE can be decreased. Therefore, it is preferable that at least one of the widths W1 and W2 is smaller than 100% of a diameter of the spot. More preferably, both of the widths W1 and W2 are smaller than 100% of a diameter of the spot.

As can be understood by comparing FIGS. 26 and 27, a reduction effect of the offset amount (%) is higher when the width W2 is changed. This is considered because interference between the stray light of the main beam MB and the sub beams SB1 and SB2 affect the offset amount (%) more than interference between the stray light of the main beam MB and the main beam MB. Therefore, when the width W2 and the width W1 have different values, preferably, the width W2 has a smaller value.

An interference component of the equation (59) includes a squared root of a product of the intensities of the sub beams SB1 and SB2 and intensity of stray light of the main beam MB. Therefore, when a beam intensity ratio is k, in the equation (48), the interference component of the signal component of the sub beams SB1 and SB2 and the stray light component of the main beam MB can be written in a form of multiplying the squared root of k to the interference component of the signal component of the main beam MB and the stray light component of the main beam MB. Accordingly, it can be understood that when the beam intensity ratio k is large, the influence of interference in the sub-beam receiving area is larger than that in the main-beam receiving area. The influence is large by the multiplication of the square root of k, and it is more dominant. It has been explained so far that the push-pull amplitude of the tracking error signal TE can be increased by decreasing the widths W1 and W2, and the offset amount (%) can be decreased as a result. Therefore, it is effective to decrease both the widths W1 and W2. When considering the offset displacement of the tracking error signal TE generated at the lens shift time, stray light of the main beam MB is considered as a cause of generating the offset, because the stray lights of the main beam MB received in each of two sub-beam receiving areas lose symmetry at a lens shift generation time and consequently symmetry in an interference component of the signal light of the sub beams SB1 and the stray light of the main beam MB and an interference component of the signal light of the sub beams SB2 and the stray light of the main beam MB is also lost. From the above viewpoint that the interference between the stray light of the main beam MB and the signal light of the sub beams SB1 and SB2 is more dominant, particularly when the beam intensity ratio k is large, the influence of interference in the sub-beam receiving area is larger than that in the main-beam receiving area by a squared root multiplication of k, and it is more dominant. Consequently, the offset amount (%) can be also sufficiently decreased by decreasing only the width W2.

When the intensity ratio of the main beam to the sub beam becomes small, and when the stray light intensity of the main beam MB becomes large in the main pattern because of a multilayered optical disk resulting in increase of the offset displacement due to the interference between the main beam and the stray light of the main beam, the interference offset amount should be decreased by decreasing the width W1 of the main pattern in a similar manner to that in the sub pattern.

Figure 28:
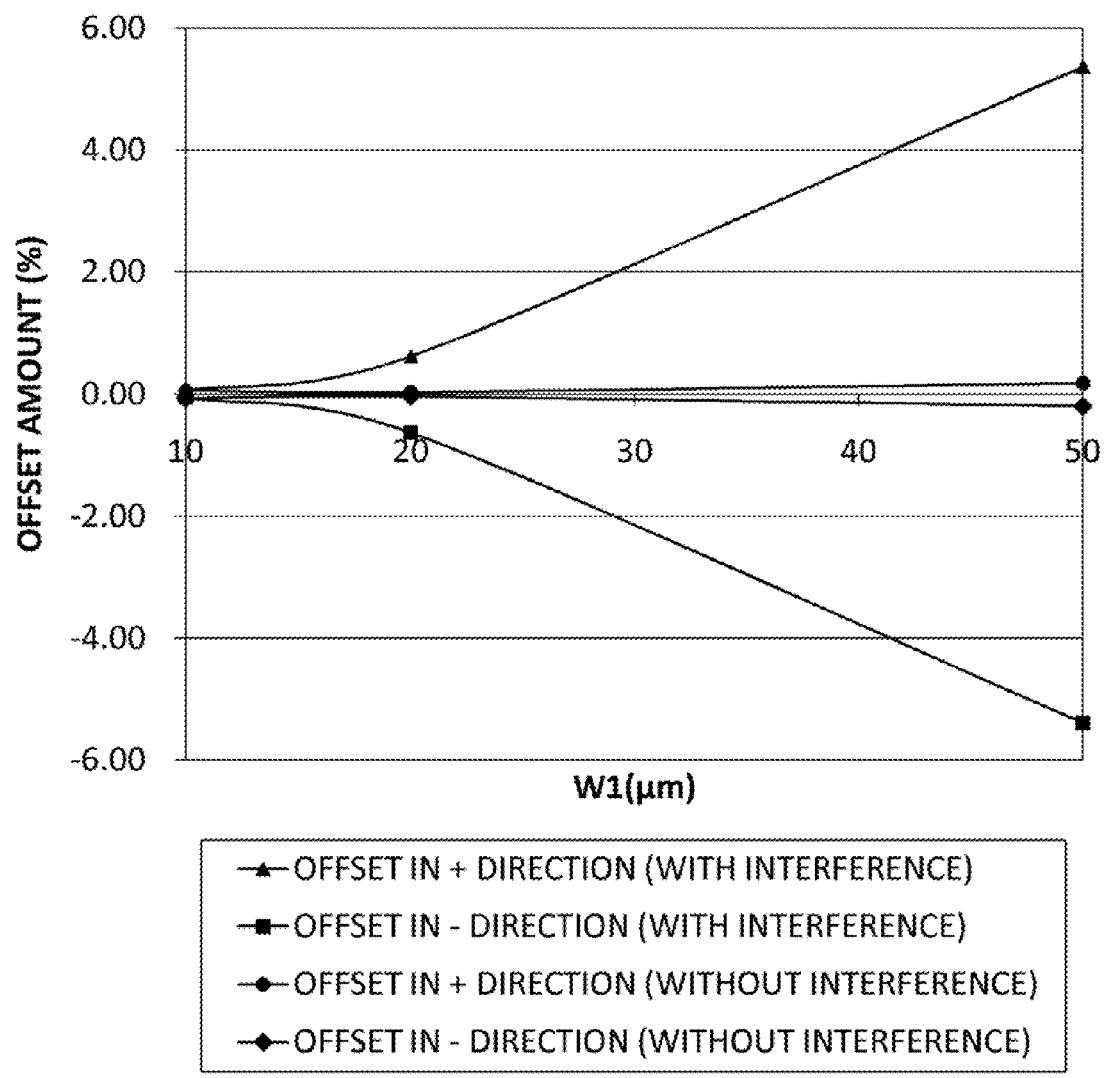
FIG. 28 shows a result of simulating an amount of offset appearing in the tracking error signal TE calculated by an equation (53)

The decrease of displacement of the interference offset by decreasing the width W can be also explained from results of FIGS. 25 and 28. FIG. 25 shows dependency of the width W of the push-pull amplitude. An interference offset amount in FIG. 28 becomes smaller than the push-pull amplitude becoming large by decreasing the width W. It can be understood from this that by decreasing the width W, the interference offset displacement becomes small and the interference offset amount becomes small due to other factor than the push-pull amplitude becoming large.

The offset amount (%) shown in FIGS. 26 and 27 contains both the offset generated by the stray light component and the offset (interference offset) generated by the interference component. However, the former is much smaller than the latter to a negligible extent. This is explained below with referring to the simulation result again.

FIG. 28 shows a result of simulating an amount (%) of offset appearing in the tracking error signal TE generated by the equation (53). In this simulation, it is assumed that the influence of stray light does not appear in the normalized main push-pull signal MPPN at the right side of the equation (53). That is, zero stray component and zero interference component are assumed in the equations (57) and (60). On the other hand, for the normalized sub push-pull signal SPPN at the right side of the equation (53), two types of simulations are performed; when there is interference between the stray light of the main beam MB and the sub beams SB1 and SB2; and when there is no interference (there is no interference component in the equations (59) and (60)).

In the simulation shown in FIG. 28, it is assumed that the width W1 is equal to the width W2. By changing the lens shift amount by every 0.05 mm from 0 mm to 0.3 mm, a size of the offset generated in the tracking error signal TE is obtained for each lens shift amount for each width W1 by the equation (17). A value of the constant $k_2$ used in this simulation is determined in a similar manner to that of FIGS. 26 and 27. In FIG. 28, the offset amount (%) when an offset occurs in a plus direction and the offset amount (%) when an offset occurs in a minus direction are plotted respectively. Optical magnification of the optical system 3 is set as 15 times, the optical disk 11 is a two-layer optical disk having an interlayer distance of 10 μm, and the length x of one side of the main-beam receiving surface S1a is set as 100 μm.

In FIG. 28, it is possible to confirm a difference in the offset amount (%) of the tracking error signal TE due to presence or absence of interference between the stray light of the main beam MB and the sub beams SB1 and SB2. It can be understood from a result in FIG. 28 that the offset generated by the stray light component makes little change according to the width W1 and the offset generated by the interference component makes a large change according to the width W1. The change of the offset amount (%) shown in FIGS. 26 and 27 can be said to express a change of the offset substantially generated by the interference component because the offset amount (%) rapidly decreases when the width W1 is equal to or smaller than a diameter of the spot light. In other words, as for the offset generated by the stray light, the offset due to the interference between the stray light and the signal light is more dominant.

When the widths W1 and W2 are decreased, in the interference component in the equation (59), the stray light components $I_{2Aa\_STRAY}$, $I_{2Ba\_STRAY}$, $I_{3Aa\_STRAY}$ and $I_{3Ba\_STRAY}$ become smaller than decrease of the signal light components $I_{1Ba\_SIGNAL}$ and $I_{1Aa\_SIGNAL}$. This fact becomes a cause of decreasing offsets generated by the interference by decreasing the widths W1 and W2. For simplicity, consider that there is no stray light component in the sum signal by correcting the stray light component of the sum signal by using the stray-light receiving surface, for example. Only reduction of the intensity of the main beam MB becomes a cause that the sum signal becomes small by decreasing the widths W1 and W2. For example, consider that the stray light components $I_{2Aa\_STRAY}$, $I_{2Ba\_STRAY}$, $I_{3Aa\_STRAY}$, and $I_{3Ba\_STRAY}$ in the equation (59) also become small at the same rate as that of the main beam MB. Because the interference component becomes a squared root of multiplication of the signal light component to the stray light component, the rate becoming small is equal to the equation (59) for the sum signal, and the influence of the interference does not change when the widths W1 and W2 are made small. However, because the stray light component becomes smaller as described above, the offset displacement generated by the influence of the interference decreases when the widths W1 and W2 are made small, and the offset amount (%) decreases. This is because the stray light intensities $I_{2Aa\_STRAY}$, $I_{2Ba\_STRAY}$, $I_{3Aa\_STRAY}$ and $I_{3Ba\_STRAY}$ can be regarded to have locally a constant intensity distribution. When the widths W1 and W2 are made smaller, the stray light intensities become smaller substantially at the same rate. On the other hand, the intensities $I_{1Ba}$ and $I_{1Aa}$ of the main beam MB have a Gaussian distribution, and the center portion of the spot of the optical beam has large intensity. The intensity does not become small at a rate of decreasing the widths W1 and W2.

Considering an assembly offset (an offset due to a positional deviation at the time of fitting the optical detector to the optical pickup), at least the width W1 is preferably made small. Specifically, the width W1 is preferably equal to or smaller than 70% of the spot diameter. This is explained below in detail.

Figure 30:
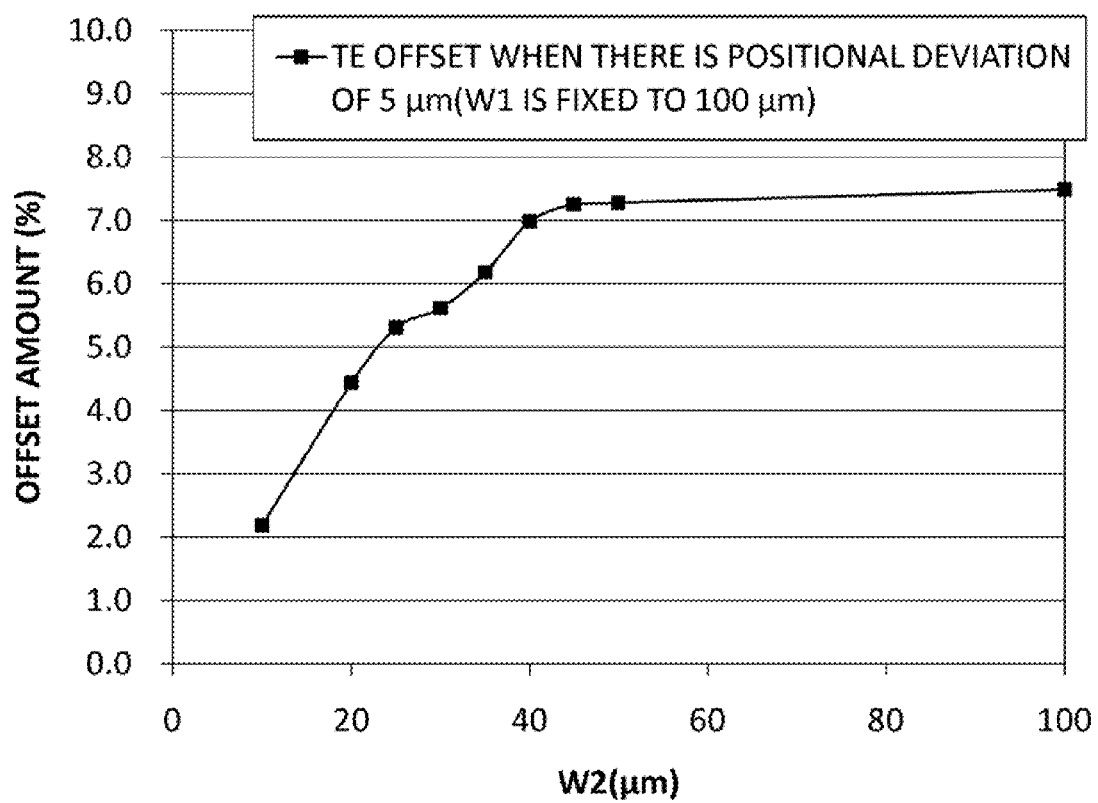
FIG. 30 shows a result of simulating again the simulation shown in FIG. 27, by adding a condition that a position of the optical detector is deviated by 5 μm from a correct position to a signal light tangent direction.

FIGS. 29 and 30 show results of simulating the offset amount (%) of the tracking error signal TE in the same conditions as those in FIGS. 26 and 27, except that a position of the optical detector is assumed to be deviated by 5 μm from a correct position to a signal light tangent direction. As shown in FIG. 29, when the width W1 is about 70% to 100% of the diameter of the spot, the offset amount (%) increases more than that when the width W1 is equal to or larger than the diameter of the spot. It can be said from this that considering generation of the assembly offset, it is more preferable to set the width W1 to equal to or smaller than 70% of the spot diameter.

On the other hand, the width W2 does not have a problem like that of the width W1, as shown in FIG. 30. However, from the viewpoint of keeping the shape of the main-beam receiving surface S1a the same as those of the sub-beam receiving surfaces S2a and S3a, preferably, the width W2 is also set equal to or smaller than 70% of the spot diameter in a similar manner to that of the width W1.

Another method of generating the tracking error signal TE according to the second embodiment (A) is explained below.

A first example is normalization of a push-pull signal for each receiving surface. In this example, the tracking-error signal generating unit 61 generates a sub push-pull signal SPP2 and a sub sum signal SUMs2 based on a light receiving amount in the light receiving areas 2Aa and 2Ba, and generates a normalized sub push-pull signal SPPN2 by normalizing the sub push-pull signal SPP2 by using the sub sum signal SUM2. Further, the tracking-error signal generating unit 61 generates a sub push=pull signal SPP3 and a sub sum signal SUMs3 based on a light receiving amount in the light receiving areas 3Aa and 3Ba, and generates a normalized sub push-pull signal SPPN3 by normalizing the sub push-pull signal SPP3 by using the sub sum signal SUM3. The tracking-error signal generating unit 61 generates the tracking error signal TE based on the normalized sub push-pull signal SPPN2 and the normalized sub push-pull signal SPPN3.

Specifically, the tracking-error signal generating unit 61 generates the tracking error signal TE by calculating the following equations (61) to (67). In the equation (67), $k_3$ represents a positive constant, and this is determined to cancel the offset at the lens shift time. Normally, $k_2$ becomes ½. The constant $k_3$ becomes ½ because the sub push-pull signal SPP2 and the sub push-pull signal SPP3 are individually normalized, and is different from $k_2$ that normally becomes 1 in the equation (53).

$$SPP2 = (I_{2Ba}) - (I_{2Aa}) \quad (61)$$

$$SUMs2 = (I_{2Ba}) + (I_{2Aa}) \quad (62)$$

$$SPPN2 = \frac{SPP2}{SUMs2} \quad (63)$$

$$SPP3 = (I_{3Ba}) - (I_{3Aa}) \quad (64)$$

$$SUMs3 = (I_{3Ba}) + (I_{3Aa}) \quad (65)$$

$$SPPN3 = \frac{SPP3}{SUMs3} \quad (66)$$

$$TE = MPPN - k_3(SPPN2 + SPPN3) \quad (67)$$

When the tracking error signal TE is generated in the manner as described above, the offset generated in the tracking error signal TE can be decreased.

The tracking error signal TE can be also generated by the following equation (68) in place of the equations (53) and (67). The offset generated in the tracking error signal TE can be decreased in a similar manner to that described above. In the equation (68), $k_{4A}$ and $k_{4B}$ are positive constants, and are determined to cancel the offset at the lens shift time. An optimum value of $k_{4B}$ when there is no influence of stray light is a beam intensity ratio. In a multilayered optical disk, the beam intensity ratio is not an optimum value of $k_{4B}$ due to the influence of the stray light. It is normally preferable that the beam intensity ratio is $k_{4A}$ in a similar manner to $k_{4B}$, considering a fact that signals in the main system (the main push-pull signal MPP and the main sum signal SUMm) and signals in the sub system (the sub push-pull signal SPP and the sub sum signal SUMs) can vary independently (because positions on the recording surface where the main beam MB and the sub beams SB1 and SB2 are irradiated are slightly different, dust can be present in only one of irradiation areas or only one of irradiation areas is superimposed with an unrecorded/recorded track boundary; in this case, signals in the main system and signals in the sub system can vary mutually in an irrelevant manner).

$$TE = \frac{MPP - k_{4B}SPP}{SUMm + k_{4A}SUMs} \quad (68)$$

When the equation (68) is used, a reduction effect of the offset amount (%) in the tracking error signal TE can be obtained, when one of the widths W1 and W2 is smaller than 50 μm, that is, when one of the widths W1 and W2 is smaller than a diameter of the spot, like when the equations (53) and (67) are used.

Figure 31:
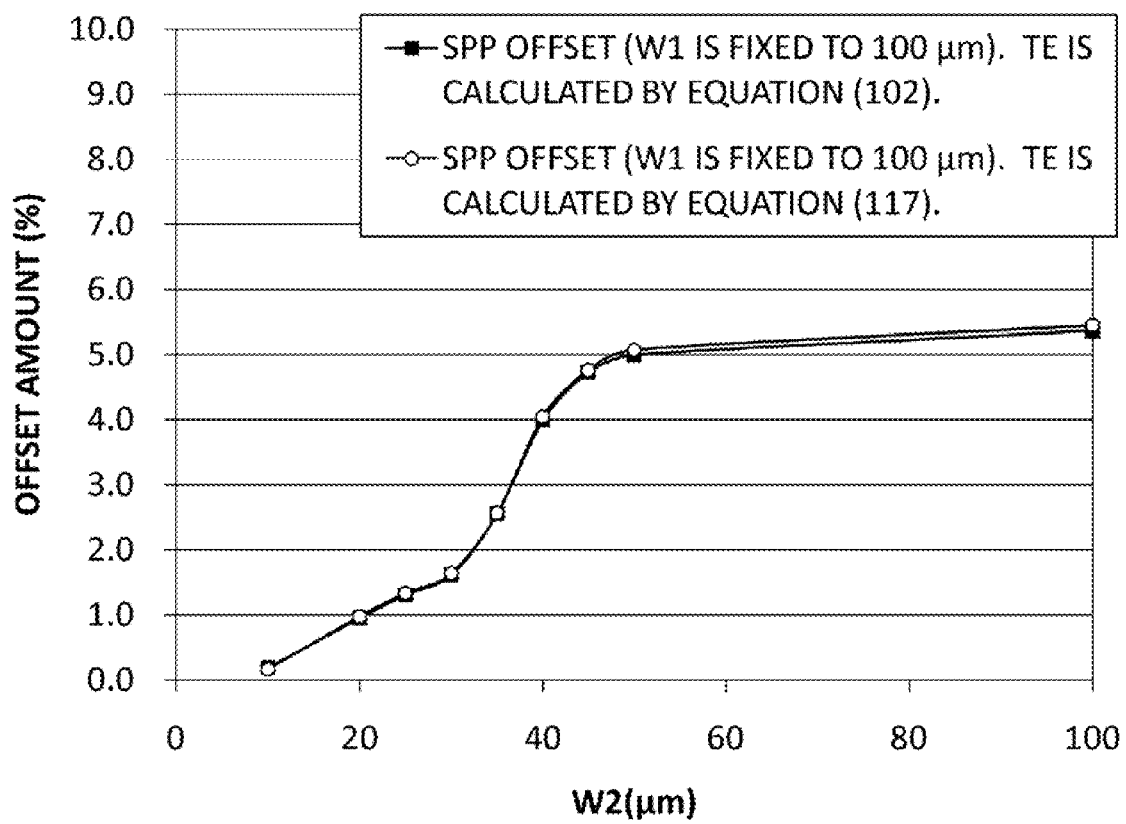
FIG. 31 shows a result of simulating an offset amount appearing in the tracking error signal TE, when the width W1 is fixed to two times of a spot diameter and when the width W2 is changed, for the tracking error signal TE calculated by an equation (68) and the tracking error signal TE calculated by the equation (53), respectively.

FIG. 31 shows a result of simulating an amount (%) of offset appearing in the tracking error signal TE, when the width W1 is fixed to 100 μm (=two times of a spot diameter) and when the width W2 is changed within a range from 10 μm to 100 μm, for the tracking error signal TE calculated by the equation (68) and the tracking error signal TE calculated by the equation (53), respectively. The tracking error signal TE calculated by the equation (53) is the same as that in FIG. 27. As shown in FIG. 31, the offset amount (%) is little different between the tracking error signals TE calculated by the equations (53) and (68). Accordingly, a reduction effect of the offset amount (%) can be also obtained in the tracking error signal TE calculated by the equation (68), in a similar manner to that in the tracking error signal TE calculated by the equation (53).

The reduction effect of the offset amount (%) can be obtained in the tracking error signal TE calculated by the equation (68) indicates that a similar effect is also obtained in the tracking error signal TE calculated by the equation (48). When the tracking error signal is normalized, the amplitude $TE_{AMPLITUDE}$ and the displacement $TE_{DISPLACEMENT}$ of the tracking error signal TE are expressed by the following equations (69) and (70), respectively. Therefore, the offset amount $TE_{OFFSET}$ of the tracking error signal TE calculated by the equation (68) can be expressed by the following equation (71). As a result, the offset amount becomes equal to the offset amount $TE_{OFFSET}$ of the tracking error signal TE calculated by the equation (48). Consequently, the reduction effect of the offset amount (%) can be also obtained in the tracking error signal TE calculated by the equation (68).

$$TE_{AMPLITUDE} = \frac{(MPP - k_{4B}SPP)_{AMPLITUDE}}{SUMm + k_{4A}SUMs} \quad (69)$$

$$TE_{DISPLACE} = \frac{(MPP - k_{4B}SPP)_{DISPLACE}}{SUMm + k_{4A}SUMs} \quad (70)$$

$$TE_{OFFSET} = \frac{\frac{(MPP - k_{4B}SPP)_{DISPLACE}}{SUMm + k_{4A}SUMs}}{\frac{(MPP - k_{4B}SPP)_{AMPLITUDE}}{SUMm + k_{4A}SUMs}} \quad (71)$$

$$= \frac{(MPP - k_{4B}SPP)_{DISPLACE}}{(MPP - k_{4B}SPP)_{AMPLITUDE}}$$

In the tracking error signal TE calculated by the equation (48), push-pull amplitude becomes small, and the signal needs to be amplified greatly by an amplifier circuit at a later stage. Therefore, considering noise and offsets in the circuit unit, the offset amount (%) has a possibility of greatly increasing. Accordingly, the tracking error signal TE is preferably normalized by the equations (53) and (68).

In the second embodiment (A), there is little change in the value of SUMm/SUMs at the lens shift time. Therefore, SUMm/SUMs can be set as 1 (1 is a constant). By using this, the tracking error signal TE in the equation (53) can be modified to the following equation (72).

$$TE = \frac{MPP}{SUMm} - k_2 \frac{\frac{SPP}{SUMm}}{1} = \frac{MPP - k_2 \cdot 1 \cdot SPP}{SUMm} \quad (72)$$

In the second embodiment (A), the equation (72) is the same as the equation (68). Therefore, it can be understood that the reduction effect of the offset amount (%) is also obtained in the tracking error signal TE calculated by the equation (68), in a similar manner to that in the tracking error signal TE calculated by the equation (53).

A second example uses the light receiving areas 1Aa, 1Ba, 2Aa, 2Ba, 3Aa, 3Ba, 1Ab, 2Ab, 3Ab, 4Ab, 5Ab, and 6Ab. In this example, the offset displacement of the main sum signal SUMm and the sub sum signal SUMs generated by stray light is canceled by only the light receiving amount in the light receiving area that receives only stray light.

The tracking-error signal generating unit 61 corrects sum signals obtained by the equations (49) and (51), based on a light receiving amount in the light receiving areas 1Ab, 2Ab, 3Ab, 4Ab, 5Ab, and 6Ab. Specifically, the tracking-error signal generating unit 61 performs a correction process by the following equations (73) and (74). In the equations, SUMmA represents a main sum signal after correction, and SUMsA represents a sub sum signal after correction. Constants $k_5$ to $k_7$ are determined in advance to minimize offset displacement (a stray light component) of each sum signal.

$$SUMmA = SUMm - k_5(I_{1Ab} + I_{2Ab}) \quad (73)$$

$$SUMsA = SUMs - k_6(I_{3Ab} + I_{4Ab}) - k_7(I_{5Ab} + I_{6Ab}) \quad (74)$$

In the sum signals corrected in this way, a stray light component becomes smaller than that before the correction.

Therefore, by generating the equations (50) and (52) by using the sum signals after the correction, the amount (%) of offset generated in the tracking error signal TE can be decreased.

That is, because stray light contained in the sum signal is reflection light from layers other than a focused layer, the stray light is independent of a variation factor of a sum signal from the focused layer. Therefore, a normalization effect is not sufficiently obtained, and the stray light becomes a cause of an offset. Particularly, in a sub sum signal, because sub sum intensity is weak, the proportion of stray light becomes high, and the constant k needs to be made large correspondingly. As a result, a variation of a stray light component contained in the sum signal is excessively emphasized. Consequently, the stray light component of the sum signal is preferably corrected.

While an example of correcting both the main sum signal and the sub sum signal has been explained above, some reduction effect of the offset amount (%) of the tracking error signal TE can be obtained by correcting only one of the main sum signal and the sub sum signal. Therefore, it is sufficient to correct either one of these signals. As described above, influence of stray light appears significantly particularly in the sub sum signal. Therefore, correction of the sub sum signal is more preferable.

Because stray light is reflection light from a layer other than a layer to be accessed, the stray light varies independently of signal light from the layer to be accessed. When a sum signal contains this stray light component, the normalization effect cannot be sufficiently obtained, and this becomes a cause of increase of the offset amount (%). Therefore, a stray light component in particularly the sum signal is preferably corrected by the equation (74).

When generating a sub sum signal by the equations (62) and (65) in place of the equation (51), the tracking-error signal generating unit 61 can correct the sub sum signal SUMs2 based on light receiving amount in the light receiving areas 3Ab and 4Ab, and correct the sub sum signal SUMs3 based on a light receiving amount in the light receiving areas 5Ab and 6Ab. Specifically, a correction process is performed by equations (75) and (76). As a result, an effect similar to that described above can be obtained when a sub sum signal is generated by the equations (62) and (65).

$$\text{SUMs}2A = \text{SUMs}2 - k_6(I_{3Ab} + I_{4Ab}) \tag{75}$$

$$\text{SUMs}3A = \text{SUMs}3 - k_7(I_{5Ab} + I_{6Ab}) \tag{76}$$

A third example uses the light receiving areas 1Aa, 1Ba, 2Aa, 2Ba, 3Aa, 3Ba, 1Ab, 2Ab, 3Ab, 4Ab, 5Ab, and 6Ab, like in the second example. In this example, offset displacement generated in the main push-pull signal MPP and the sub push-pull signal SPP can be canceled in addition to the offset displacement of the main sum signal SUMm and the sub sum signal. SUMs generated by stray light.

Each sum signal is corrected in a similar manner to that of the second example. In this example, push-pull signals obtained by the equations (46) and (47) are also corrected based on a light receiving amount in the light receiving areas 1Ab, 2Ab, 3Ab, 4Ab, 5Ab, and 6Ab. Specifically, a correction process is performed by the equations (77) and (78). In the equations, MPPA represents a main push-pull signal after correction, and SPPA represents a sub push-pull signal after correction. Constants $k_8$ to $k_{10}$ are optimized by experiment to minimize offset displacement of each push-pull signal.

$$\text{MPP}A = \text{MPP} - k_8(I_{1Ab} - I_2Ab) \tag{77}$$

$$\text{SPP}A = \text{SPP} - k_9(I_{3Ab} - I_{4Ab}) - k_{10}(I_{5Ab} - I_{6Ab}) \tag{78}$$

In each push-pull signal corrected in this way, displacement of offset generated by stray light is smaller than that before the correction. Therefore, by generating signals by the equations (50) and (52) by using each push-pull signal and each sum signal after the correction, the amount (%) of offset generated in the tracking error signal TE can be more decreased.

While an example of correcting all push-pull signals and all sum signals has been explained above, correcting all signals is not necessarily required. As for which signal is corrected is suitably determined based on a result of the experiment. Therefore, depending on a result of the experiment, only the sub push-pull signal SPP and sub sum signal SUMs are corrected.

In generating a sub push-pull signal by the equations (61) and (64) in place of the equation (47), the tracking-error signal generating unit 61 corrects the sub push-pull signal SPP2 based on a light receiving amount in the light receiving areas 3Ab and 4Ab, and corrects the sub push-pull signal SPP3 based on a light receiving amount in the light receiving areas 5Ab and 5Ab. Specifically, a correction process is performed by the equations (79) and (80). As a result, an effect similar to the above can be obtained when the sub push-pull signal is generated by the equations (61) and (64).

$$\text{SPP}2A = \text{SPP}2 - k_9(I_{3Ab} - I_{4Ab}) \tag{79}$$

$$\text{SPP}3A = \text{SPP}3 - k_{10}(I_{5Ab} - I_{6Ab}) \tag{80}$$

A fourth example uses all light receiving areas shown in FIG. 22. In this example, to prepare for a case when a spot is laterally deviated to a signal light tangent direction due to a positional deviation at the time of fitting the optical detector to the optical pickup, influence of the lateral deviation (an assembly offset) is corrected.

As a representative example, the tracking-error signal generating unit 61 corrects the normalized main push-pull signal MPPN obtained by the equation (50), based on a light receiving amount in the light receiving areas 1Ca to 1Ja. Specifically, the tracking-error signal generating unit 61 performs a correction process by the equation (81). In the equation, MPPNA represents the normalized main push-pull signal MPPN after correction. A constant $k_{11}$ is optimized by experiment to minimize an assembly offset generated in the normalized main push-pull signal due to a lateral deviation.

$$MPPNA = MPPN - k_{11}\left(\frac{(I_{1Ca} + I_{1Ga} + I_{1Ea} + I_{1Ia}) - (I_{1Da} + I_{1Ha} + I_{1Fa} + I_{1Ja})}{(I_{1Ca} + I_{1Ga} + I_{1Ea} + I_{1Ia}) + (I_{1Da} + I_{1Ha} + I_{1Fa} + I_{1Ja})}\right) \tag{81}$$

An assembly offset amount is reflected in brackets of a second term of the equation (81). Therefore, an assembly offset generated in the normalized main push-pull signal MPPN obtained by the equation (50) can be suitably removed.

Figure 32:
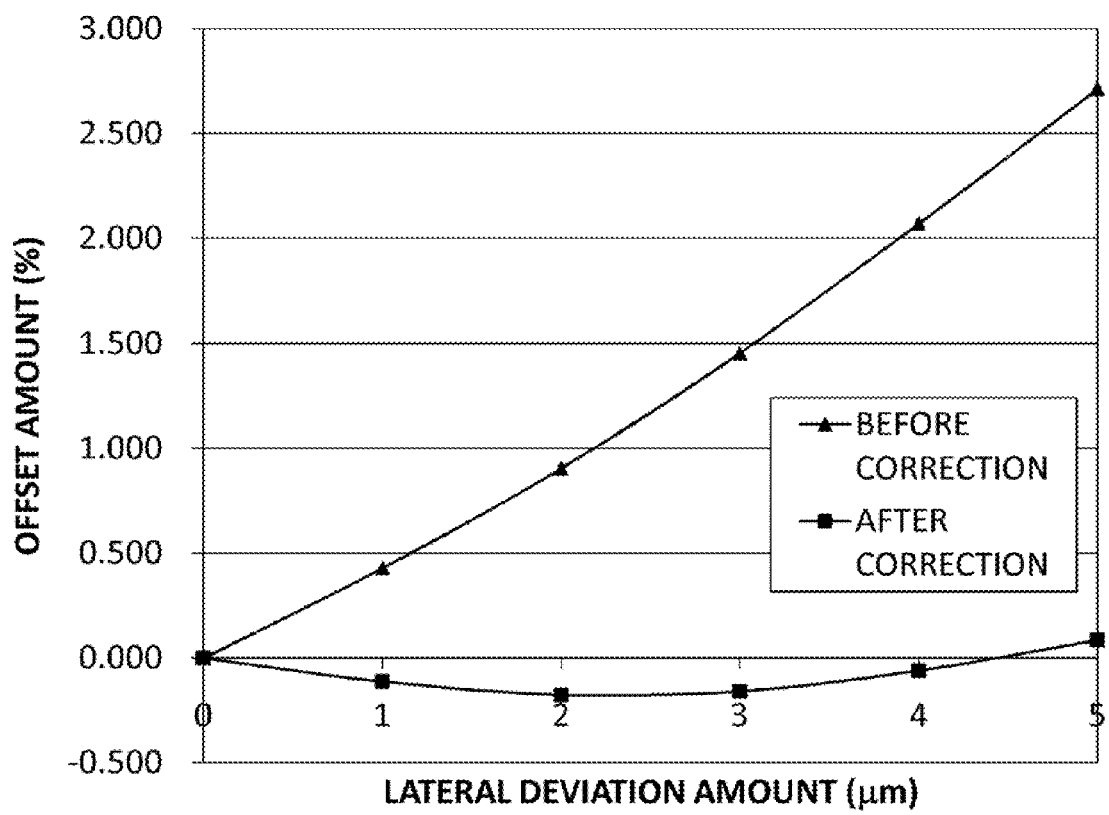
FIG. 32 shows a result of a simulation when a correction process according to the second embodiment (A) is performed.

FIG. 32 shows a simulation result of a correction process is performed by the equation (81). FIG. 32 shows for each amount of a lateral deviation an amount of an assembly offset generated in the tracking error signal TE before and after correction by the equation (81). In this simulation, W1=20 μm, and stray light and a lens shift are not taken into consideration. A normalized main push-pull signal at a track center position is simulated, and displacement from zero is offset. It can be understood from FIG. 32 that the offset amount (%) decreases by the correction process.

Figure 33:
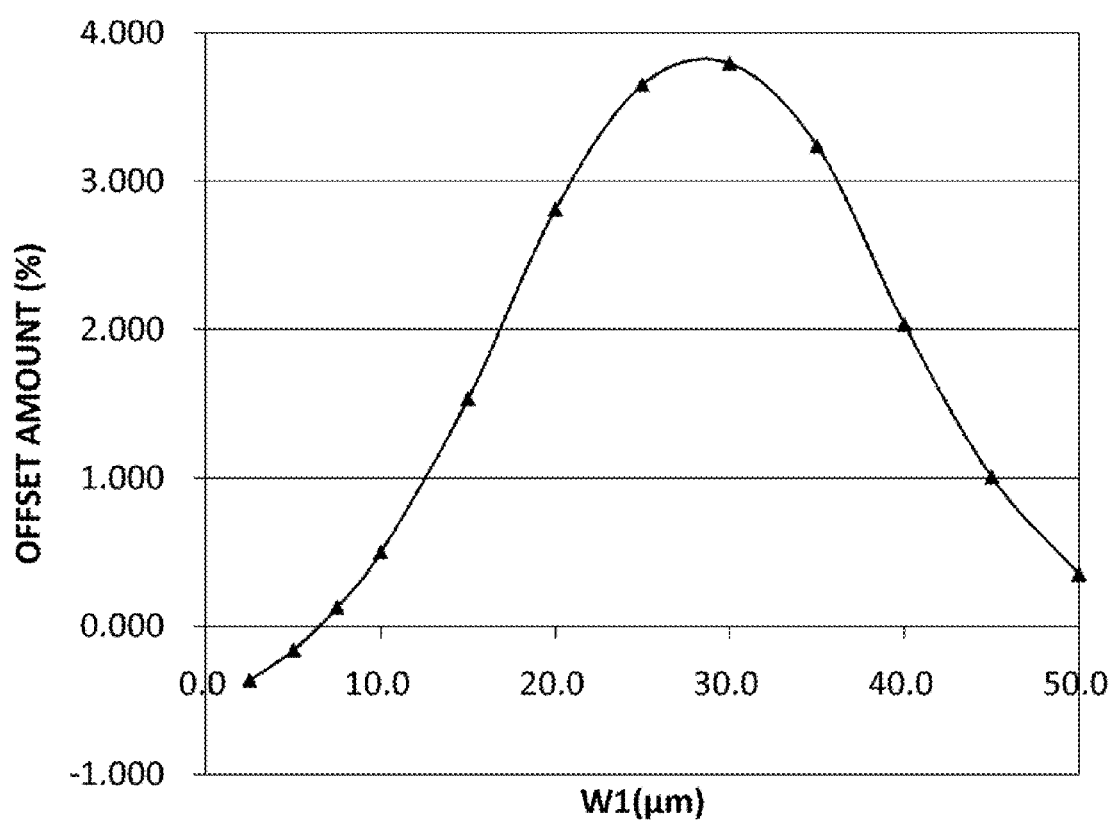
FIG. 33 shows each width W1 offset amount when a lateral deviation amount is 5 μm and when a focus of an optical beam is on the track.

FIG. 33 shows for each width W1 (=width W2) offset amount when a lateral deviation amount is 5 μm and when a focus of an optical beam is at the center of a track. It can be understood from FIG. 33 that within a range of the width W1≦25 μm, the offset amount (%) is smaller when the width W1 is smaller. In this case, within a range of the width W1≦10 μm, the offset amount (%) becomes equal to or smaller than that when the width W1=50 μm (beam diameter). Therefore, when the width is smaller than 20% of the beam diameter, the problem of assembly offset does not occur easily.

Further, the tracking-error signal generating unit 61 can correct the normalized main push-pull signal MPPN based on also the light receiving amount in the light receiving areas 1Bb, 1Cb, 2Bb, and 2Cb in addition to the light receiving amount in the light receiving areas 1Ca to 1Ja, to remove the assembly offset generated in the normalized main push-pull signal MPPN. Specifically, the tracking-error signal generating unit 61 can correct the normalized main push-pull signal MPPN by the following equation (82). Constants $k_{12}$ to $k_{14}$ are optimized by experiment to minimize the assembly offset generated in the normalized main push-pull signal MPPN. Correction can be performed individually for each light receiving area.

$$MPPNA=MPPN-k_{12}\{(I_{1Ca}+I_{1Ga}+I_{1Ea}+I_{1Ja})-(I_{1Da}+I_{1Ha}+I_{1Fa}+I_{1Ja})-k_{13}(I_{1Bb}+I_{2Bb})+k_{14}(I_{1Cb}+I_{2Cb})\}/\{(I_{1Ca}+I_{1Ga}+I_{1Ea}+I_{1Ja})+(I_{1Da}+I_{1Ha}+I_{1Fa}+I_{1Ja})-k_{13}(I_{1Bb}+I_{2Bb})-k_{14}(I_{1Cb}+I_{2Cb})\} \quad (82)$$

In the present example, there are considered other various patterns of the correction process. In a first pattern, the tracking-error signal generating unit 61 corrects the normalized sub push-pull signal SPPN based on the light receiving amount in the light receiving areas 2Ca, 2Da, 3Ca, 3Da, 2Ea, 2Fa, 3Ea, and 3Fa, to remove the assembly offset generated in the normalized sub push-pull signal SPPN. Specifically, the tracking-error signal generating unit 61 corrects the normalized sub push-pull signal SPPN by the following equation (83), where SPPNA represents the normalized sub push-pull signal SPPN after correction. A constant $k_{15}$ is optimized by experiment to minimize the assembly offset generated in the normalized sub push-pull signal SPPN.

$$SPPNA = SPPN - k_{15}\left(\frac{(I_{2Ca}+I_{3Ca})+(I_{2Ea}+I_{3Ea})-(I_{2Da}+I_{3Da})-(I_{2Fa}+I_{3Fa})}{(I_{2Ca}+I_{3Ca})+(I_{2Ea}+I_{3Ea})+(I_{2Da}+I_{3Da})+(I_{2Fa}+I_{3Fa})}\right) \quad (83)$$

In a second pattern, the tracking-error signal generating unit 61 corrects the normalized sub push-pull signal SPPN based on also the light receiving amount in the light receiving areas 3Bb, 3Cb, 4Bb, 4Cb, 5Bb, 5Cb, 6Bb, and 6Cb in addition to the light receiving amount in the light receiving areas 2Ca, 2Da, 3Ca, 3Da, 2Ea, 2Fa, 3Ea, and 3Fa, to remove the assembly offset generated in the normalized sub push-pull signal SPPN. Specifically, the tracking-error signal generating unit 61 corrects the normalized sub push-pull signal SPPN by the following equation (84), where constants $k_{16}$ to $k_{18}$ are optimized by experiment to minimize the assembly offset generated in the normalized sub push-pull signal SPPN. Correction can be performed individually for each light receiving area.

$$SPPNA=SPPN-k_{16}\{(I_{2Ca}+I_{3Ca})+(I_{2Ea}+I_{3Ea})-(I_{2Da}+I_{3Da})-(I_{2Fa}+I_{3Fa})-k_{17}(I_{3Bb}+I_{4Bb}+I_{5Bb}+I_{6Bb})+k_{18}(I_{3Cb}+I_{4Cb}+I_{5Cb}+I_{6Cb})\}/\{(I_{2Ca}+I_{3Ca})+(I_{2Ea}+I_{3Ea})+(I_{2Da}+I_{3Da})+(I_{2Fa}+I_{3Fa})-k_{17}(I_{3Bb}+I_{4Bb}+I_{5Bb}+I_{6Bb})-k_{18}(I_{3Cb}+I_{4Cb}+I_{5Cb}+I_{6Cb})\} \quad (84)$$

A third pattern is applied to generate the normalized sub push-push signals SPPN2 and SPPN3 by calculating the equations (61) to (66). The tracking-error signal generating unit 61 corrects the normalized sub push-pull signal SPPN2 based on the light receiving amount in the light receiving areas 2Ca, 2Da, 2Ea, and 2Fa, to remove the assembly offset generated in the normalized sub push-pull signal SPPN2. Specifically, the tracking-error signal generating unit 61 corrects the normalized sub push-pull signal SPPN2 by the following equation (85). In the equation, SPPN2A represents the normalized sub push-pull signal SPPN2 after correction. A constant $k_{19}$ is optimized by experiment to minimize the assembly offset generated in the normalized sub push-pull signal SPPN2.

$$SPPN2A = SPPN2 - k_{19}\left(\frac{(I_{2Ca}+I_{2Ea})-(I_{2Da}+I_{2Fa})}{(I_{2Ca}+I_{2Ea})+(I_{2Da}+I_{2Fa})}\right) \quad (85)$$

The tracking-error signal generating unit 61 corrects the normalized sub push-pull signal SPPN3 based on the light receiving amount in the light receiving areas 3Ca and 3Da, and 3Ea and 3Fa, to remove the assembly offset generated in the normalized sub push-pull signal SPPN3. Specifically, the tracking-error signal generating unit 61 corrects the normalized sub push-pull signal SPPN3 by the following equation (86). In the equation, SPPN3A represents the normalized sub push-pull signal SPPN3 after correction. A constant $k_{20}$ is optimized by experiment to minimize the assembly offset generated in the normalized sub push-pull signal SPPN3.

$$SPPN3A = SPPN3 - k_{20}\left(\frac{(I_{3Ca}+I_{3Ea})-(I_{3Da}+I_{3Fa})}{(I_{3Ca}+I_{3Ea})+(I_{3Da}+I_{3Fa})}\right) \quad (86)$$

The tracking-error signal generating unit 61 can also correct the normalized sub push-pull signal SPPN2 or SPPN3 based on also the light receiving amount in the light receiving areas 3Bb, 3Cb, 4Bb, 4Cb, 5Bb, 5Cb, 6Bb, and 6Cb. For example, the tracking-error signal generating unit 61 can correct the normalized sub push-pull signal SPPN2 or SPPN3 by the equations (87) and (88), where constants $k_{21}$ to $k_{26}$ are optimized by experiment to minimize the assembly offset generated in the normalized sub push-pull signals SPPN2 and SPPN3. Correction can be performed individually for each light receiving area.

$$SPPN2A=SPPN2-k_{21}\{(I_{2Ca}+I_{2Ea})-(I_{2Da}+I_{2Fa})-k_{22}(I_{3Bb}+I_{4Bb})+k_{23}(I_{3Cb}+I_{4Cb})\}/\{(I_{2Ca}+I_{2Ea})+(I_{2Da}+I_{2Fa})-k_{22}(I_{3Bb}+I_{4Bb})-k_{23}(I_{3Cb}+I_{4Cb})\} \quad (87)$$

$$SPPN3A=SPPN3-k_{24}\{(I_{3Ca}+I_{3Ea})-(I_{3Da}+I_{3Fa})-k_{25}(I_{5Bb}+I_{6Bb})+k_{26}(I_{5Cb}+I_{6Cb})\}/\{(I_{3Ca}+I_{3Ea})+(I_{3Da}+I_{3Fa})-k_{25}(I_{5Bb}+I_{6Bb})-k_{26}(I_{5Cb}+I_{6Cb})\} \quad (88)$$

A fifth example uses each light receiving area within the main-beam receiving surface S1a. This generation process is performed by providing the predetermined distance g2 ($\geq 0$) between the light receiving area 1Aa and the light receiving areas 1Ca and 1Da.

The tracking-error signal generating unit 61 generates the push-pull signal XPP2 and a sum signal SUMx based on the light receiving amount in the light receiving areas 1Aa and 1Ba, and generates a normalized push-pull signal XPPN by normalizing the push-pull signal XPP2 by using the sum signal SUMx. The tracking-error signal generating unit 61 also generates a push-pull signal YPP and a sum signal SUMy based on the light receiving amount in the light receiving areas 1Ca to 1Ja, and generates a normalized push-pull signal YPPN by normalizing the push-pull signal YPP by using the sum signal SUMy. The tracking-error signal generating unit 61 generates the tracking error signal TE by using these signals.

Specifically, the tracking-error signal generating unit 61 generates the tracking error signal TE by calculating the following equations (89) to (95).

$$XPP = I_{1Ba} - I_{1Aa} \tag{89}$$

$$SUMx = 1_{1Ba} + I_{1Aa} \tag{90}$$

$$XPPN = \frac{XPP}{SUMx} \tag{91}$$

$$YPP = (1_{1Ea} + I_{1Ia} + I_{1Fa} + I_{1Ja}) - (I_{1Ca} + I_{1Ga} + I_{1Da} + I_{1Ha}) \tag{92}$$

$$SUMy = (I_{1Ea} + I_{1Ia} + I_{1Fa} + I_{1Ja}) + \begin{pmatrix} I_{1Ca} + I_{1Ga} + \\ I_{1Da} + I_{1Ha} \end{pmatrix} \tag{93}$$

$$YPPN = \frac{YPP}{SUMy} \tag{94}$$

$$TE = XPPN - k_{27}YPPN \tag{95}$$

Figure 34:
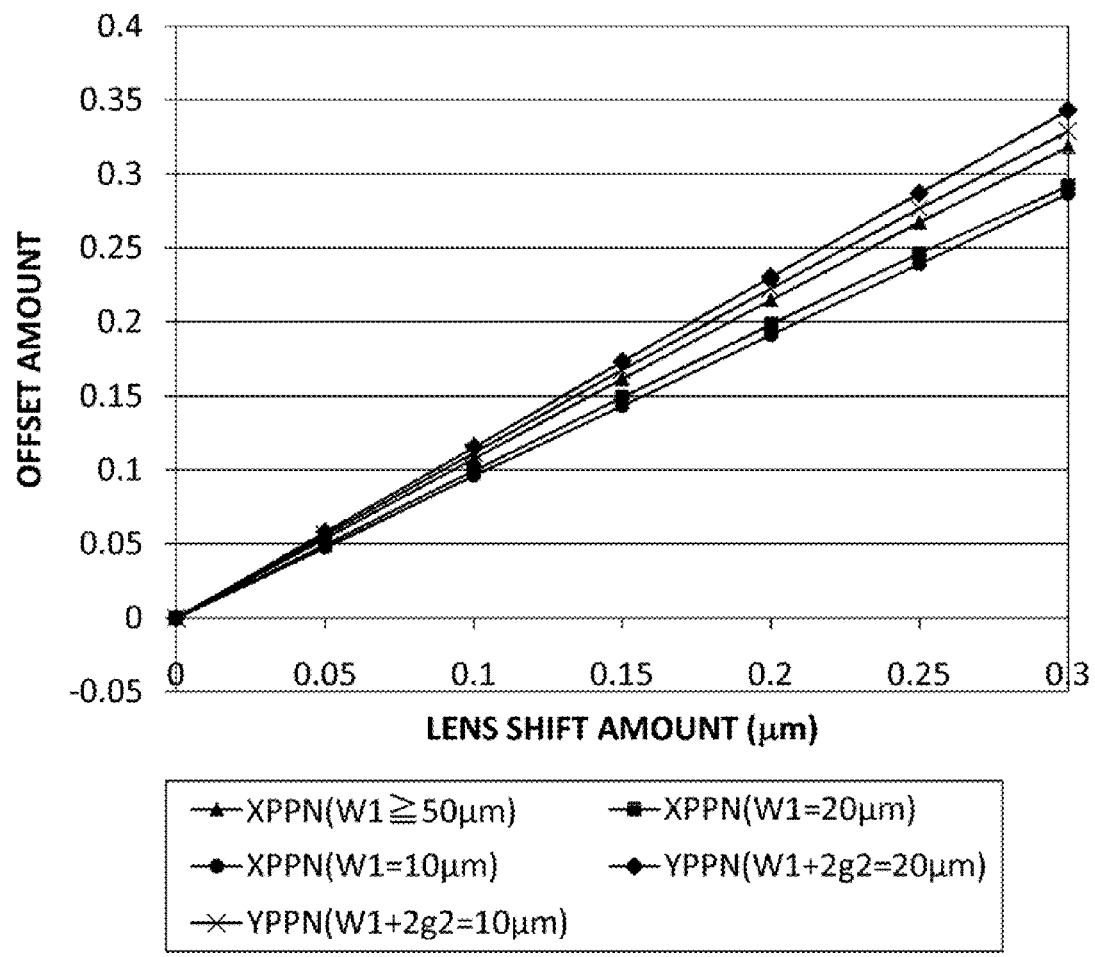
FIG. 34 shows an offset amount generated by a lens shift relative to a lens shift amount, for each normalized push-pull signal when w=10 μm, w=20 μm, w≧50 μm, and for each normalized push-pull signal when w+2g1=10 μm, 20 μm.

FIG. 34 shows an offset amount generated by a lens shift relative to a lens shift amount (mm), for each normalized push-pull signal XPPN when w1=10 μm, w1=20 μm, w1≧50 μm, and for each normalized push-pull signal YPPN when w1+2g2=10 μm, 20 μm. As shown in FIG. 34, in the normalized push-pull signal YPPN, the offset amount generated by the lens shift is larger than that in the normalized push-pull signal XPPN.

Figure 35:
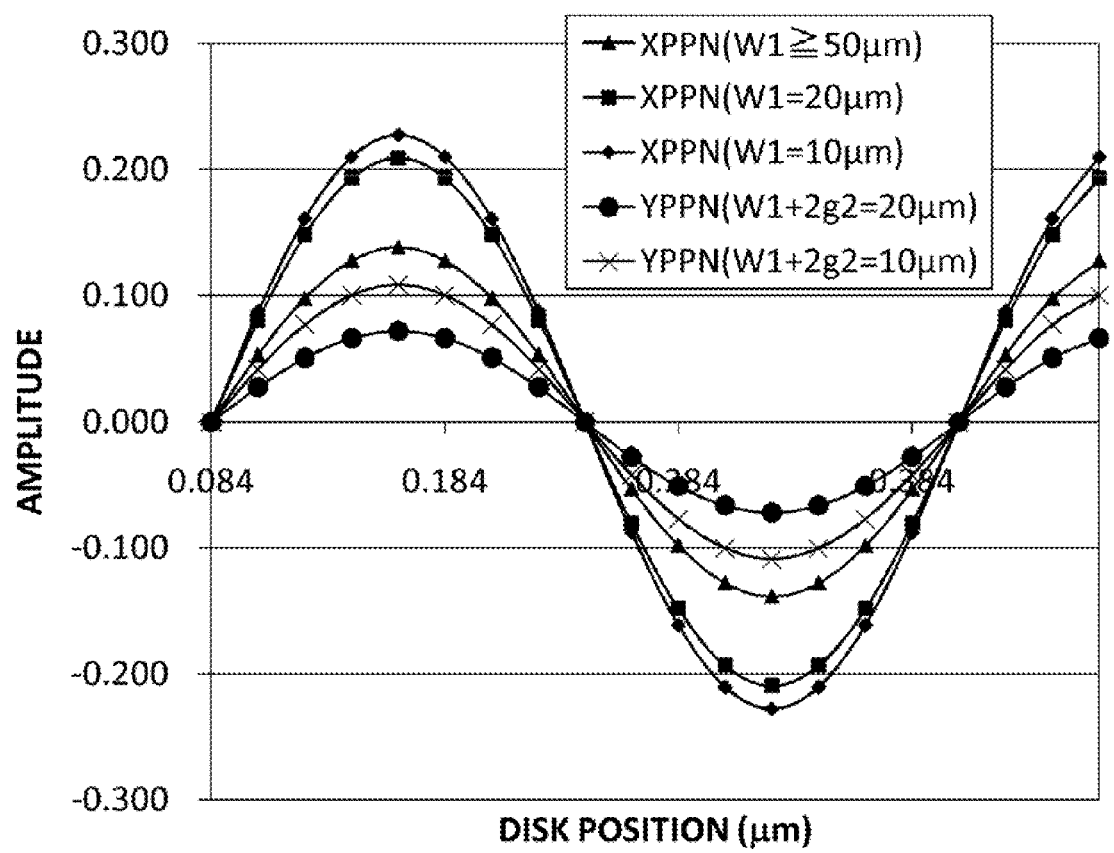
FIG. 35 is a plot diagram of a normalized push-pull signal similar to those in FIG. 34 at positions (μm) relative to a disk.

FIG. 35 is a plot diagram of the normalized push-pull signal XPPN and the normalized push-pull signal YPPN similar to those in FIG. 34 at positions (μm) relative to a disk. As shown in FIG. 35, amplitude in the normalized push-pull signal XPPN is larger than that in the normalized push-pull signal YPPN.

As is understood from FIGS. 34 and 35, a size relationship of an offset amount generated by the lens shift and a size relationship of amplitude is opposite between the normalized push-pull signal XPPN and the normalized push-pull signal YPPN. Therefore, by generating the tracking error signal TE as generated by the equation (95) by decreasing a constant $k_{27}$, the offset amount generated in the normalized push-pull signal YPPN can be made smaller than that when the normalized push-pull signal MPP is used as the tracking error signal TE.

The tracking error signal TE can be generated by the following equation (96) in place of the equation (95). An effect similar to the above can be also obtained in this way.

$$TE = \frac{XPP - k_{28A}YPP}{SUMx + k_{28B}SUMy} \tag{96}$$

Another method of calculating the tracking error signal TE by the tracking-error signal generating unit 61 is as explained above.

[Focus-Error Signal Generation Process]

A focus-error signal generation process performed by the tracking-error signal generating unit 61 according to the second embodiment (A) is explained next.

The focus-error signal generating unit 62 generates the focus error signal TE by using only light receiving areas constituting the main-beam receiving surface S1a.

Specifically, the focus-error signal generating unit 62 generates the focus error signal FE by calculating the following equation (97).

$$FE = (I_{1Ea} + I_{1Ia} + I_{1Da} + I_{1Ha}) - (I_{1Ca} + I_{1Ga} + I_{1Fa} + I_{1Ja}) \tag{97}$$

Figure 36:
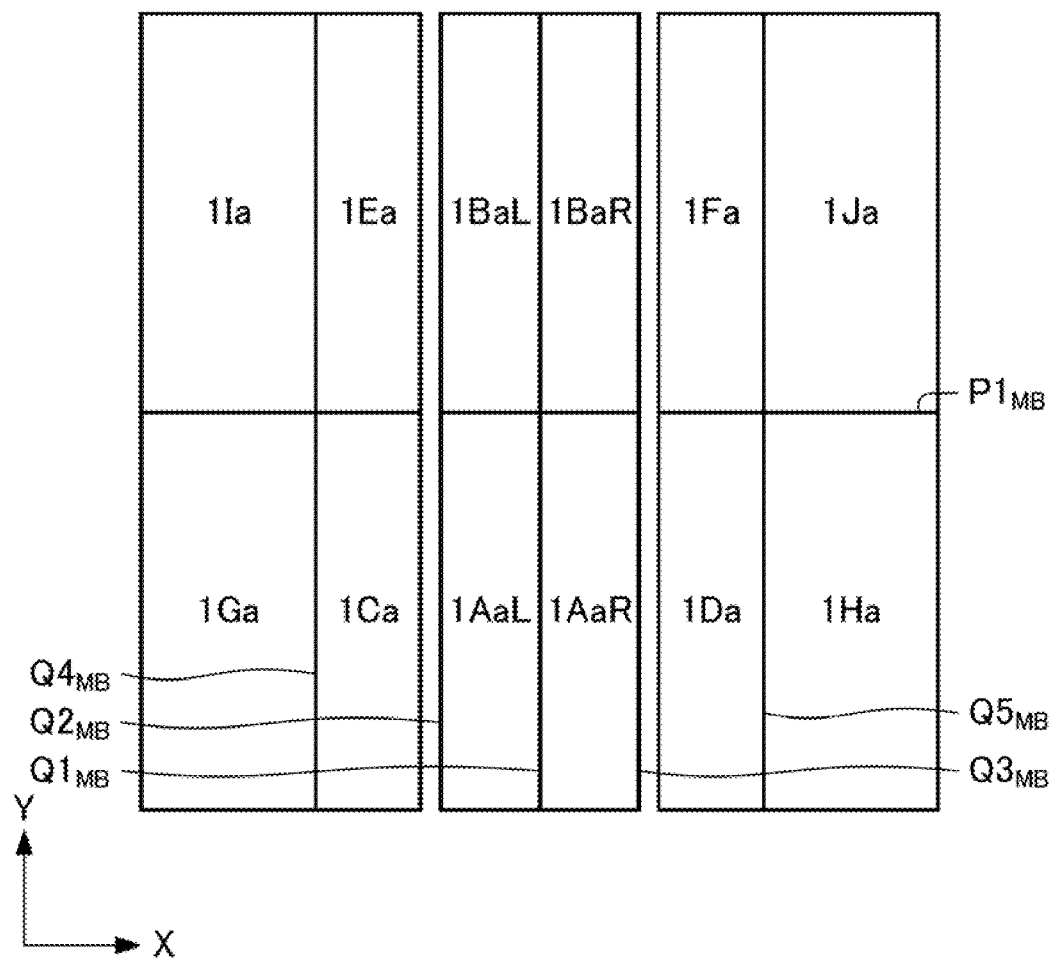
FIG. 36 is a diagram including only a main-beam receiving-surface portion extracted from a plan view of the optical detector according to the second embodiment (A)
Figure 37:
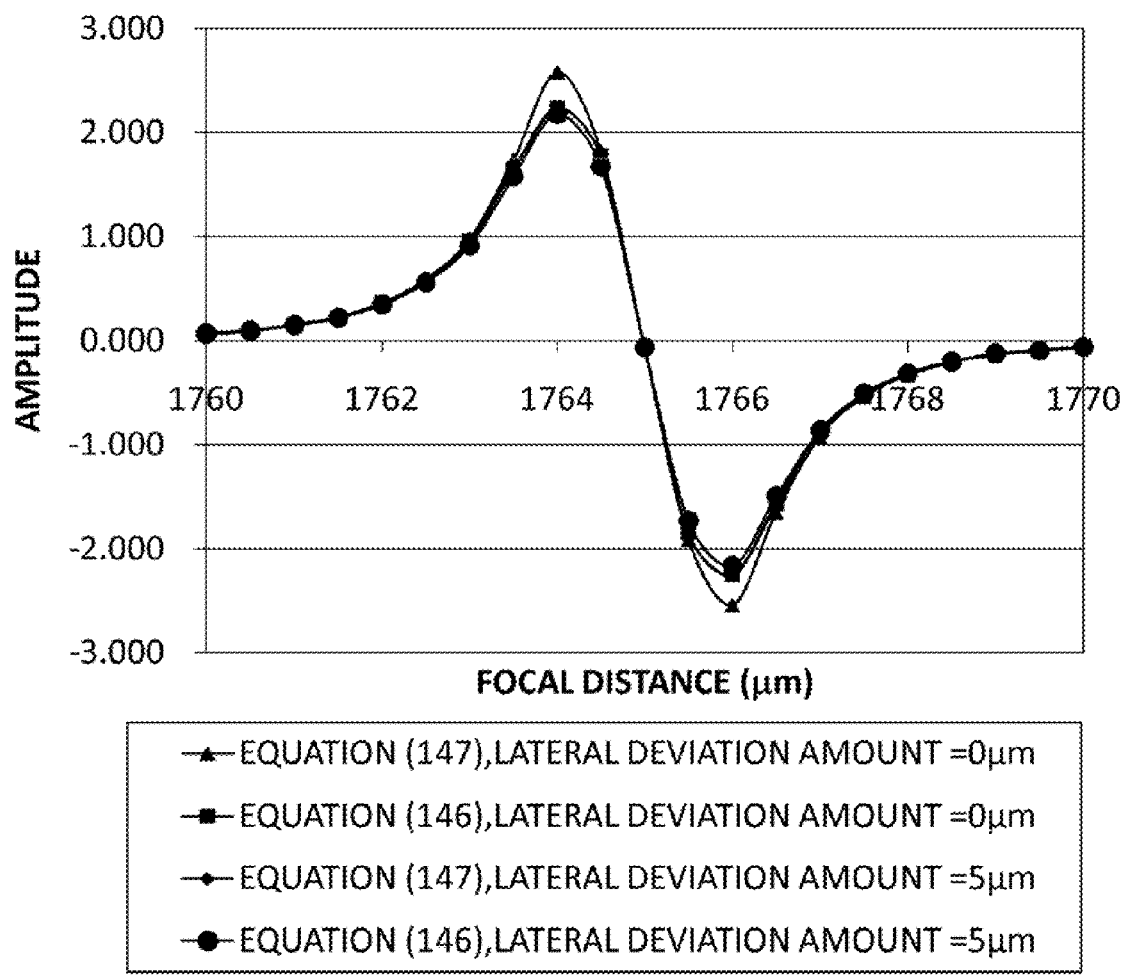
FIG. 37 shows a result of simulating the focus error signal generated in the second embodiment (A) plotted relative to a focal distance (μm)

FIG. 36 is a diagram including only the main-beam receiving surface S1a portion extracted from a plan view of the optical detector 5. In the example shown in FIG. 36, the straight line $Q1_{MB}$ shown in FIG. 20 is also used as a division line, and the light receiving area 1Aa is divided into light receiving areas 1AaL and 1AaR, and the light receiving area 1Ba is divided into light receiving areas 1BaL and 1BaR. When this division is performed, the focus-error signal generating unit 62 can suitably generate the focus error signal TE by calculating the following equation (98) in place of the equation (97). However, there is nothing particularly wrong when the equation (97) is used as shown in FIG. 37. Even when a spot is deviated laterally, there is little influence to the focus error signal FE calculated by the equation (98). FIG. 37 shows a result of simulating the equations (97) and (98) by assuming that optical magnification of the optical system 3 is 15 times, and a size of the main-beam receiving surface S1a is 100 square μm. In this simulation, W1=10 μm and g2=0 μm.

$$FE = (I_{1Ea} + I_{1Ia}I_{1BaL} + I_{1Da} + I_{1Ha} + I_{1AaR}) - (I_{1Ca} + I_{1Ga} + I_{1AaL} + I_{1Fa} + I_{1Ja} + I_{1BaR}) \tag{98}$$

The focus error signal FE can be also normalized in a similar manner to that of the tracking error signal.

The signal generation process performed by the focus-error signal generating unit 62 is as explained above.

[Total-Sum Signal Generation Process]

A total-sum signal generation process performed by the total-sum signal generating unit 63 is explained next. Explanations are made below with focusing on the pull-in signal PI.

The total-sum signal generating unit 63 generates the pull-in signal PI based on a light receiving amount at portions (the light receiving areas 1Aa to 1Fa) of the width W3 at the center of a signal light tangent direction in the light receiving areas constituting the main-beam receiving area S1a. Specifically, the total-sum signal generating unit 63 generates the pull-in signal PI by calculating the following equation (99).

$$PI = I_{1Aa} + I_{1Ba} + I_{1Ca} + I_{1Da} + I_{1Ea} + I_{1Fa} \tag{99}$$

The pull-in signal PI is used for the objective-lens control unit 64 to recognize a layer. By suitably setting the width W3, a valley (a minimum portion) of the pull-in signal PI when the focus position of an optical beam shifts between the recording layers can be secured, regardless of influence of stray light and a variation of reflectance ratios between recording layers. This is explained below in detail.

Figure 38:
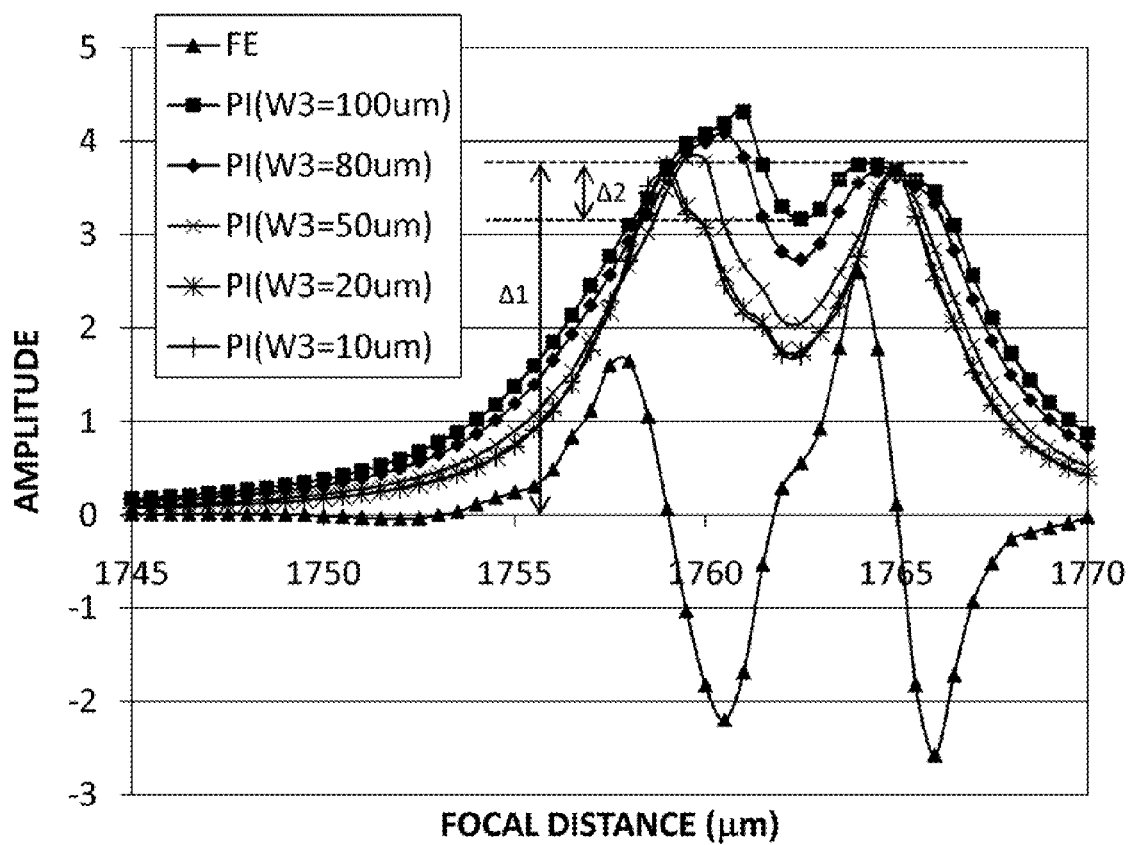
FIG. 38 shows a result of simulating the focus error signal and the pull-in signal generated in the second embodiment (A) plotted relative to a focal distance (μm)

First, FIG. 38 shows a result of simulating the focus error signal FE generated by the equation (98) and the pull-in signal PI generated by the equation (99), plotted relative to a focal distance (μm). For the width of the pull-in signal PI, five cases are shown for the width W3=10 μm, 20 μm, 50 μm, 80 μm, and 100 μm. Amplitude of the pull-in signal PI is suitably corrected to have the same level for comparison. A simulation is performed based on the following assumption. Optical magnification of the optical system 3 is set as 15 times, the optical disk 11 is a two-layer optical disk having an interlayer distance of 10 μm, and the length x of one side of the main-beam receiving surface S1a is set as 100 μm.

In FIG. 38, focal distances (two positions) where the focus error signal FE zero-crosses from a plus side to a minus side are a focal distance where light is focused on a recording surface. The pull-in signal PI has a peak near focal distances at these two positions. When the width W3 is smaller, fall of signals between the focal distances at the two positions becomes larger. Therefore, in performing focus servo, the objective-lens control unit 64 can more easily recognize a layer by the pull-in signal PI when the width W3 is smaller. Consequently, focus servo can be performed. By using the same signal for the RF signal, a data signal can be also detected.

Easiness of layer recognition is expressed by an interlayer isolation index BA shown in the following equation (100). In the equation, as for amplitudes of Δ1 and Δ2, as also shown in FIG. 38, amplitude of a peak having smallest amplitude among plural peaks of the pull-in signal PI is shown as Δ1. An amplitude difference of a valley having the smallest fall of plural valleys is shown as Δ2 (only one valley is shown in FIG. 38; when a multilayered optical disk having three or more layers is used, plural valleys appear in the pull-in signal PI). Layer recognition is possible when the interlayer isolation index BA is larger than 0, and becomes easier when the interlayer isolation index BA is larger.

$$BA + \frac{\Delta 2}{\Delta 1} \times 100 \qquad (100)$$

Figure 39:
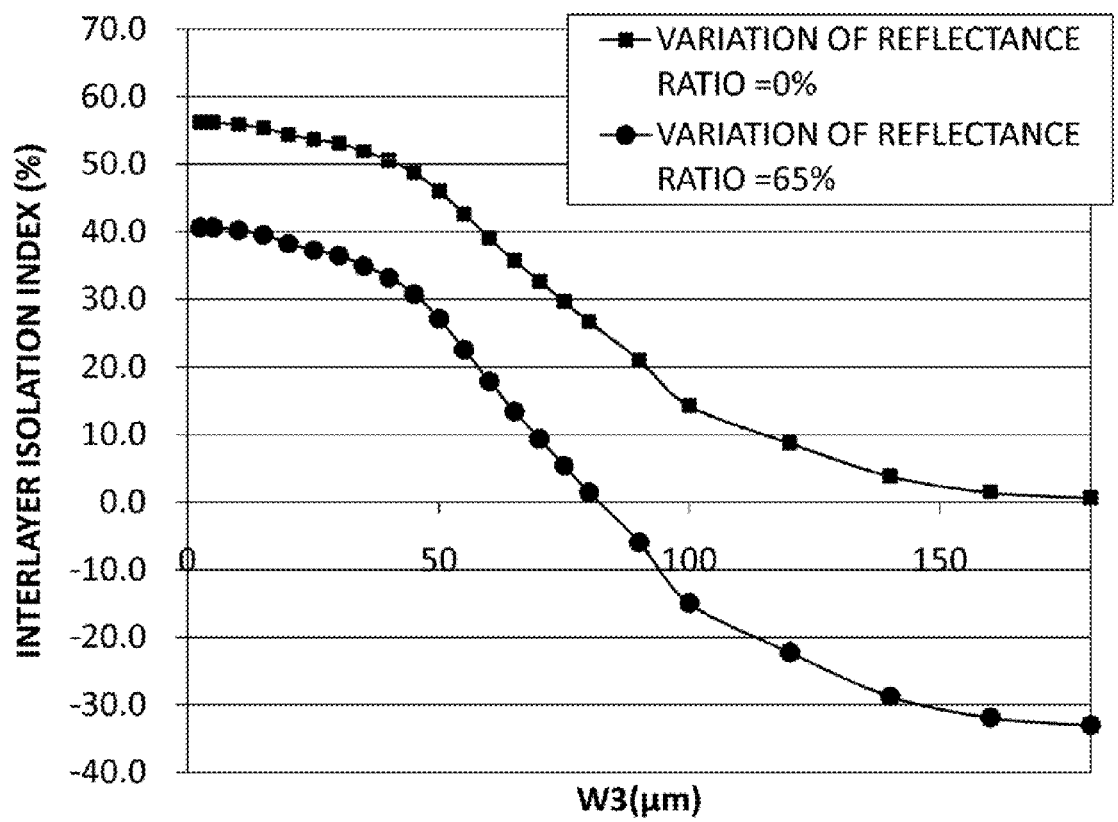
FIG. 39 is a plot diagram of an interlayer isolation index BA by using a width W3 as a lateral axis, when a variation of a reflectance ratio at the same radial position between recording layers is 0% and 65%.

FIG. 39 is a plot diagram of the interlayer isolation index BA by using the width W3 as a lateral axis, when a variation of a reflectance ratio at the same radial position between recording layers (a point where distances from the center of the optical disk is the same) is 0% (there is no variation) and 65% (maximum value permitted by the standard). Simulation conditions are the same as those used in FIG. 38.

As shown in FIG. 39, when a variation of the reflectance ratio is 0%, the interlayer isolation distance BA becomes larger than 0 regardless of the value of the width W3. Therefore, layer recognition is possible. On the other hand, when a variation of the reflectance ratio is 65%, the interlayer isolation index BA is smaller than 0 and layer recognition is impossible when the width W3 is about equal to or larger than 80 μm. On the other hand, when the width W3 is about equal to or larger than 80%, the interlayer isolation index BA is larger than 0 and layer recognition is possible. It can be said from the above that the width W3 needs to be at least equal to or smaller than 80% (equal to or smaller than 160% of the diameter of the spot of the optical beam).

As can be understood from FIG. 39, when the width W3 becomes about equal to or smaller than 50 μm, a value of the interlayer isolation index BA is stabilized both when the variation of the reflectance ratio is 0% and 65%. While a variation can also occur in the value of the width W3 and the diameter of the spot, a layer can be recognized stably regardless of the variation in the value of the width W3 and a diameter of the spot, when the width W3 is set about equal to or smaller than 50 μm (equal to or smaller than 100% of a diameter of the spot of the optical beam). That is, when a diameter of the spot varies, the width W3 can be said to vary for the same spot diameter, even when the width W3 does not vary. Therefore, the width W3 is preferably about equal to or smaller than 50 μm.

The signal generation process performed by the total-sum signal generating unit 63 is as explained above.

As explained above, when the optical drive device 1 according to the second embodiment (A) is used, influence given to the focusing of the optical beam by the change generated in each signal can be decreased. Specifically, influence given to the tracking servo by the interference offset and the assembly offset can be decreased. Further, layer recognition by the pull-in signal PI becomes possible regardless of a variation of the reflectance ratios between recording layers of the multilayered optical disk.

Other effects of using the optical drive device 1 are explained below.

Depending on the optical disk, reflectance ratios are different between an area in which data is recorded (a recorded area) and an area in which data is not yet recorded (an unrecorded area). For example, in a BD, a reflectance ratio in the recorded area becomes equal to or smaller than 60% of a reflectance ratio in the unrecorded area. Therefore, an offset can occur in the tracking error signal TE at a boundary (a record boundary) between the recorded area and the unrecorded area. According to the optical drive device 1, this offset can be also decreased. This is explained below in detail.

Diffracted light at the record boundary appearing in the signal light spot is explained first.

Figure 40:
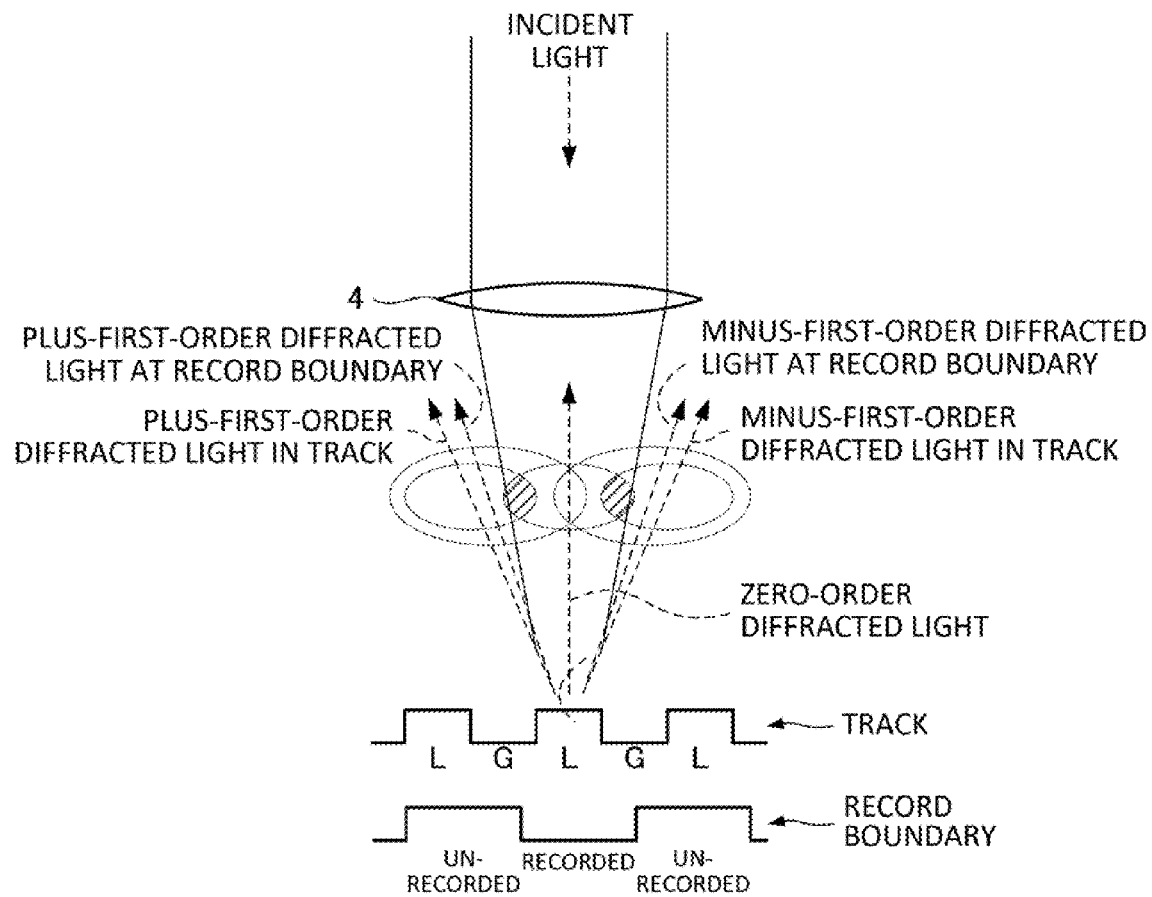
FIG. 40 is a schematic diagram of an end surface of a cross section of the optical-disk recording surface and a record boundary, and shows an objective lens and an optical beam (incident light, reflection light (zero-order diffracted light, ±first-order diffracted light on the track, and ±first-order diffracted light at a record boundary)) in the second embodiment (A)

Generally, it is known that the diffracted light at the record boundary appears in a longer cycle than a track pitch at a track jump time (two times, for example). FIG. 40 shows an end surface of across section of a recording surface of the optical disk 11 configured by plural tracks, a schematic diagram of a record boundary, the objective lens 4, and an optical beam (incident light, reflection light (zero-order diffracted light, ±first-order diffracted light on the track, and ±first-order diffracted light at a record boundary)).

As shown in FIG. 40, a diffraction angle of the ±first-order diffracted light at a record boundary is smaller than a diffraction angle of the ±first-order diffracted light on the track. This is because a cycle diffracted at the record boundary at the track jump time is longer than the track pitch as described above. Because each diffracted light has this diffraction angle, the ±first-order diffracted light at a record boundary interferes with the zero-order diffracted light and the ±first-order diffracted light on the track.

Figure 41:
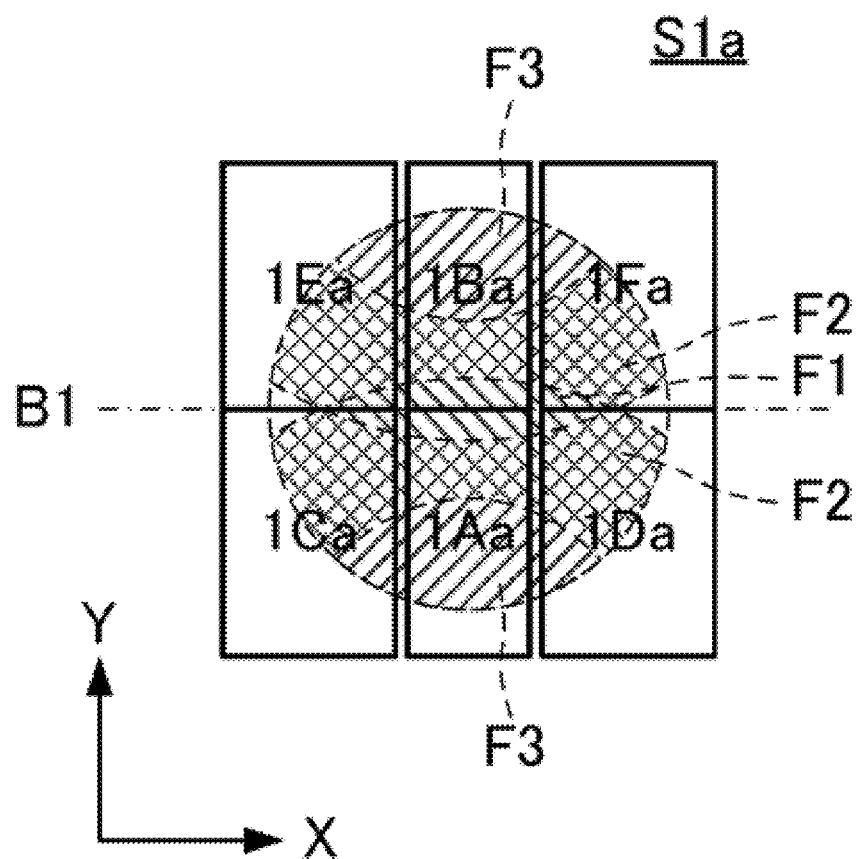
FIG. 41 shows a spot that the main beam of the optical beam shown in FIG. 40 forms on the main-beam receiving surface according to the second embodiment (A)

FIG. 41 shows a spot formed on the main-light receiving surface S1a by the main beam of the optical beam shown in FIG. 40. As shown in FIG. 40, interference areas F1 to F3 appear in this spot.

The interference area F1 is an area where three beams of the zero-order diffracted light and the ±first-order diffracted light at a record boundary interfere with each other. The interference area F2 is an area where the zero-order diffracted light and the ±first-order diffracted light at a record boundary interfere with each other. The interference area F3 is an area where the ±first-order diffracted light interfere in the push-pull areas E1 and E2 mentioned above and at the record boundary.

Figure 42:
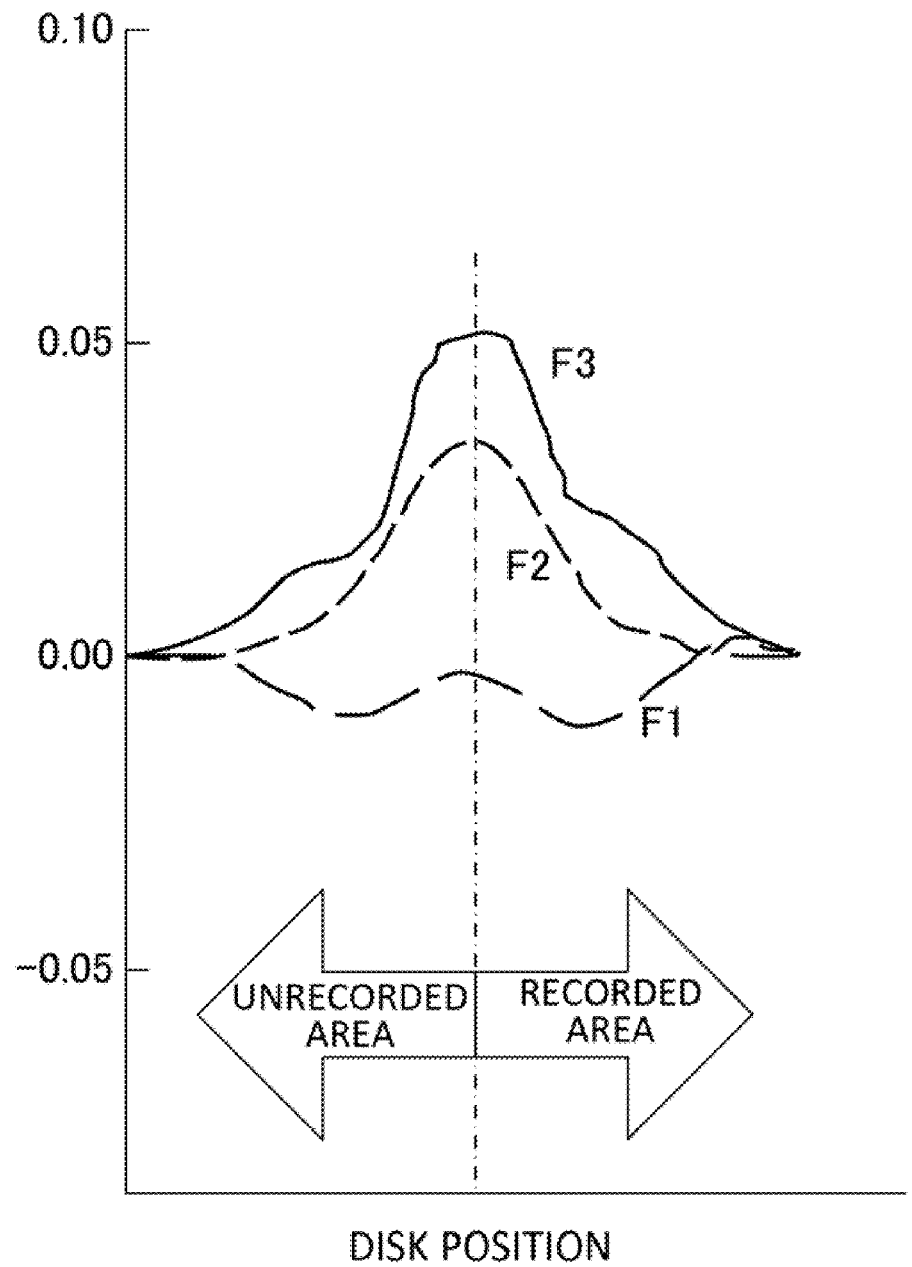
FIG. 42 shows, for each interference area and at a position relative to a disk, amplitude of a differential signal in upper and lower areas of an upper-and-lower division line on the main-beam receiving surface according the second embodiment (A)

FIG. 42 shows, for each interference area and at a position relative to a disk (μm), amplitude of a differential signal in upper and lower areas of an upper-and-lower division line (a line B1 in FIG. 41) on the main-beam receiving surface S1a. In FIG. 42, a record boundary is present at the center of the lateral axis. As shown in FIG. 42, differential signals in the interference areas F2 and F3 become plus near the record boundary. On the other hand, a differential signal in the interference area F1 becomes minus near the record boundary. These variations of the difference signals are offsets due to the presence of the record boundary.

At the time of generating the main push-pull signal MPP by using the entirety of the main-beam receiving surface S1a, a total of the differential signals in the interference areas F1 to F3 substantially coincides with the main push-pull signal MPP. However, because an offset occurs in the differential signal at the record boundary and because an absolute value of the offset in the interference area F1 is smaller than an absolute value of the offset in the interference areas F2 and F3, as shown in FIG. 42, the offset is not canceled, and the offset at the record boundary also remains in the main push-pull signal MPP.

On the other hand, at the time of generating the main push-pull signal MPP by the equation (46), for example, the proportion of the interference area F1 in the total light receiving areas used to generate the main push-pull signal MPP increases when the width W1 is smaller. Therefore, a minus portion of the difference signal in the interference area F1 becomes large, and the offset generated in the main push-pull signal MPP due to the presence of the record boundary becomes small. Consequently, when the width W1 is smaller, the offset of the tracking error signal TE at the record boundary is decreased.

A record boundary appearing in the stray light spot is explained next.

Normally, because a record boundary on the optical disk is parallel with a tangent direction of the optical disk, the record boundary appears in parallel with the lens shift base line within a spot that the reflected light forms on the optical detector 5.

As shown in FIG. 6, the lens shift base line of the stray spot is about parallel with the Y axis (a signal light radial direction). Therefore, regarding a main push-pull signal and a sub push-pull signal, influence of the record boundary within the stray light spot is substantially canceled in the calculation process. On the other hand, in the main sum signal and the sub sum signal, an offset occurs at the record boundary of the stray light spot. There is substantially no problem in the main sum signal because intensity of the main beam is sufficiently stronger than that of the stray light. However, the sub sum signal greatly varies based on the offset, and this affects precision of the tracking error signal TE.

Because the lens shift base line of the stray light spot is approximately parallel with the Y axis, influence of the record boundary appearing in the light receiving areas 2Aa, 2Ba, 3Ab, and 4Ab becomes mutually substantially equal. Similarly, influence of the record boundary appearing in the light receiving areas 3Aa, 3Ba, 5Ab, and 6Ab becomes mutually substantially equal. Therefore, when the width and the position in, the signal light tangent direction of each stray-light receiving surface are set the same as those of corresponding sub-beam receiving surface by the equation (74), the offset generated in the sub push-pull signal SUMs at the record boundary of the stray light spot can be canceled. As a result, offsets of the tracking error signal TE at the record boundary can be also decreased.

While an exemplary embodiment of the present invention has been explained above, the present invention is not limited to the embodiment, and it is needless to mention that the present invention can be carried out by various embodiments without departing from the scope of the invention.

Figure 43:
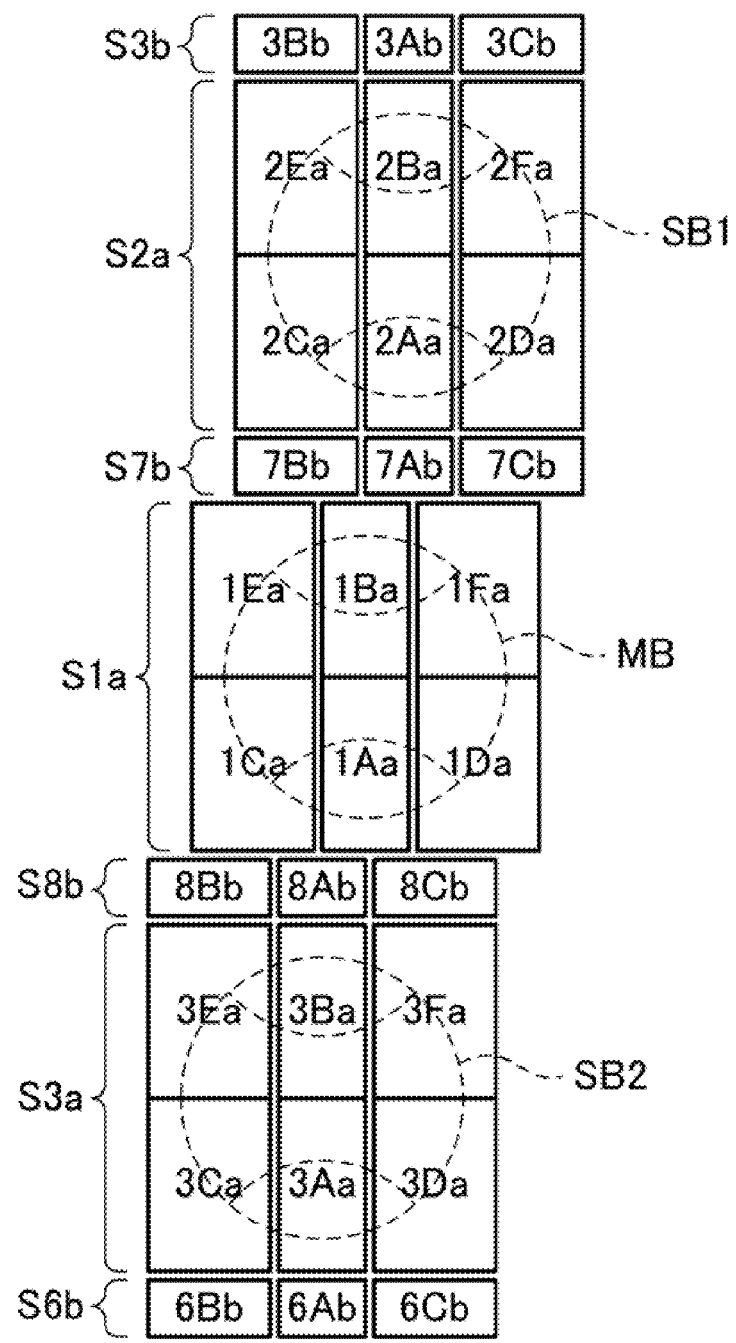
FIG. 43 shows a modification of the optical detector according to the second embodiment (A)

For example, the optical detector as shown in FIG. 43 can be also used, depending on the configuration of the optical system. This optical detector is used when sufficient space cannot be obtained between the main pattern and the sub pattern. The width and the position of the stray-light receiving surface are arranged to be equal with the sub patterns by prioritizing the correction of the sub signal. That is, the stray light component of the sum signal can be corrected by using the stray-light receiving surface for only the sub signal.

When this optical detector is used, the offsets of the tracking error signal TE can be also decreased by calculating various signals in a similar manner to that of the above embodiment. The detailed generation process of various signals is explained below in detail.

For example, the equations (74) and (78) are replaced by the following equations (101) and (102). By this replacement of the equations (74) and (78), the output signal in a light receiving area 7Ab is used in place of the output signal in the light receiving area 4Ab, and the output signal in a light receiving area 8Ab is used instead of the output signal in the light receiving area 5Ab. Offsets of the tracking error signal TE can be also decreased by generating various signals in this way.

$$\text{SUMs}A = \text{SUMs} - k_2(I_{3Ab} + I_{7Ab}) - k_3(I_{8Ab} + I_{6Ab}) \tag{101}$$

$$\text{SPP}A = \text{SPP} - k_5(I_{3Ab} - I_{7Ab}) - k_6(I_{8Ab} - I_{6Ab}) \tag{102}$$

Furthermore, widths of light receiving areas positioned at the center of the light receiving surfaces of the light receiving area 1Aa and the like are the same in the above embodiment. This arrangement is set to decrease the offset amount in the same conditions for each normalized push-pull signal. However, the widths do not need to be the same in some cases. For example, this is applied to when diameters of spots are different between the main beam MB and the sub beams SB1 and SB2, and when a width of the main-beam receiving surface S1$a$ is different from widths of the sub-beam receiving surfaces S2$a$ and S3$a$ by attaching importance to an interlayer isolation of the pull-in signal PI. Therefore, preferably, the widths of the light receiving areas are suitably adjusted based on other configurations of the optical drive device 1.

Second Embodiment (B)

FIG. 44 shows how to use division lines of the optical detector 5 according to the second embodiment (B). As shown in FIG. 44, in the optical detector 5 according to the second embodiment (B), the main-beam receiving surface S1$a$ is divided into eight areas including divided areas A1, A2, B1, B2, C1, C2, D1, and D2 by the straight lines P1$_{MB}$, P2$_{MB}$, P3$_{MB}$, and Q1$_{MB}$. These divided areas are arranged in the order of the divided areas D1, D2, C2, C1, B1, B2, and A2, in a clockwise direction from the divided area A1 positioned at an upper left side of the drawing of the main-beam receiving surface S1$a$. Hereinafter, the divided areas A1 and D1 are collectively called "light receiving area S1A", and the divided areas B1 and C1 are collectively called "light receiving area S1B".

Similarly, the sub-beam receiving surface S2$a$ is divided into eight areas including divided areas E1, E2, F1, F2, G1, G2, H1, and H2 by the straight lines P1$_{SB1}$, P2$_{SB1}$, P3$_{SB1}$, and Q1$_{SB1}$. These divided areas are arranged in the order of the divided areas H1, H2, G2, G1, F1, F2, and E2, in a clockwise direction from the divided area E1 positioned at an upper left side of the drawing of the sub-beam receiving surface S2$a$. Hereinafter, the divided areas E1 and H1 are collectively called "light receiving area S2A", and the divided areas F1 and G1 are collectively called "light receiving area S2B".

Similarly, the sub-beam receiving surface S3$a$ is divided into eight areas including divided areas E3, E4, F3, F4, G3, G4, H3, and H4 by the straight lines P1$_{SB2}$, P2$_{SB2}$, P3$_{SB2}$, and Q1$_{SB2}$. These divided areas are arranged in the order of the divided areas H3, H4, G4, G3, F3, F4, and E4, in a clockwise direction from the divided area E3 positioned at an upper left side of the drawing of the sub-beam receiving surface S1$a$. Hereinafter, the divided areas E3 and H3 are collectively called "light receiving area S3A", and the divided areas F3 and G3 are collectively called "light receiving area S3B".

As shown in FIG. 44, in the second embodiment (B), the straight lines Q2$_{MB}$, Q3$_{MB}$, Q4$_{BB}$, Q5$_{MB}$, Q2$_{SB1}$, Q3$_{SB1}$, Q2$_{SB2}$, and Q3$_{SB2}$ are not used as division lines. A state that these straight lines are "not used as division lines" includes a state that the straight lines are not actually divided, and a state that the processing unit 6 totals and uses the output signals in divided areas adjacent by sandwiching the straight lines, and therefore the straight lines are not substantially divided.

The stray-light receiving areas S1b to S6b are used without a division. That is, the stray-light receiving areas S1b to S6b are configured by independent light receiving areas I to N.

Each signal generating unit according to the second embodiment (B) generates various signals by using a part or all of the above divided areas. Signal generation processes performed by the focus-error signal generating unit 62 and the total-sum signal generating unit 63 are similar to those in the second embodiment (B), and therefore explanations thereof will be omitted. A tracking-error signal generation process performed by the tracking-error signal generating unit 61 is explained below.

In the second embodiment (B), the tracking-error signal generating unit 61 generates the main push-pull signal MPP and the main sum signal SUMm based on a light receiving amount at portions (the light receiving areas S1A and S1B) excluding portions of the widths W9 at both sides of the straight line $P1_{MB}$ in the main-beam receiving surface S1a. The tracking-error signal generating unit 61 also generates the sub push-pull signal SPP and the sub sum signal SUMs based on a light receiving amount at portions excluding portions of the widths W5 at both sides of the straight lines $P1_{SB1}$ and $P1_{SB2}$ in the sub-beam receiving surfaces S2a and S3a. Further, the tracking-error signal generating unit 61 generates the tracking error signal TE by dividing the differential push-pull signal PP obtained by subtracting a signal obtained by amplifying the sub push-pull signal SPP by a predetermined first amplification factor $k_{30}$ from the main push-pull signal MPP, by the normalization signal SUM obtained by adding a signal obtained by amplifying the sub sum signal SUMs by a predetermined second amplification factor $k_{31}$ to the main sum signal SUMm.

Specifically, the tracking-error signal generating unit 61 generates each of the above signals by the following equations (103) to (109). In the equations, the constant $k_{30}$ is determined to cancel the offset generated in the differential signal PP or in the normalized tracking-error signal TE by the lens shift. The constant $k_{31}$ is explained in detail later.

$$MPP = I_{S1A} - I_{S1B} \quad (103)$$

$$SPP = (I_{S2A} + I_{S3A}) - (I_{S2B} + I_{S3B}) \quad (104)$$

$$PP = MPP - k_{30} SPP \quad (105)$$

$$SUMm = I_{S1A} + I_{S1B} \quad (106)$$

$$SUMs = (I_{S2A} + I_{S3A}) + (I_{S2B} + I_{S3B}) \quad (107)$$

$$SUM = SUMm + k_{31} SUMs \quad (108)$$

$$TE = PP/SUM \quad (109)$$

The tracking-error signal generating unit 61 can correct the push-pull signal PP and the sum signal SUM by using the stray-light receiving surfaces I to N. Specifically, the tracking-error signal generating unit 61 can calculate the equations (110) to (113) in place of the equations (103) to (107). Constants $k_{32}$ to $k_{37}$ are determined to cancel offsets generated in the difference signal PP or the normalized tracking error signal TE by a lens shift.

$$MPP = (I_{S1A} - k_{32}I_I) - (I_{S1B} - k_{33}I_J) \quad (110)$$

$$SPP = (I_{S2A} + I_{S3A} - k_{34}I_K - k_{35}I_M) - (I_{S2B} + I_{S3B} - k_{36}I_L - k_{37}I_N) \quad (111)$$

$$SUMm = (I_{S1A} - k_{32}I_I) + (I_{S1B} - k_{33}I_J) \quad (112)$$

$$SUMs = (I_{S2A} + I_{S3A} - k_{34}I_K - k_{35}I_M) + (I_{S2B} + I_{S3B} - k_{36}I_L - k_{37}I_N) \quad (113)$$

In the normalization sum signal SUM generated above, the "sum signal variation" described above occurs when the objective lens 4 is shifting. Because this "sum signal variation" becomes a cause of "asymmetry of a push-pull waveform" of the tracking error signal TE as described above, this "sum signal variation" is preferably as small as possible. Because a size of a "sum signal variation" can be controlled by a value of the constant $k_{31}$, the value of the constant $k_{31}$ preferable to decrease the size of a "sum signal variation" as far as possible is explained next.

Figure 45:
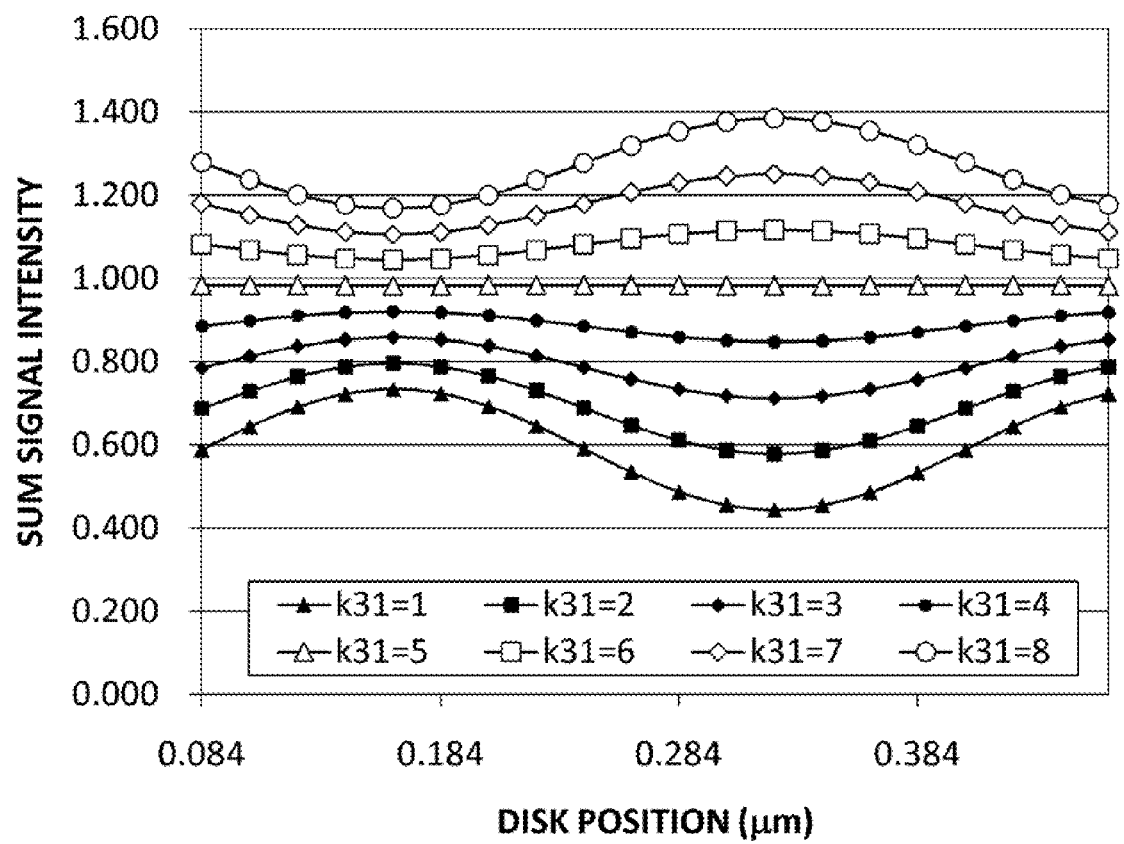
FIG. 45 is a plot diagram of a normalization sum signal SUM according to the second embodiment (B), obtained by a simulation for each constant $k_{31}$ at positions (μm) relative to a disk.
Figure 46:
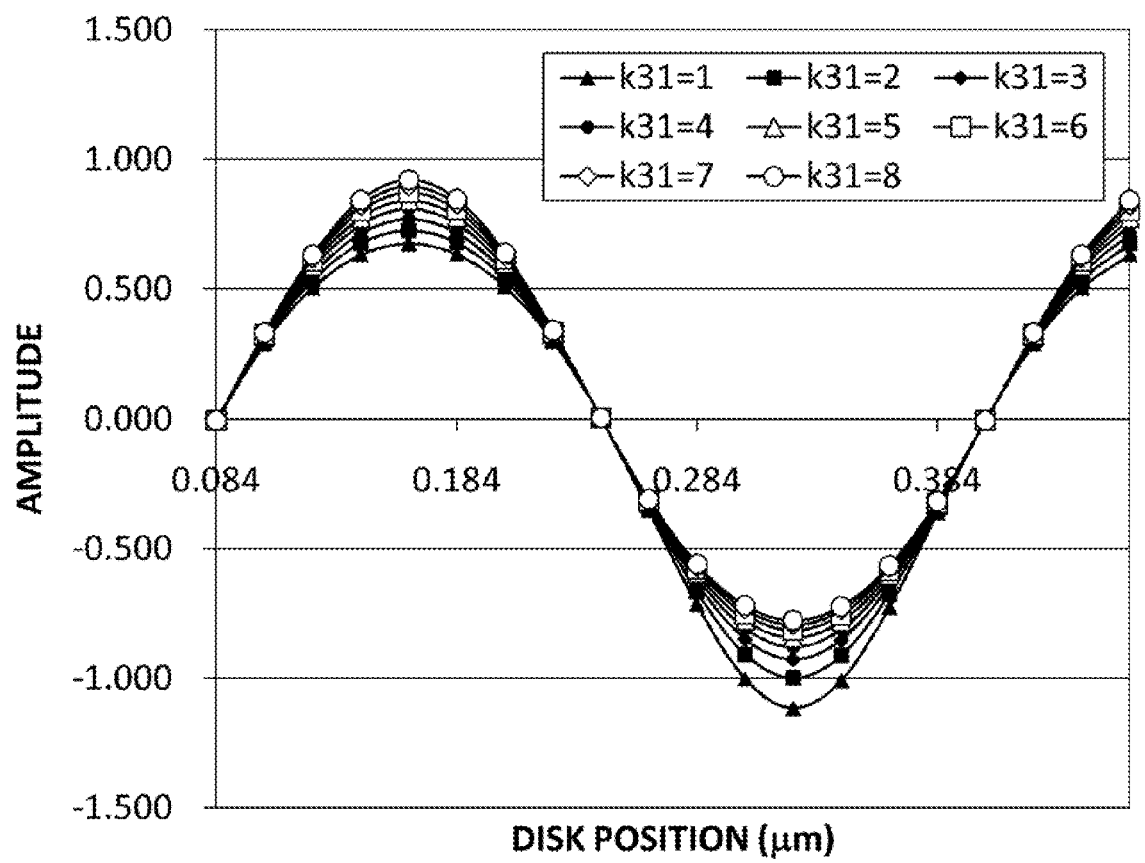
FIG. 46 is a plot diagram of a tracking error signal TE according to the second embodiment (B), obtained by a simulation for each constant $k_{31}$ at positions (μm) relative to a disk.
Figure 47:
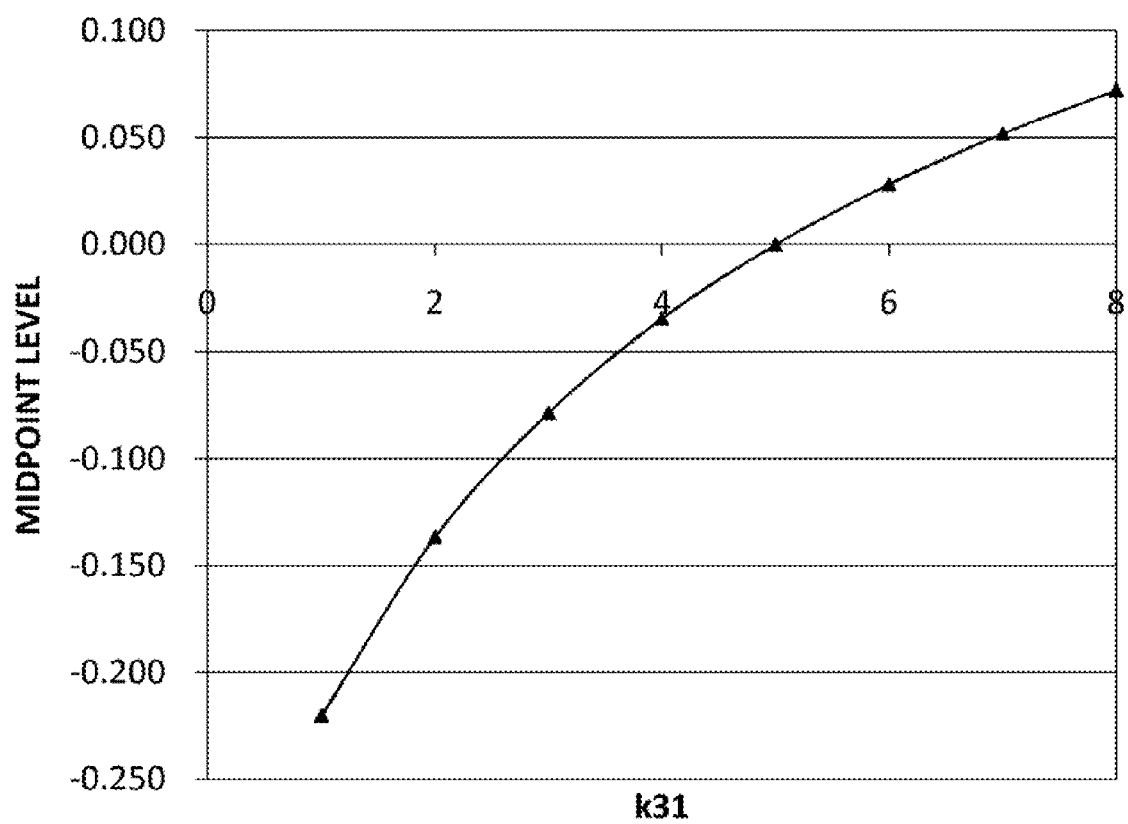
FIG. 47 is a plot diagram of the tracking error signal TE shown in FIG. 46, obtained by plotting a midpoint level of the signal ((maximum amplitude+minimum amplitude)/2) for each constant $k_{31}$.

FIG. 45 is a plot diagram of the normalization sum signal SUM obtained by the equations (106) to (108) by a simulation for each value of the constant $k_{31}$ at positions (μm) relative to a disk. FIG. 46 is a plot diagram of the tracking error signal TE obtained by the equations (103) to (109) by a simulation for each value of the constant $k_{31}$ at positions (μm) relative to a disk. FIG. 47 is a plot diagram of the tracking error signal TE shown in FIG. 46 obtained by plotting a midpoint level of the signal ((maximum value+minimum value)/2) for each constant $k_{31}$. In the simulation in FIG. 45 to FIG. 47, optical magnification of the optical system 3 is set as 15 times, the optical disk 11 is a one-layer optical disk having a track pitch 0.32 μm and a trench depth 0.02 μm, and a length x of one side of the main-beam receiving surface S1a is set as 100 μm. The lens shift is set as 0.3 mm, and W4=W5=22.5 μm. Further, a light intensity ratio of the main beam MB to the sub beams SB1 and SB2 is set as 10:1.

As shown in FIG. 45, when the constant $k_{31}$ is 5, a "sum signal variation" does not occur in the normalization sum signal SUM. By reflecting this, as shown in FIG. 47, a midpoint level of the tracking error signal TE when the constant $k_{31}$ is 5 becomes 0. That is, "asymmetry of a push-pull waveform" does not occur in the tracking error signal TE. On the other hand, in FIG. 45, as a value of the constant $k_{31}$ is more different from 5, a large "sum signal variation" occurs in the normalization sum signal SUM. By reflecting this, as shown in FIG. 47, large "asymmetry of a push-pull waveform" also occurs in the tracking error signal TE. Therefore, in this example of simulation, the constant $k_{31}$ is most preferably 5.

A numerical value "5" in the simulation is a value equal to a beam intensity ratio. When at least influence of stray light is not present, a value of the constant $k_{31}$ is most preferably a value equal to the beam intensity ratio.

However, because influence of stray light is actually present, a beam intensity ratio does not become an optimum value of the constant $k_{31}$. It is normally difficult to set a value of the constant $k_{31}$ strictly equal to the beam intensity ratio. It is preferable to determine a value of the constant $k_{31}$ by actually measuring the normalization sum signal SUM (this method is described in detail later). However, substantially a value of the constant $k_{31}$ can be about equal to the beam intensity ratio. For example, an error within 20% is permissible. From the viewpoint of a comparison with the background technique shown in the equation (8) (corresponding to $k_{31}=1$), when at least a value of the constant $k_{31}$ is set larger than 1, an effect of minimizing "asymmetry of a push-pull waveform" can be obtained.

A determination procedure (an amplification factor determination method) of the constants $k_{30}$ and $k_{31}$ is explained below in detail. In the following procedure, the constant $k_{31}$ (second amplification factor) is first determined. The constant $k_{30}$ (first amplification factor) is then determined by using the tracking error signal TE to which the determined constant $k_{31}$ is applied.

Figure 48:
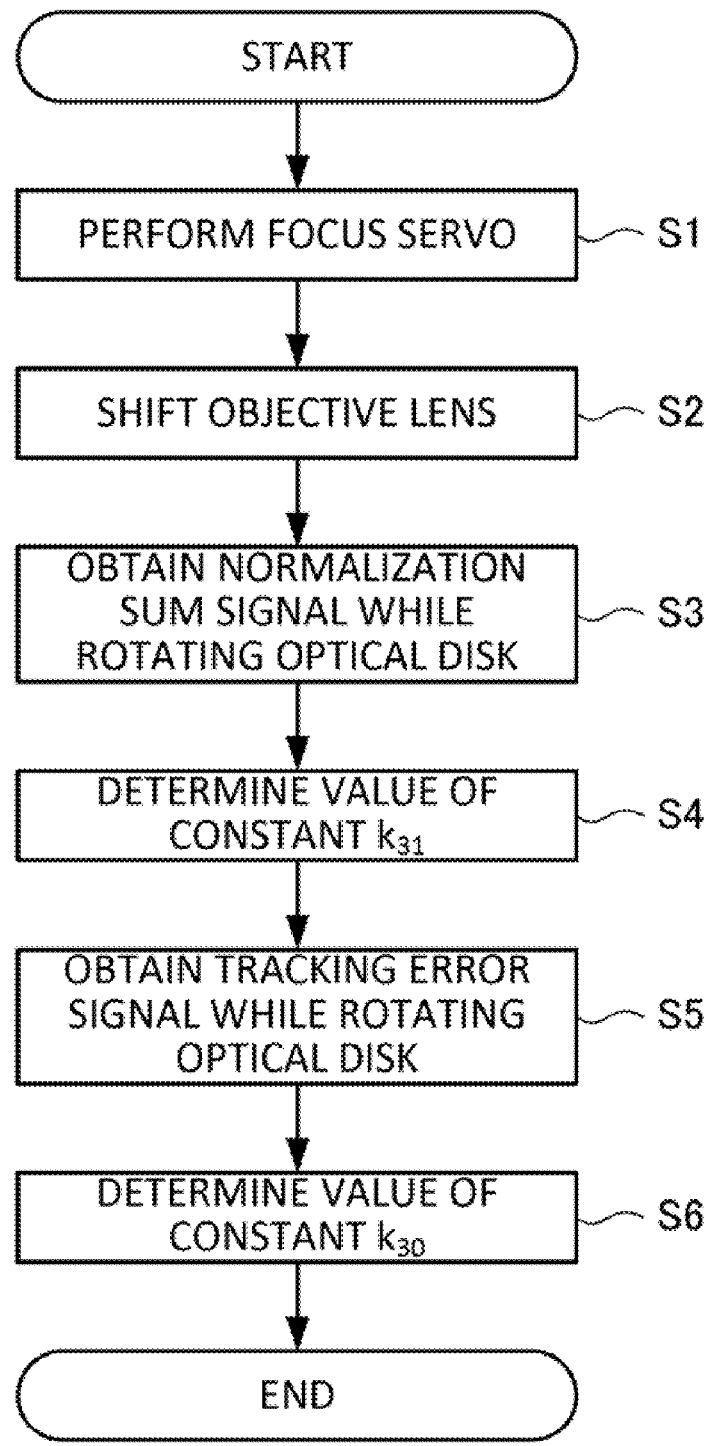
FIG. 48 is a flowchart of a CPU processing procedure to determine constants $k_{30}$ and $k_{31}$ according to the second embodiment (B)

FIG. 48 is a flowchart showing a processing procedure of the CPU 7 to determine the constants $k_{30}$ and $k_{31}$. As shown in FIG. 48, the CPU 7 first starts focus servo to set an on-focus state (Step S1). Next, the objective lens 4 is shifted by 0.3 μm, for example, thereby generating a lens shift state (Step S2).

The normalization sum signal SUM is obtained by the equation (21) by rotating the optical disk 11 (Step S3). A value of the constant $k_{31}$ is determined not to generate a sum signal variation in this normalization sum signal SUM (Step S4).

Figure 49:
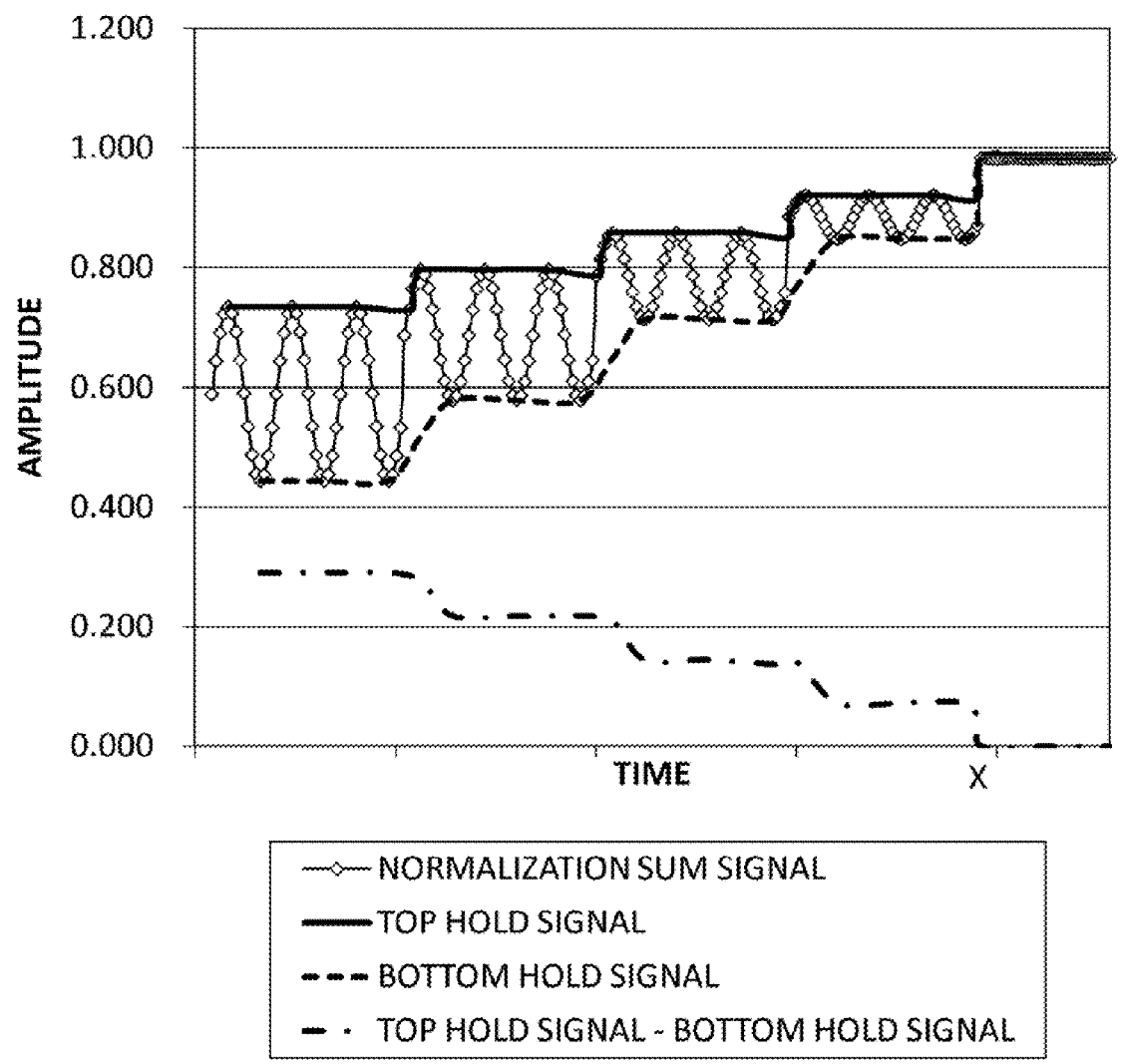
FIG. 49 shows a detailed example of a method of determining a value of the constant $k_{31}$ at Step S4 in FIG. 48.

FIG. 49 shows a detailed example of a method of determining a value of the constant $k_{31}$ at Step S4. In this example, a value of the constant $k_{31}$ is determined so that a difference between a top hold value and a bottom hold value of a variation following a track jump of the normalization sum signal SUM becomes equal to or smaller than a predetermined threshold value.

The normalization sum signal SUM in FIG. 49 is the same as that used in FIG. 45. The lateral axis represents time, and a value of the constant $k_{31}$ is sequentially changed from 1 (an initial value) to 5 at a cyclical interval, and is plotted. As shown in FIG. 49, at the time of changing over between values of the constant $k_{31}$, a top hold signal and a bottom hold signal can be arranged to follow the normalization sum signal SUM, by temporarily increasing a droop rate.

As shown in FIG. 49, following a change of a value of the constant $k_{31}$ from 1 (the initial value) to 5, an amplitude difference between the top hold signal and the bottom hold signal ("top hold signal"−"bottom hold signal") becomes gradually small. When a threshold value of the amplitude difference is 0.05, for example, the amplitude difference becomes equal to or smaller than the threshold value at a time X shown in FIG. 49. Therefore, the value 5 of the constant $k_{31}$ at the time X is determined as a value of the constant $k_{31}$ not generating a sum signal variation in the normalization sum signal SUM. As for the comparison between the amplitude difference and the threshold value, it suffices that these values are input to a comparator to determine a logical value of a signal output from the comparator as a result.

Referring back to FIG. 48, after a value of the constant $k_{31}$ is determined at Step S4, while maintaining the on-focus state and the lens shift state and by continuously rotating the optical disk 11, the tracking error signal TE is obtained by the equation (109) (Step S5). In this case, a value determined at Step S4 is used for the constant $k_{31}$. A value of the constant $k_{30}$ is determined so that a variation intermediate value of the tracking error signal TE becomes zero (to cancel the offset generated by the lens shift) (Step S6).

By determining the values of the constants $k_{30}$ and $k_{31}$ as described above, the constant $k_{30}$ can be determined by using the tracking error signal TE generated based on the normalization sum signal SUM in which a sum signal variation does not substantially occur. Therefore, occurrence of a sum signal offset in the tracking error signal TE can be substantially prevented. In other words, the influence of the sum signal offset given to the tracking servo can be decreased.

There are explained below an effect obtained and optimum values of the widths W4 and W5 by generating the tracking error signal TE by the equation (109), without using a portion excluding a portion of the width W4 at both sides of the straight line $P1_{MB}$ in the main-beam receiving surface S1$a$, and without using a portion excluding a portion of the width W5 at both sides of the straight lines $P1_{SB1}$ and $P1_{SB2}$ in the sub-beam receiving surfaces S2$a$ and S3$a$.

The effect is explained first with reference to a simulation result. In the following simulation, optical magnification of the optical system 3 is set as 15 times, the optical disk 11 is a one-layer optical disk having a track pitch 0.32 μm and a trench depth 0.02 μm, and a length x of one side of the main-beam receiving surface S1$a$ is set as 100 μm. NA of the objective lens is set as 0.85, and a wavelength λ, is set as 405 nm.

Figure 50:
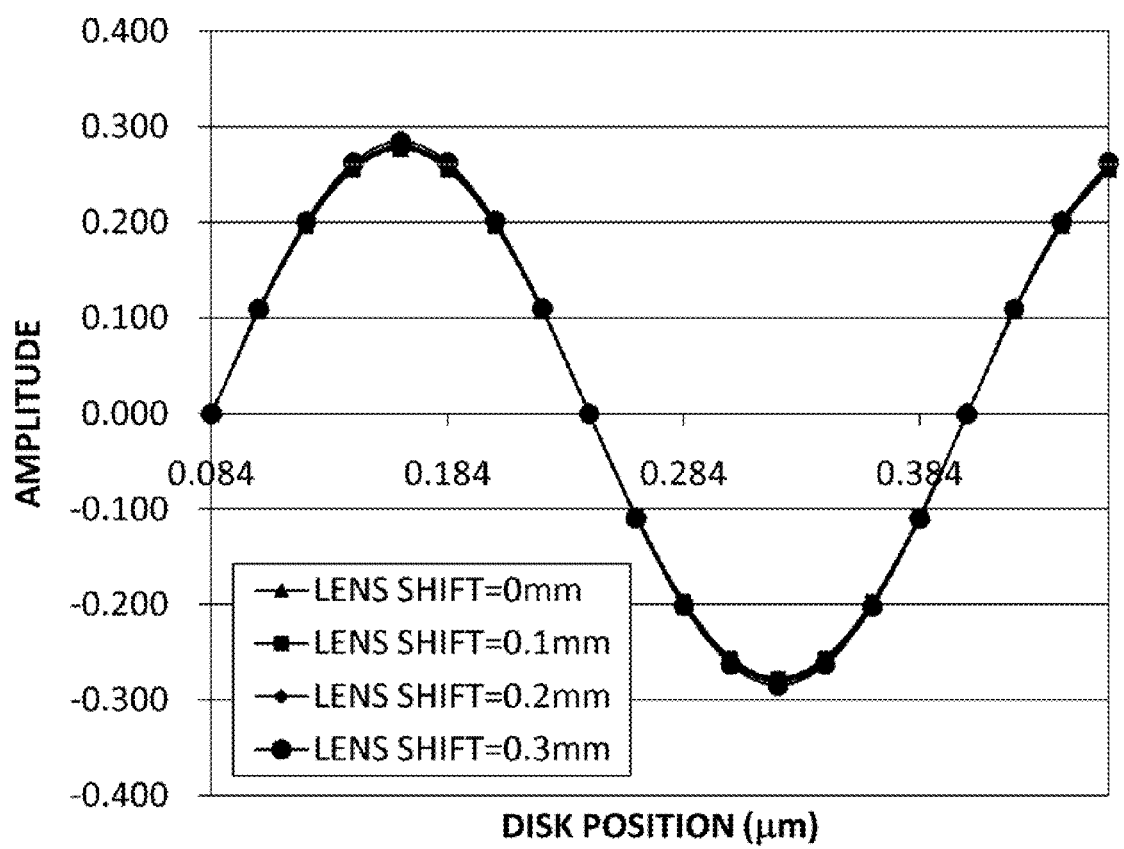
FIG. 50 is a plot diagram of a tracking error signal according to the background technique of the present invention, obtained by a simulation for each size of a lens shift at positions (μm) relative to a disk.

FIG. 50 shows a tracking error signal generated by the following equation (114) based on W4=W5=0 and $k_{38}$=1, as a comparative example. The main push-pull signal MPP generated by the equations (103), (104), (106), and (107) is used in the equation (114).

$$TE = \frac{MPP}{SUMm} - k_{38}\frac{SPP}{SUMs} \quad (114)$$

Figure 51:
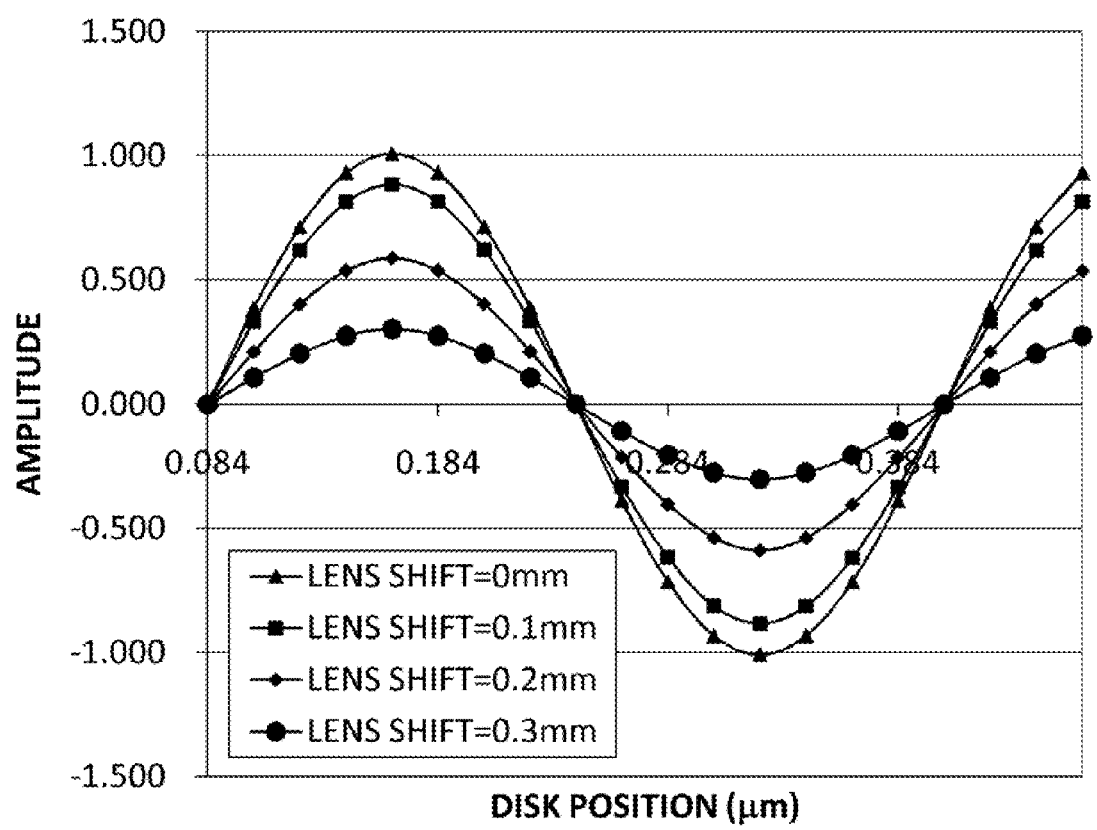
FIG. 51 is a plot diagram of a tracking error signal according to the background technique, obtained by a simulation for each size of a lens shift at positions (μm) relative to a disk.

Further, as another comparative example, FIG. 51 shows a tracking error signal generated by the equation (114) by assuming that W4=W5≠0, and $k_{38}$=1. When FIG. 51 is compared with FIG. 50, it can be recognized that while push-pull amplitude increases to about four times in FIG. 51, the push-pull amplitude varies corresponding, to a size of the lens shift.

Figure 52:
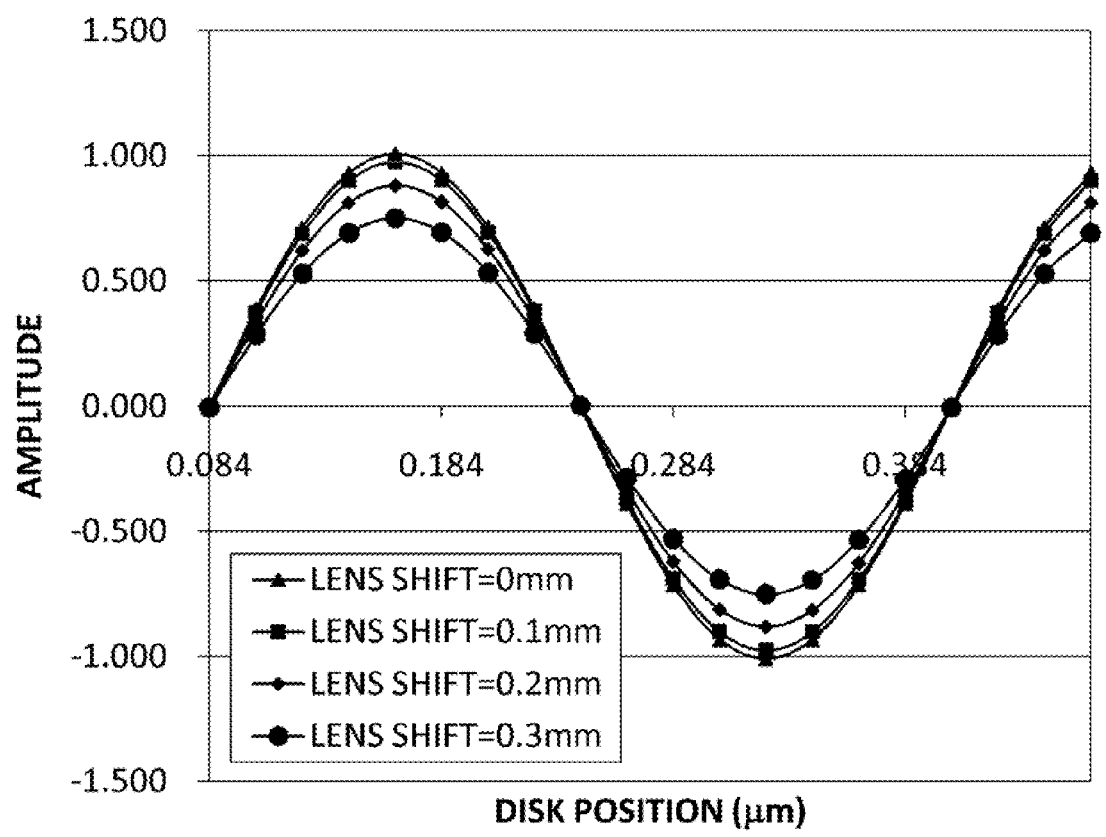
FIG. 52 is a plot diagram of a tracking error signal according to the embodiment of the present invention, obtained by a simulation for each size of a lens shift at positions (μm) relative to a disk.

FIG. 52 shows the tracking error signal TE generated by the equation (109) by assuming that W4=W5≠0, and $k_{30}$=$k_{31}$=5.

As is clear from FIG. 52, in the tracking error signal TE generated by the equation (109), an amplitude variation corresponding to a size of the lens shift is suppressed to some extent as compared with an amplitude variation in the comparative example shown in FIG. 51. A size of the push-pull amplitude is larger than that in the comparative example shown in FIG. 50. Therefore, the offset amount generated by the lens shift in the tracking error signal TE is decreased as compared with that in the comparative examples shown in FIGS. 50 and 51.

Optimum values of the widths W4 and W5 are explained next. The widths W4 and W5 are not necessarily required to be the same. However, beam diameters of the main beam MB and the sub beams SB1 and SB2 are substantially the same in many cases. In this case, the widths W4 and W5 are preferably mutually the same. Therefore, the following explanation is based on an assumption that values of the widths W4 and W5 are equal.

Figure 53:
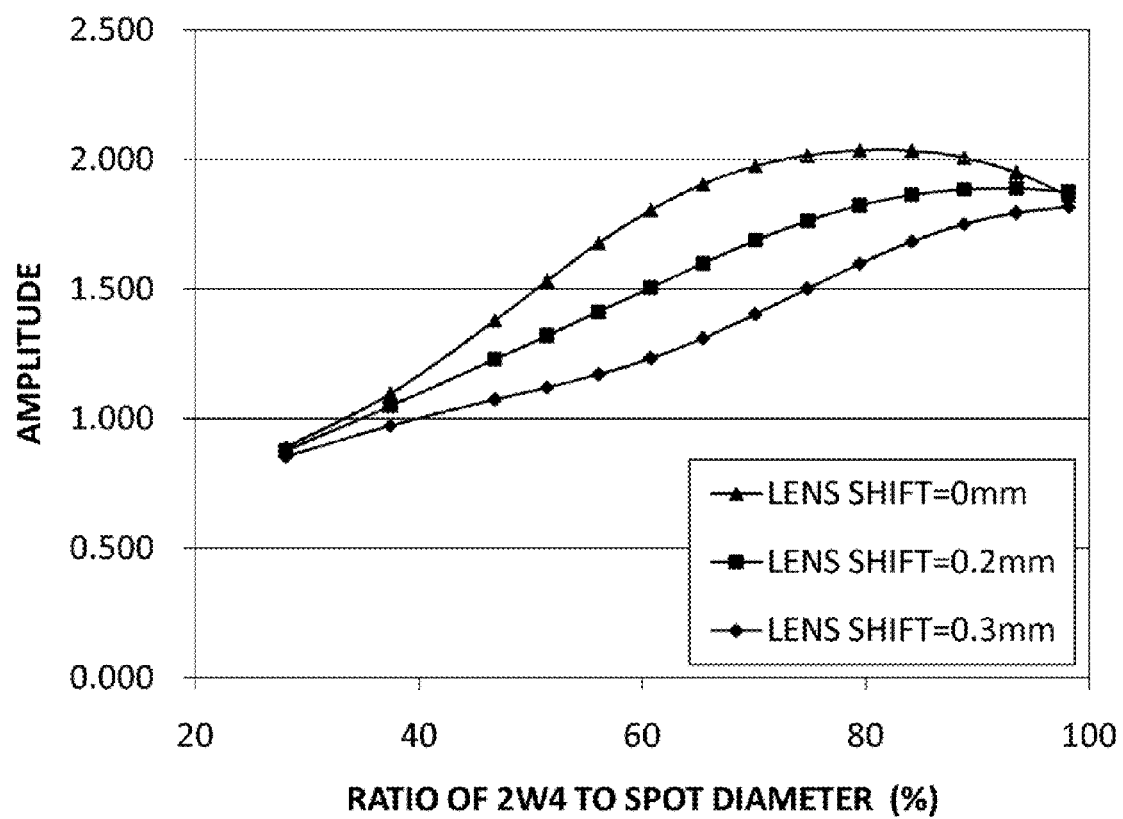
FIG. 53 shows each size of a lens shift a relationship between amplitude of a tracking error signal and W4.

FIG. 53 shows each size of a lens shift a relationship between the amplitude of the tracking error signal TE generated by the equation (109) and the width W4. A lateral axis of the diagram expresses a ratio of a double value of the width W4 to a spot diameter. The spot diameter is 53.5 μm.

As shown in FIG. 53, in case there is a lens shift, when the width W4 becomes nearer 100% of the spot diameter, amplitude of the tracking error signal TE becomes large. When the width W4 exceeds about 80% of the spot diameter, a change of the amplitude relative to a change of the amplitude W4 becomes small. Therefore, the width W4 is preferably set within a range of about 80% to 100% of the spot diameter.

Because a size of spot light also varies based on a variation of the optical system 3, the width W4 needs to be set to a value not exceeding the diameter of the spot light even when the size of the spot light varies. That is, as shown in FIG. 53, the amplitude of the tracking error signal TE when there is no lens shift becomes a polar maximum value when the width W4 takes a value near 80% of the spot diameter. Accordingly, when a value of the width W4 is set near 80% (80%±10%) of the spot diameter, the offset of the tracking error signal TE can be set a polar minimum value. In addition, as described above, when a value of the width W4 is near 80% of the spot diameter, a change of amplitude relative to a change of the width W4 becomes small. Consequently, reduction of the amplitude of the tracking error signal TE due to the variation of the optical system 3 can be also prevented.

While an exemplary embodiment of the present invention has been explained above, the present invention is not limited to the embodiment, and it is needless to mention that the present invention can be carried out by various embodiments without departing from the scope of the invention.

For example, in the above embodiments, generation of a tracking error is achieved by using only a portion of the width W1 at the center of a signal light tangent direction in the main-beam receiving surface by dividing the light receiving surface, for example. Alternatively, the above signal generation can be also achieved by forming a light shielding film suitably having an interval on the light receiving surface instead of dividing the light receiving surface.

What is claimed is:

1. An optical drive device comprising:
   a laser light source;
   a diffraction grating through which an optical beam passes from the laser light source;
   an optical detector having a main-beam receiving surface, a plus-first-order sub-beam receiving surface, and a minus-first-order sub-beam receiving surface receiving respectively zero-order diffracted light, plus-first-order diffracted light, and minus-first-order diffracted light of the optical beam obtained by diffraction of the optical beam through the diffraction grating; and
   a tracking-error signal generator configured to generate a tracking error signal based on a light receiving amount of the optical beam received in each of the receiving surfaces,
   wherein each of the light receiving surfaces is formed point-symmetrically to a spot center of a corresponding one of the diffracted light, and line-symmetrically to a straight line passing through the spot center and parallel with a signal light tangent direction, and is further divided into two signal-light receiving areas by the straight line, the tracking-error signal generator being configured to generate a main push-pull signal based on a light receiving amount at a portion of a non-zero width W1 centered on the spot center of the zero-order diffracted light and extending perpendicularly to the signal light tangent direction in the main-beam receiving surface, to generate a sub push-pull signal based on a light receiving amount at a portion of a non-zero width W2 that is centered on the spot center of the plus-first-order diffracted light and the minus-first-order diffracted light and extending perpendicularly to the signal light tangent direction in the ±first order sub-beam receiving surfaces, and to generate the tracking error signal based on the main push-pull signal and the sub push-pull signal, at least one of the width W1 and the width W2 being smaller than 100% of a diameter of a corresponding spot.

2. The optical drive device as claimed in claim 1, wherein at least one of the width W1 and the width W2 are equal to or smaller than 70% of a diameter of a corresponding spot.

3. The optical drive device as claimed in claim 1, wherein the tracking-error signal generator is further configured to generate a main sum signal based on a light receiving amount at a portion of the width W1 at the center of a signal light tangent direction in the main-beam receiving surface, to generate a sub sum signal based on a light receiving amount at a portion of the width W2 at the center of a signal light tangent direction in the ±first-order sub-beam receiving surfaces, and to generate the tracking error signal also based on the main sum signal and the sub sum signal.

4. The optical drive device as claimed in claim 3, wherein the tracking-error signal generator is further configured to generate the tracking error signal by dividing a differential push-pull signal obtained by subtracting a signal obtained by amplifying the sub push-pull signal by a predetermined first amplification factor from the main push-pull signal, by a normalization sum signal obtained by adding a signal obtained by amplifying the sub sum signal by a predetermined second amplification factor to the main sum signal.

5. The optical drive device as claimed in claim 3, wherein the tracking-error signal generator is further configured to generate the tracking error signal based on a normalized main push-pull signal obtained by normalizing the main push-pull signal by the main sum signal, and based on a normalized sub push-pull signal obtained by normalizing the sub push-pull signal by the sub sum signal.

6. The optical drive device as claimed in claim 3 further comprising:
   a total-sum signal generator that is further configured to generate a total sum signal based on a light receiving amount of the optical beam received in the light receiving surface, wherein the total-sum signal generator generates a total sum signal based on a light receiving amount at a portion of a width W3 centered on the spot center of the zero-order diffracted light and extending perpendicularly to the signal light tangent direction the width W3 being equal to or smaller than 160% of a diameter of a spot of the zero-order diffracted light.

7. The optical drive device as claimed in claim 6, wherein the width W3 is equal to or smaller than a diameter of a spot of the zero-order diffracted light.

* * * * *

UNITED STATES PATENT AND TRADEMARK OFFICE
CERTIFICATE OF CORRECTION

| | |
|---|---|
| PATENT NO. | : 8,189,436 B2 |
| APPLICATION NO. | : 12/546174 |
| DATED | : May 29, 2012 |
| INVENTOR(S) | : Tetsuya Nishiyama |

It is certified that error appears in the above-identified patent and that said Letters Patent is hereby corrected as shown below:

In the drawings, Sheet 54, Fig. 54 should be labeled as --PRIOR ART--.

Signed and Sealed this
Seventh Day of August, 2012

David J. Kappos
*Director of the United States Patent and Trademark Office*